United States Patent

Uehara et al.

[11] Patent Number: 6,008,846
[45] Date of Patent: *Dec. 28, 1999

[54] DOCUMENT SENSING APPARATUS

[75] Inventors: Tsukasa Uehara, Kawasaki; Kazuto Ariga, Tokyo; Daisuke Yokoyama, Tama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/539,479

[22] Filed: Oct. 5, 1995

[30] Foreign Application Priority Data

Oct. 7, 1994 [JP] Japan .................................. 6-270637
Oct. 7, 1994 [JP] Japan .................................. 6-270638
Oct. 13, 1994 [JP] Japan .................................. 6-274483
Nov. 2, 1994 [JP] Japan .................................. 6-273999

[51] Int. Cl.$^6$ ................................................. H04N 5/225
[52] U.S. Cl. .......................................... 348/373; 348/376
[58] Field of Search .................................. 348/373, 333, 348/376, 207; 358/479, 497; 396/419; 248/277, 163.1, 166

[56] References Cited

U.S. PATENT DOCUMENTS

| | | | |
|---|---|---|---|
| 3,699,252 | 10/1972 | Jackson | 348/373 |
| 4,541,596 | 9/1985 | Prince | 248/125 |
| 4,667,255 | 5/1987 | Lindberg | 348/373 |
| 4,671,479 | 6/1987 | Johnson et al. | 248/173 |
| 4,916,550 | 4/1990 | Miyake et al. | 348/373 |
| 4,963,986 | 10/1990 | Fukuyama et al. | 348/373 |
| 5,247,330 | 9/1993 | Ohyama et al. | 348/375 |
| 5,374,971 | 12/1994 | Clapp et al. | 348/373 |
| 5,559,554 | 9/1996 | Uekane et al. | 348/333 |
| 5,594,502 | 1/1997 | Bito et al. | 348/373 |
| 5,622,344 | 4/1997 | Gracie | 248/166 |

Primary Examiner—Wendy Garber
Assistant Examiner—Aung S. Moe
Attorney, Agent, or Firm—Morgan & Finnegan LLP

[57] ABSTRACT

A folding mechanism portion for folding leg portions (8, 11) along a support portion (5) of an image input apparatus (1) is provided in a base portion (7). This mechanism is constituted by two legs which extend from the base portion substantially in the shape of "L" within a horizontal plane when used, and can be folded to become parallel to the support portion (5) when not used. A pan base (2) on the upper end of the support portion (5) has an electrical connector and can be detached.

12 Claims, 39 Drawing Sheets

F I G. 14
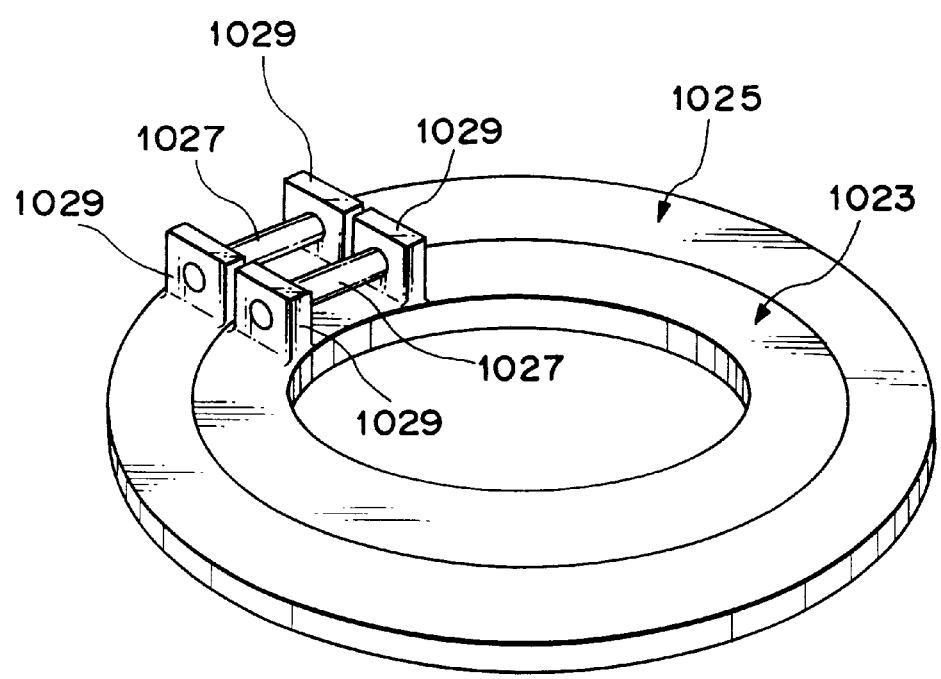

DOCUMENT SENSING APPARATUS

BACKGROUND OF THE INVENTION

FIELD OF THE INVENTION

The present invention relates to an image input apparatus for converting the image information of an object sensed by a camera unit into an electrical signal and, more particularly, to an image input apparatus which is suitable for housing and transportation.

Conventionally, an image input apparatus for sensing an object with an image sensing device and converting the resultant image information into an electrical signal to display an image of the object on a monitor has been widely used. Recently, a compact, portable image input apparatus which can be used for a conference or presentation is becoming popular.

A conventional image input apparatus 500 in FIG. 9 comprises a camera unit 501, a first support portion 503 which axially supports the camera unit 501 through a shaft portion 502 to allow the camera unit 501 to pivot, a second support portion 505 which axially supports the first support portion 503 through a shaft portion 504 and a shaft portion 510 to allow the first support portion 503 to pivot, and is pivotally provided with respect to an original table portion 508, fluorescent lamps 506 and 507 as lights pivotally provided with respect to the original table portion 508, and a grip 509 which is pulled to be used when the image input apparatus 500 is to be carried. In the image input apparatus 500, the support portions 503 and 505 can be folded at the three shaft portions, and the fluorescent lamps 506 and 507 as the lights are also foldable. With this mechanism, the apparatus is made portable. However, the apparatus is essentially large and hence is not suitable for a portable apparatus to be carried for a long period of time or over a long distance.

FIG. 10 shows a state wherein the image input apparatus 500 as a conventional apparatus is folded with the grip 509 being pulled, and the user is carrying the apparatus while holding the grip 509 with her hand.

SUMMARY OF THE INVENTION

The present invention has been made in consideration of the above situation, and has as its object to provide an image input apparatus which has a simple structure and can be easily carried.

It is another object of the present invention to provide an image input apparatus which has a simple structure and exhibits excellent stability when it is set up.

It is still another object of the present invention to provide an image input apparatus which can easily switch the position of a camera head and exhibits excellent operating efficiency.

It is still another object of the present invention to provide an image input apparatus which can properly illuminate an object to be photographed.

In order to achieve these objects, the present invention has the following characteristic features.

There is provided an image input apparatus characterized by comprising:
  an image sensing unit for converting image information obtained by sensing an object into an electrical signal;
  a support portion for supporting the image sensing unit; and
  a plurality of leg portions mounted on a base portion of the support portion.

The image input apparatus is characterized in that the leg portions are pivotally mounted on the base portion.

The apparatus is characterized in that the leg portions can be folded along the support portion.

The apparatus is characterized in that the support portion is in a form of pipe.

The image input apparatus is characterized in that each of the leg portions has an illumination unit for illuminating the object such that the illumination unit can be housed in the each leg portion.

The apparatus is characterized in that the each illumination unit is capable of being at first and second position.

The apparatus is characterized in that the illumination unit is capable of illuminating light of different intensities at least the two positions.

The apparatus is characterized in that the illumination unit comprises light amount changing means for arbitrarily changing a light amount.

The image input apparatus is characterized by further comprising pivot means, provided on the support portion, for pivoting the image sensing unit, and when the image sensing unit is positioned at the second position, the illumination unit is inhibited from illuminating the object.

The leg portions of the image input apparatus are characterized as follows.

The apparatus is characterized in that the leg portions are two legs which extend from the base portion substantially in the shape of "L" within a horizontal plane when used, and can be folded to become parallel to the support portion when not used.

The apparatus is characterized by further comprising preventing means of preventing a fall the apparatus.

The apparatus is characterized in that the preventing means are pivot legs which are mounted on distal ends of the two legs such that the pivot legs can be housed in the two legs when not used.

The apparatus is characterized in that an object table which is detachably fitted in groove portions formed in inner side surfaces of the leg portions in longitudinal directions thereof and which functions as a preventing means.

The apparatus is characterized in that the object table is foldable.

The image input apparatus is characterized as follows.

The image input apparatus is characterized by comprising:
  an image sensing unit for converting image information obtained by sensing an object into an electrical signal;
  a support portion for supporting the image sensing unit;
  a plurality of leg portions mounted on the support portion;
  a first connector for connecting the electrical signal obtained by the image sensing unit to a circuit unit separated from the support portion; and
  a second connector for electrical connection with the image sensing unit.

The apparatus is characterized in that the support portion is in a form of pipe and has the second connector.

The apparatus is characterized in that the first connector is mounted on one end portion of the support portion, and the second connector is mounted on the other end portion of the support portion.

The apparatus is characterized by further comprising a base portion for supporting the support portion, and the first connector is mounted on the base portion.

Furthermore, the image input apparatus is characterized as follows.

The apparatus is characterized by comprising:

an image sensing unit for converting image information obtained by sensing an object into an electrical signal;

a support portion for detachably supporting the image sensing unit;

a base portion for supporting the support portion; and leg portions for supporting the base portion, wherein the base portion has detachable portions for attaching/detaching the leg portions.

The apparatus is characterized by having an image sensing unit for inputting image information obtained by sensing an object to an apparatus body, a support portion for supporting the image sensing unit, and leg portions for supporting the support portion, comprising:

pivot means, provided on the support portion, for pivoting the image sensing unit; and image memory means for storing an image input by the image sensing unit.

The image input apparatus is characterized as follows.

The apparatus is characterized by comprising:

a monitor for displaying an image; and image inverting means for inverting a vertical position of an image displayed on the monitor when the image sensing means is pivoted by the pivot means from a second position to a first position, passing a predetermined position.

The apparatus is characterized by further comprising inversion inhibiting means for inhibiting inversion of the image.

The apparatus is characterized in that the image inverting means performs image inversion by using the image memory means.

The image input apparatus is characterized as follows.

The apparatus is characterized by having an image sensing unit for inputting image information obtained by sensing an object to an apparatus body, a support portion for supporting the image sensing unit, and leg portions for supporting the support portion, comprising:

pivot means, provided on the support portion, for pivoting the image sensing unit; and pivoting movement inhibiting means for inhibiting pivoting movement of the image sensing unit at a first position of first and second positions which the image sensing unit can take.

The apparatus is characterized in that the first position is a position where a sensing operation is performed with the image sensing unit being directed substantially vertically downward, and the second position is a position where a sensing operation is performed with the image sensing unit being directed substantially in a horizontal direction.

The image input apparatus is characterized as follows.

The apparatus is characterized by having an image sensing unit for inputting image information obtained by sensing an object to an apparatus body, a support portion for supporting the image sensing unit, and leg portions for supporting a base portion of the support portion, comprising:

pivot means, provided on the support portion, for pivoting the image sensing unit; and image memory means for storing an image input by the image sensing unit, wherein a folding mechanism portion for folding the leg portions along the support portion is formed by the leg portions and the base portion.

The apparatus is characterized in that the leg portions in the folding mechanism portion are two legs which extend from the base portion substantially in the shape of "L" within a horizontal plane when used, and can be folded to become parallel to the support portion when not used.

The apparatus is characterized by further comprising preventing means of preventing a fall of the apparatus.

The apparatus is characterized in that the preventing means are pivot legs which are mounted on distal ends of the leg portions such that the pivot legs can be housed in the two legs when not used.

The apparatus is characterized in that the support portion detachably supports the image sensing unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 14 is a perspective views showing rotating plates in FIG. 13;

DETAILED DESCRIPTION OF THE PREFERRED EMBODIMENTS

First Embodiment

An image input apparatus according to the first embodiment of the present invention will be described first.

Figure 1:
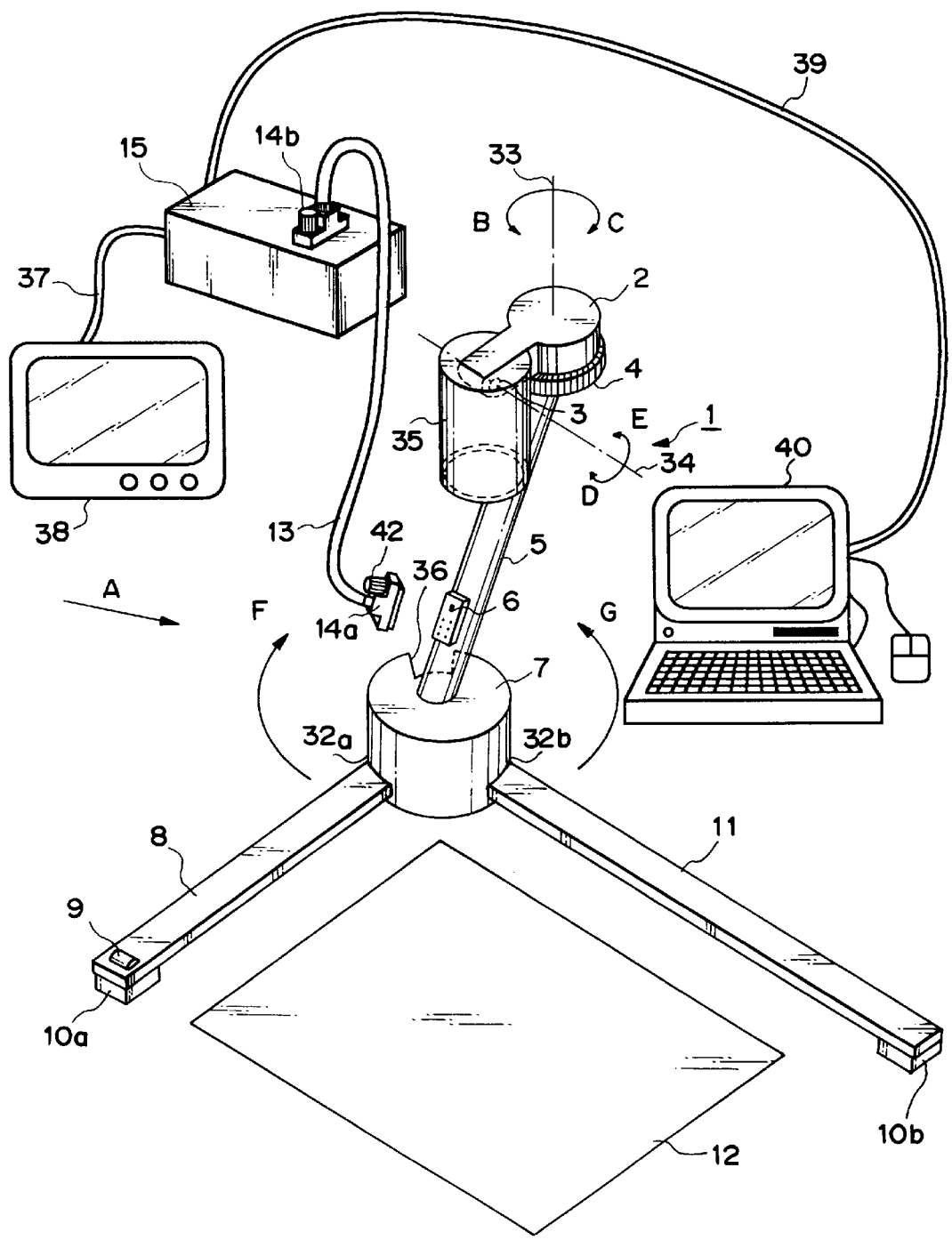
FIG. 1 is a perspective view showing the overall arrangement of an image input apparatus according to the first embodiment of the present invention.

FIG. 1 shows the overall arrangement of the image input apparatus according to the first embodiment. Referring to FIG. 1, reference numeral 35 denotes a camera unit for sensing an original 12 as image information, which is placed immediately below the camera unit 35; and 2, a pan base which axially supports the camera unit 35 through a shaft 3 to allow the camera unit 35 to pivot about a center 34 (in directions D and E in FIG. 1) with a mechanism (not shown). The pan base 2 is supported on a support 5 (to be precise, a first connector portion (to be described later) provided on one end of the support 5) to be pivotal about a center 33 (in directions B and C in FIG. 1) with a mechanism (not shown).

Reference numeral 4 denotes a detachable ring which is used to attach/detach the pan base 2 to/from the support 5 (to be precise, the first connector portion (to be described later) provided on one end of the support 5). Rotation of the detachable ring 4 about the center 33 (in the directions B and C in FIG. 1) allows attachment/detachment of the pan base 2.

Reference numeral 6 denotes a second connector portion provided on the support 5; and 7, a base portion which supports the support 5 and has a notched portion 36 and groove portions 32a and 32b in which the proximal portions of leg portions 8 and 11 of an image input apparatus 1 are fitted. Seats 10a and 10b made of, e.g., a rubber or plastic material are respectively provided on the lower surfaces of the distal ends of the leg portions 8 and 11. With this arrangement, the leg portions 8 and 11 support the overall image input apparatus 1 while serving as non-slip members of the apparatus.

The leg portion 8 can pivot along the groove portion 32a in a direction F in FIG. 1. After pivoting movement, the leg portion 8 can be raised along the support 5 at the position of the notched portion 36 (see FIG. 2). Similarly, after the leg portion 11 pivots along the groove portion 32b in a direction G in FIG. 1, it can be raised along the raised leg portion 8 at the position of the notched portion 36 (see FIG. 2).

Reference numeral 9 denotes an elastic member such as a plastic member or a sponge, which is provided on the upper surface of the distant end of the leg portion 8. When the leg portion 8 is raised along the support 5 as described above, the member 9 is brought into contact with the support 5 to prevent damage to the support 5.

Reference numeral 13 denotes a cable for connecting the image input apparatus 1 to a circuit box 15 (to be described later) as an independent component. Connector portions 14a and 14b are formed on the two ends of the cable 13. One connector portion 14a is engaged with the second connector portion 6 provided on the support 5 of the image input apparatus 1. The other connector portion 14b is engaged with a connector (not shown) provided on the circuit box 15 (to be described later).

Note that the connector portion 14a includes a knob 42 having a screw portion (not shown) to be engaged with the connector portion 6 to be fixed. The circuit box 15 contains circuits for performing, e.g., signal processing and system control in the image input apparatus 1.

Reference numeral 37 denotes a cable used to connect a monitor 38 to the circuit box 15 and serving to exchange signals for displaying images received by the image input apparatus 1 on the monitor 38; and 39, a cable used to connect a computer 40 to the circuit box 15 and serving to exchange signals for allowing the computer 40 to control the image input apparatus 1 and for displaying images sensed by the image input apparatus 1.

Figure 2:
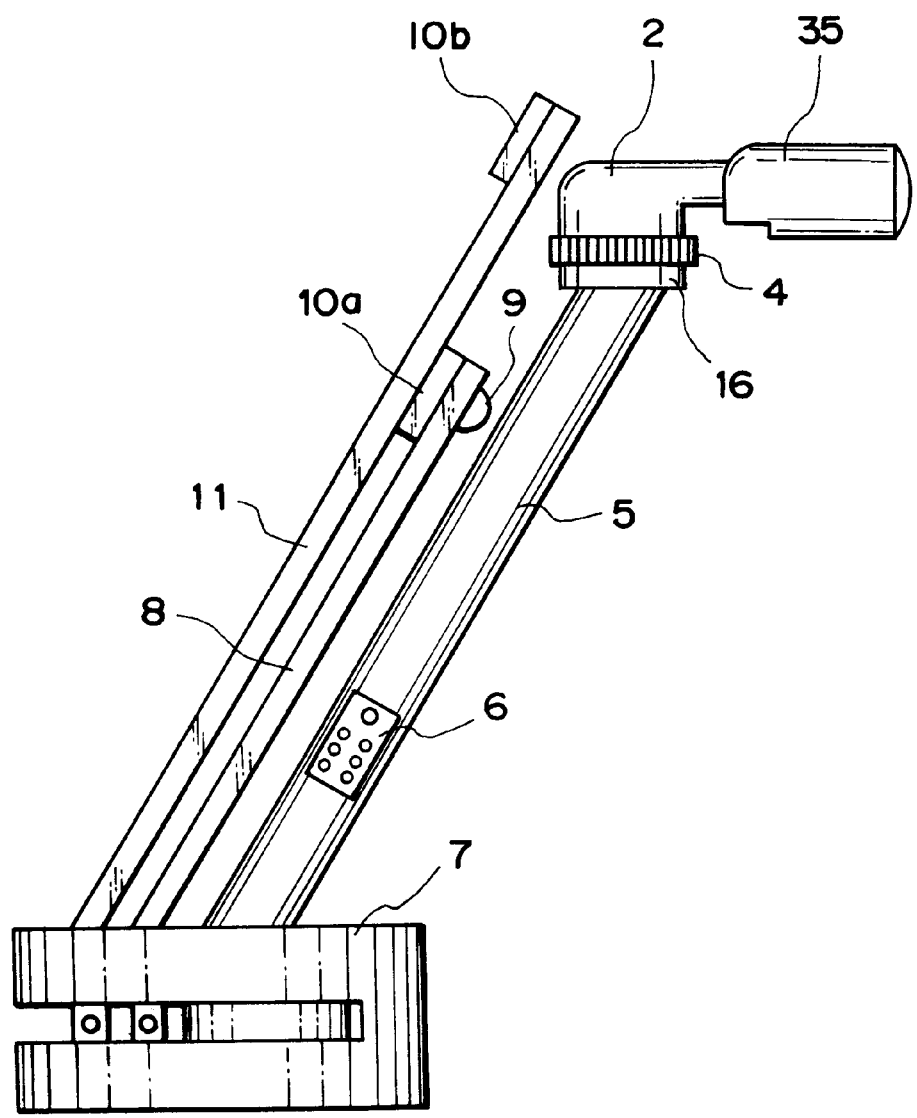
FIG. 2 is a front view showing the image input apparatus when viewed roughly from a direction A in FIG. 1 in a state wherein leg portions 8 and 11 are folded along a support 5 in FIG. 1.

FIG. 2 is a front view showing the image input apparatus 1 when viewed roughly from a direction A in FIG. 1 in a state wherein the leg portions 8 and 11 are folded along the support 5 in FIG. 1. Referring to FIG. 2, the leg portions 8 and 11 are raised along the support 5, and the elastic member 9 and the seats 10a and 10b are in the same raised state.

Figure 3:
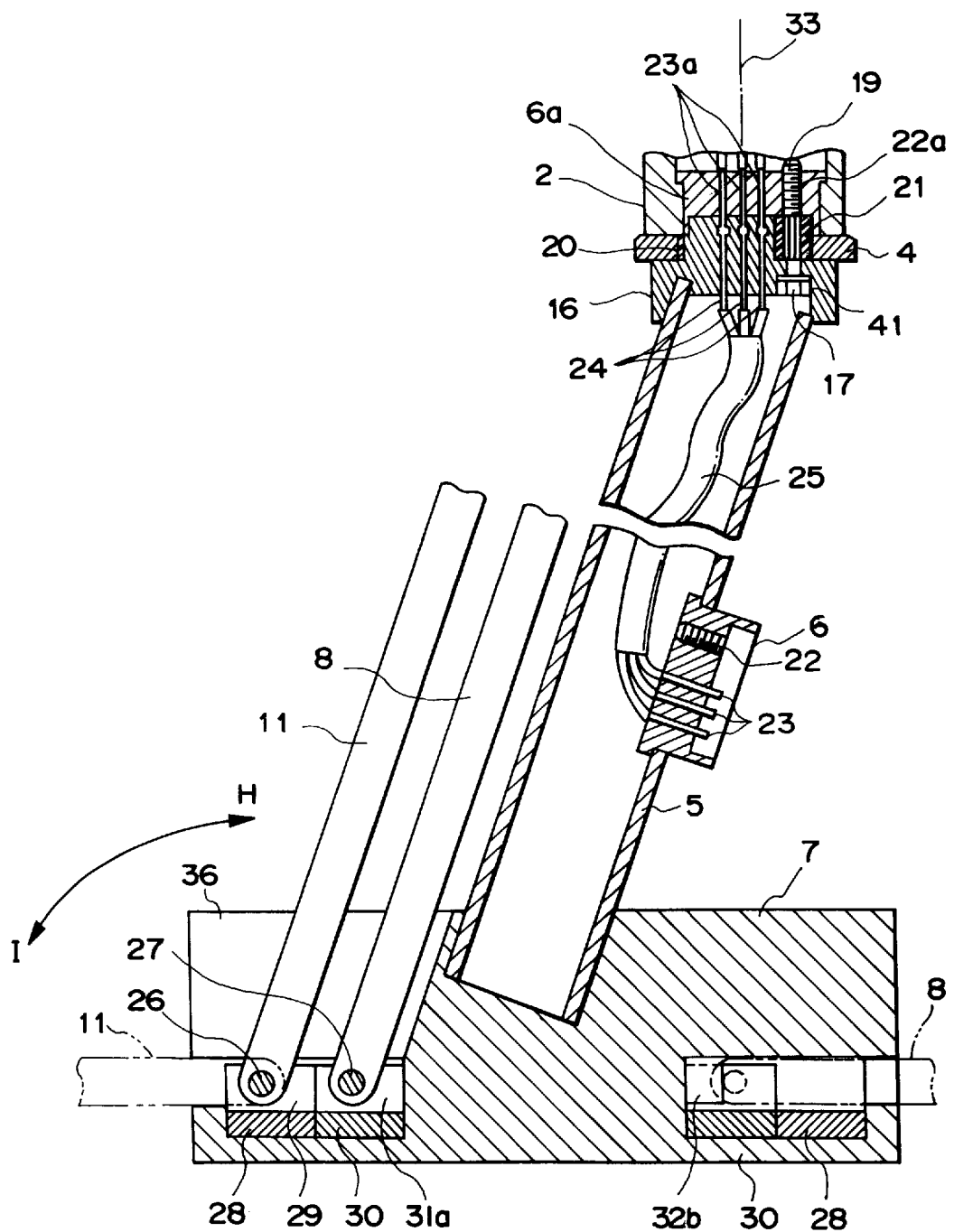
FIG. 3 is a partially sectional view showing the structure of the image input apparatus in the state shown in FIG. 2.

FIG. 3 is a partially sectional view showing the structure of the image input apparatus in the state shown in FIG. 2. FIG. 3 shows the folding mechanisms of the leg portions 8 and 11 and the structure of the connector portion 6 of the support 5. For the sake of descriptive convenience, the depths of the groove portions 32a and 32b are different from the actual amounts.

Referring to FIG. 3, the leg portions 8 and 11 illustrated with the alternate long and two short dashed lines are in a state before they are folded. As described above, the two leg portions 8 and 11 are supported to be pivotal along the groove portions 32a and 32b of the base portion 7 in the directions F and G in FIG. 1. At the position of the notched portion 36 of the base portion 7, the leg portion 8 is axially supported by a shaft 27, which is supported by bearing portions 31a and 31b (see FIG. 4) standing upright from a first rotating plate 30, to be pivotal in directions H and I. In addition, the first rotating plate 30 is rotatable. With this arrangement, the first rotating plate 30 is rotated in the direction F in FIG. 1 when the leg portion 8 is to be folded, and is rotated in the opposite direction when the leg portion 8 is to be set up. Note that the groove portions 32a and 32b serve as guides in this case.

Figure 4:
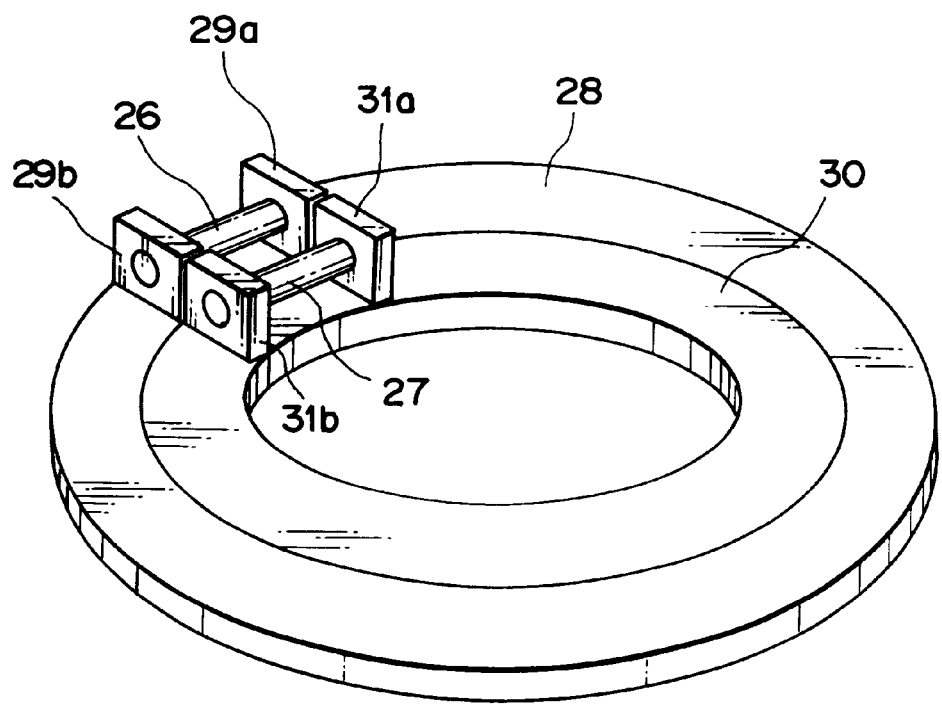
FIG. 4 is a perspective view showing the structures of first and second rotating plates 30 and 28.

FIG. 4 is a perspective view showing the structures of the first rotating plate 30 and a second rotating plate 28. FIG. 4 shows the bearing portions 31a and 31b standing upright from the first rotating plate 30, the support shaft 27 of the leg portion 8, bearing portions 29a and 29b standing upright from the second rotating plate 28, and a shaft 26 of the leg portion 11.

Referring back to FIG. 3, at the position of the notched portion 36 of the base portion 7, the leg portion 11 is axially supported by the shaft 26, which is supported by the bearing portion 29 standing upright from the second rotating plate 28, to be pivotal in the directions H and I. In addition, the second rotating plate 28 is rotatable. With this arrangement, the leg portion 11 is pivoted along the groove portion 32b in the direction G in FIG. 1 upon folding, and is pivoted in the opposite direction upon setting up.

As described above, the first and second rotating plates 30 and 28 have the same function, but are differently shaped such that the outer periphery of the first rotating plate 30 is in slidable contact with the inner periphery of the second rotating plate 28.

The structures of a first connector portion 16 and the second connector portion 6 will be described in detail next. The second connector portion 6 is fixed to an intermediate portion of the support 5 with a screw (not shown). The second connector portion 6 is constituted by a plurality of signal pins 23 and a screw portion 22. The signal pins 23 are respectively connected to a plurality of signal pins 24 in the first connector portion 16 through a signal cable 25 provided in the support 5. The first connector portion 16 is fixed near an end portion of the support 5 with an adhesive.

Reference numeral 17 denotes a shaft rotatably provided in the first connector portion 16. A male screw 19 and a gear portion 21 are provided on a portion of the shaft 17.

Reference numeral 41 denotes a ring for preventing the removal of the shaft 17 from the first connector portion 16. The detachable ring 4 is rotatably provided on the first connector portion 16 with a mechanism (not shown). A gear portion 20 is provided on the inner periphery of the detachable ring 4. The gear portion 20 meshes with the gear portion 21 of the shaft 17.

The pan base 2 contains a connector portion 6a which is engaged with the first connector portion 16. The connector portion 6a is identical to the second connector portion 6 described above. Note that the connector portion 6a is mounted on the pan base 2 with a mechanism (not shown) so as not to pivot even when the pan base 2 rotates about the center 33 as a rotational center.

The operation of the image input apparatus 1 having the above arrangement will be described. Referring to FIG. 1, when the operator is to display, for example, the original 12 on the monitor 38 by using the image input apparatus 1, he/she connects the connector portion 14a on one end of the cable 13 to the second connector portion 6. In this case, the knob 42 is rotated to threadably engage the screw portion (not shown) with the screw portion 22 of the second connector portion 6 to reliably engage the connector portion 14a with the second connector portion 6.

Similarly, the operator connects the connector portion 14b on the other end of the cable 13 to the circuit box 15, and also connects the cable 37 between the circuit box 15 and the monitor 38.

When the power supply (not shown) is turned on, an image of the original 12 sensed through the camera unit 35 is displayed on the monitor 38. This image can be received by the computer 40 by connecting the cable 39 in the same manner.

Note that the zooming operation, focus adjustment, and stop of the camera unit 35, the operation of the pan base 2, and the like can be controlled by operating the switches (not shown) of the circuit box 15 or the computer 40.

Assume that the operator is to fold the image input apparatus 1 upon completion of the operation. Referring to FIG. 1, in this case, the operator operates the circuit box 15 or the computer 40 to operate the pan base 2 so as to set the camera unit 35 in an almost horizontal position (the position of the camera unit 35 in FIG. 2). Thereafter, the operator disconnects the cables and the like from the corresponding components. The operator holds the leg portion 8 and pivots it in the direction F in FIG. 3, and raises it along the support 5 in the direction H in FIG. 3 at the position of the notched portion 36 of the base portion 7. The operator then holds the leg portion 11 and pivots it in the direction G in FIG. 1, and raises it along the support 5 at the position of the notched portion 36 of the base portion 7 in the same manner as described above.

As is apparent, if the leg portion 11 is pivoted and raised first, the leg portion 8 interferes with the leg portion 11 at the position of the notched portion 36 upon pivoting movement, resulting in an erroneous folding operation.

FIG. 2 shows the folded state of the image input apparatus 1 after the above operation. When the detachable ring 4 of the pan base 2 is rotated in this state, the shaft 17 is rotated through the gear portion 21 meshed with the gear portion 20. As a result, the male screw 19 is disengaged from a screw portion 22a of the connector portion 6a. That is, the pan base 2 is separated from the first connector portion 16 which pivotally holds the detachable ring 4 together with the connector portion 6a.

Figure 5:
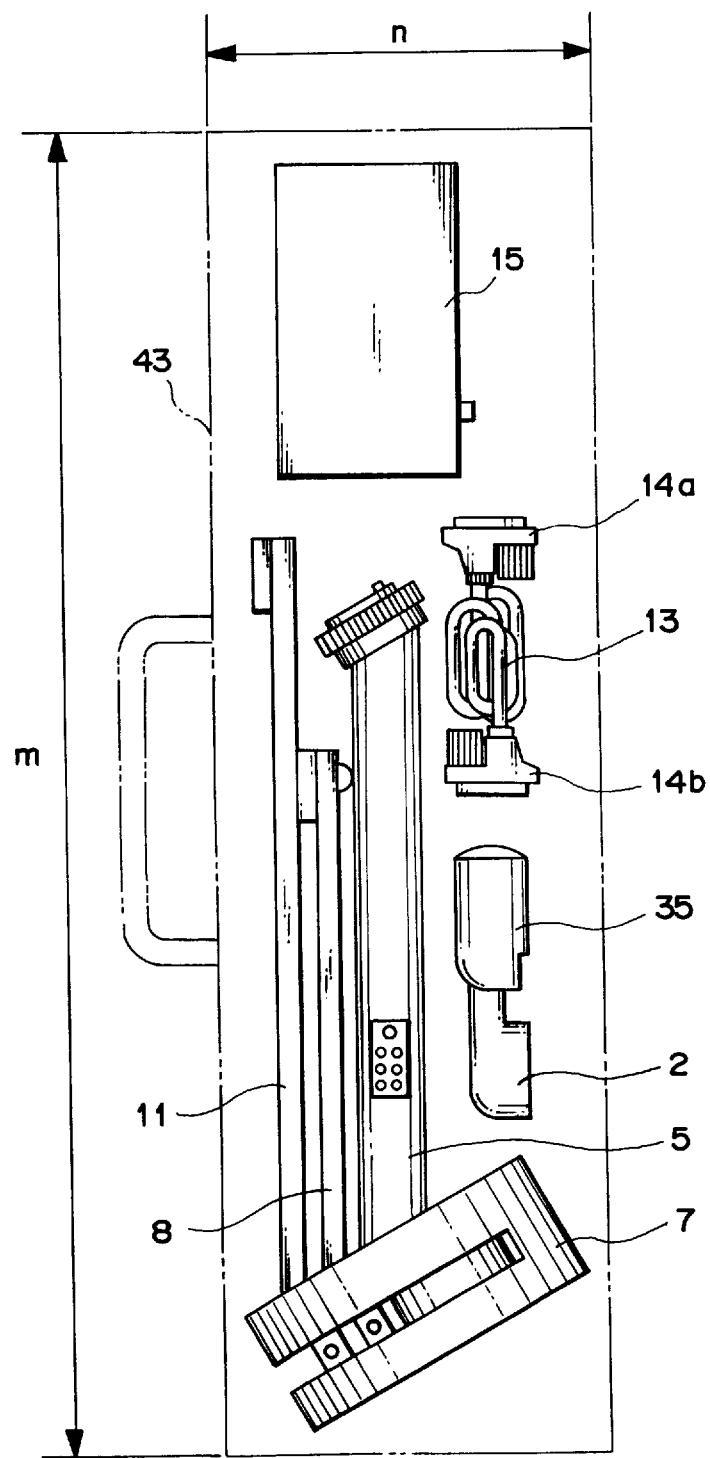
FIG. 5 is a view showing a state wherein the image input apparatus is disassembled and arranged in a carrying case 43 together with other necessary parts.

FIG. 5 shows a state wherein the image input apparatus 1 is disassembled and arranged in a carrying case 43 together with other necessary parts. As shown in FIG. 5, the image input apparatus 1 with the leg portions 8 and 11 being folded and the camera unit 35 and the pan base 2 being removed, the removed camera unit 35, the removed pan base 2, the cable 13 having the connector portions 14a and 14b on the two ends, and the circuit box 15 are arranged in the case 43. In this case, reference symbol m denotes a dimension of the case 43 in its longitudinal direction; and n, a dimension thereof in the direction of its width. Although the dimension m of the case 43 in its longitudinal direction is larger than that in a conventional apparatus, the dimension n of the case 43 in the direction of its width is considerably smaller than that in the conventional apparatus. The thickness is roughly the same as in the conventional apparatus. More specifically, in the conventional apparatus, the length corresponding to the dimension m is 40 cm, the width corresponding to the dimension n is 55 cm, and the thickness is 20 cm. That is, the conventional apparatus has a rectangular shape close to a square shape upon being folded. In contrast to this, according to the present invention, the folded apparatus is more elongated than the conventional apparatus. The apparatus having this shape is easy to carry. Furthermore, in this embodiment, since no original table is used, and the mechanism of the support portion is simplified, the weight of the apparatus is considerably reduced as compared with the conventional apparatus which weighs 10 kg.

Modification to the First Embodiment

A modification of the image input apparatus according to the first embodiment will be described next.

Figure 6:
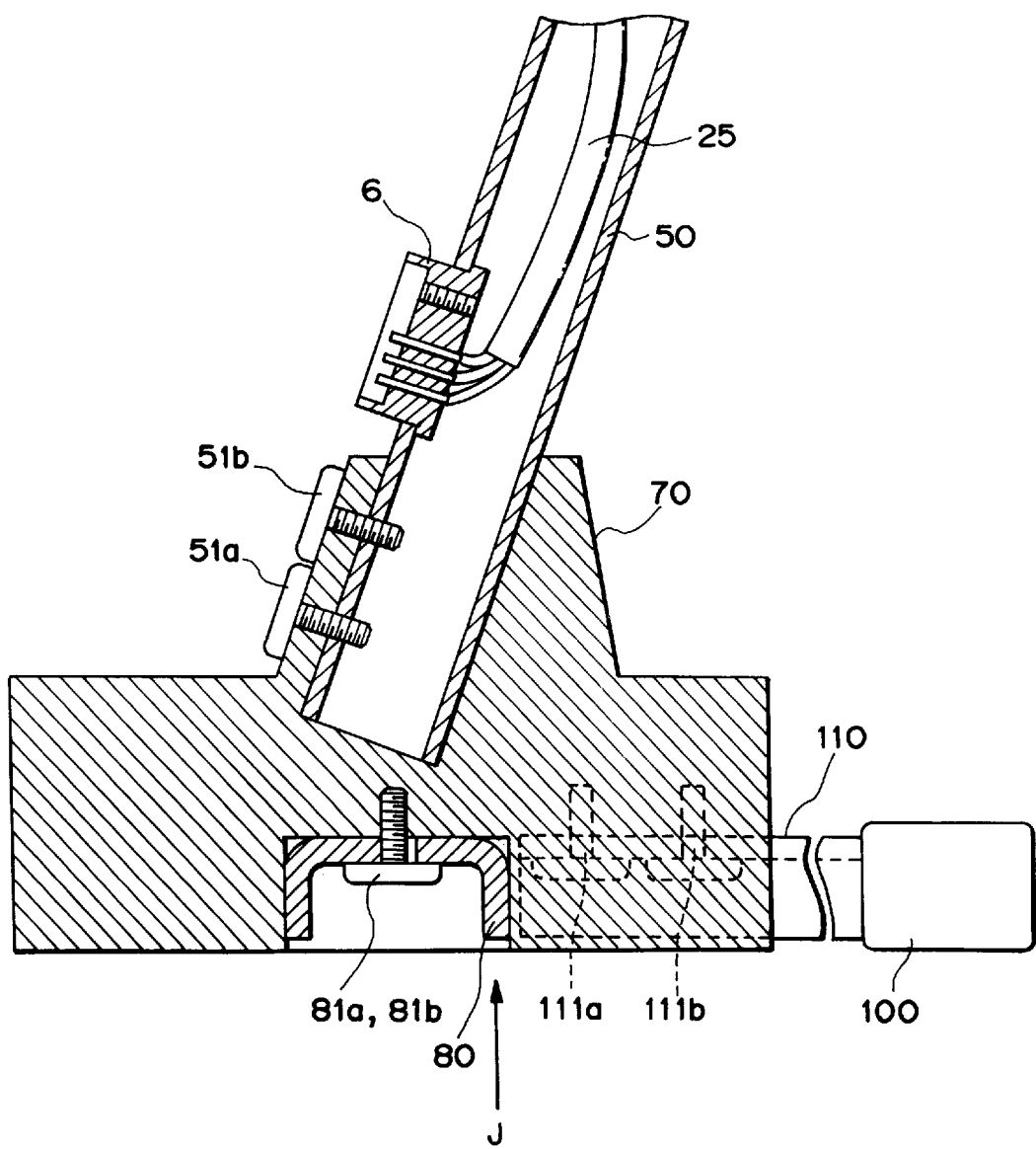
FIG. 6 is a partially sectional view showing the structure of an image input apparatus as a modification corresponding to the structure in FIG. 3.
Figure 7:
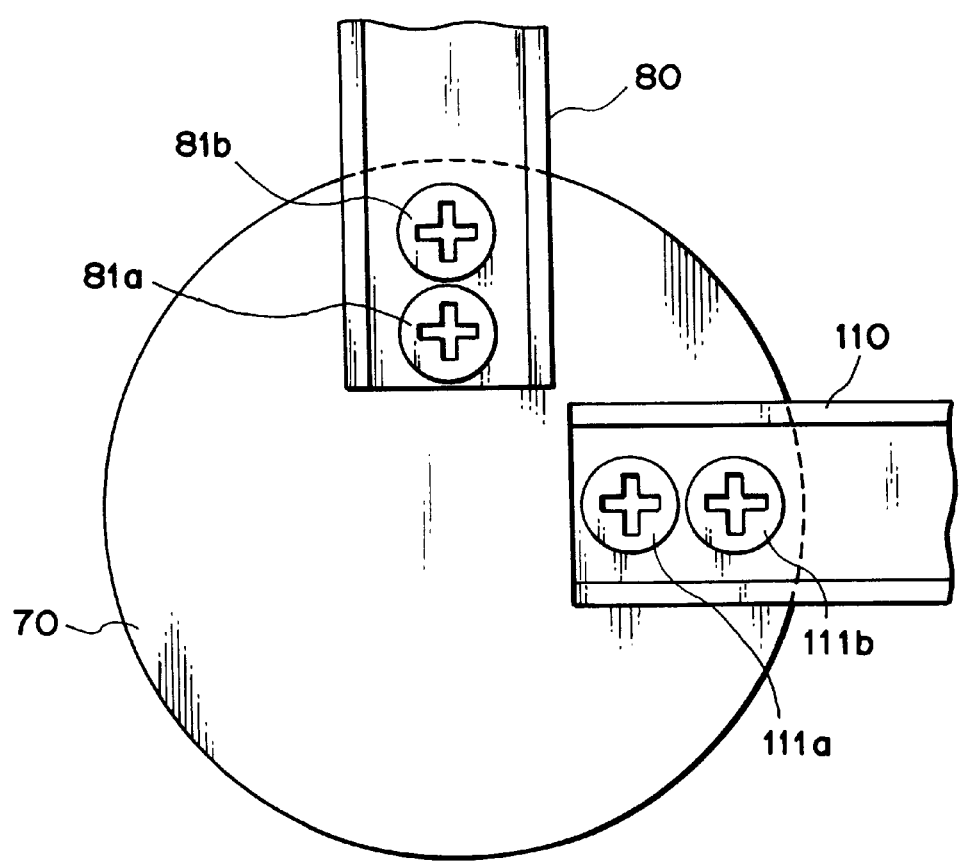
FIG. 7 is a bottom view showing the image input apparatus when viewed from a direction indicated by an arrow J in FIG. 6.

The image input apparatus of this modification is characterized in that the leg portions are detachable, and the support can be detached from the base portion 7. FIG. 6 is a partially sectional view showing the structure of the image input apparatus of the modification corresponding to the structure in FIG. 3. FIG. 7 is a bottom view showing the image input apparatus when viewed from the direction indicated by an arrow J in FIG. 6.

Referring to FIG. 6, reference numeral 50 denotes a support fixed to a base portion 70 with set screws 51a and 51b. The support 50 corresponds to the support 5 in FIG. 1. Reference numeral 100 denotes a seat made of, e.g., a rubber or plastic material, which is mounted on each of leg portions 80 and 110 (to be described later). The seats 100 support the overall image input apparatus while serving as non-slip members.

Referring to FIGS. 6 and 7, the leg portions 110 and 80 are respectively similar to the leg portions 11 and 8 in FIG. 1. Reference numerals 111a and 111b denote screws for mounting the leg portion 110 on the base portion 70; and 81a and 81b, screws for mounting the leg portion 80 on the base portion 70.

In this modification, in disassembling the image input apparatus, the camera unit is removed from the support as in the first embodiment. In the modification, the support 50 can also be removed from the base portion 70 by unfastening the screws 51a and 51b. As a result, the support 50 is separated with the connector portions being mounted on almost the two ends. The leg portions 80 and 110 can be removed from the base portion 70 by unfastening the screws 81a and 81b and the screws 111a and 111b, respectively.

The apparatus can be assembled by the reverse process to that described above. The image input apparatus disassembled in this manner can be housed in the carrying case in the shape which allows the apparatus to be easily carried.

In this case, the apparatus is housed in the case with the leg portions and the support being separated from the base portion, unlike the arrangement in FIG. 5 in the first embodiment. In either case, the apparatus is considerably reduced in weight and has an elongated shape which makes the apparatus easy to carry as compared with the conventional apparatus.

Figure 8:
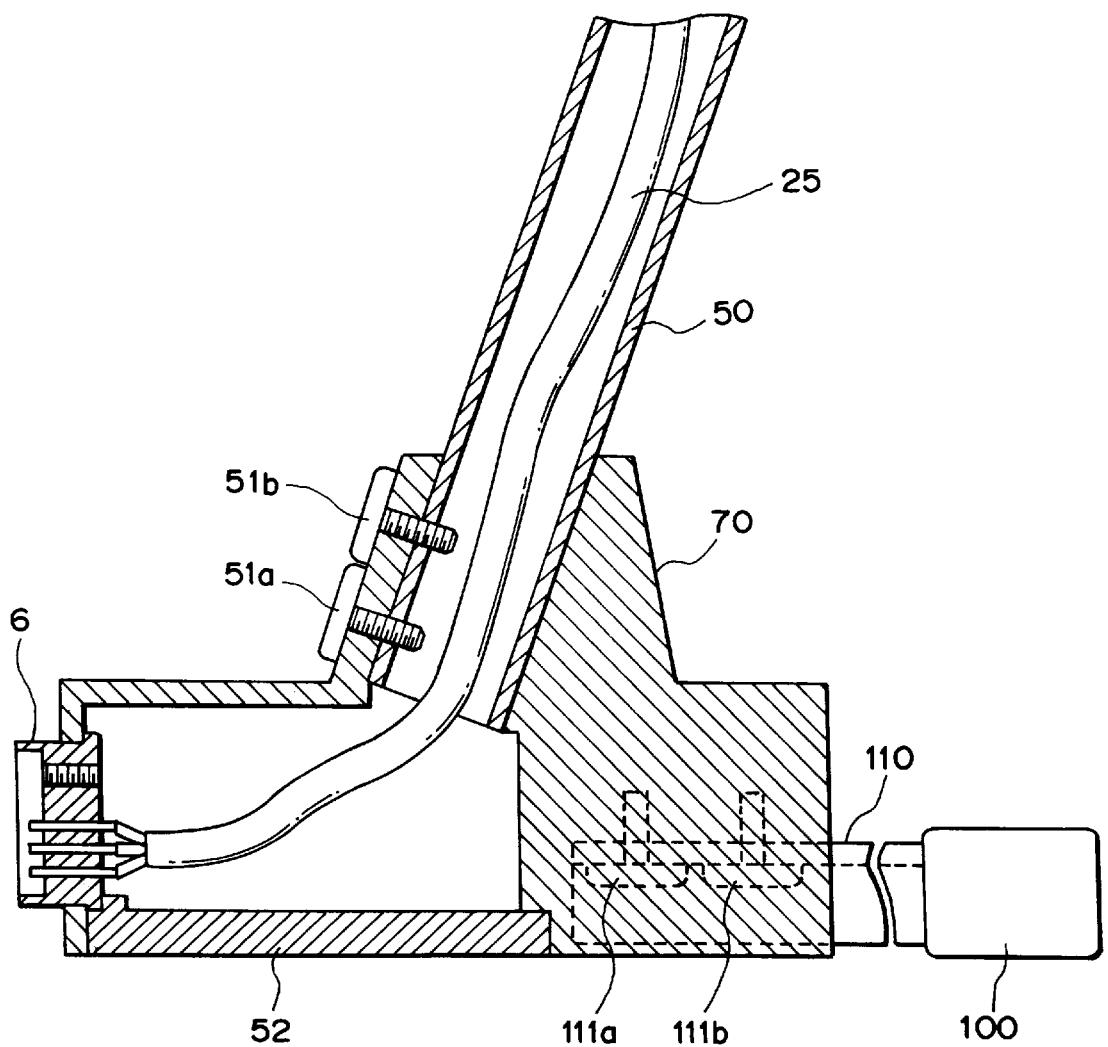
FIG. 8 is a sectional view showing the structure of an image input apparatus as another modification in which a connector portion 6 is mounted on a base portion 70.
Figure 9:
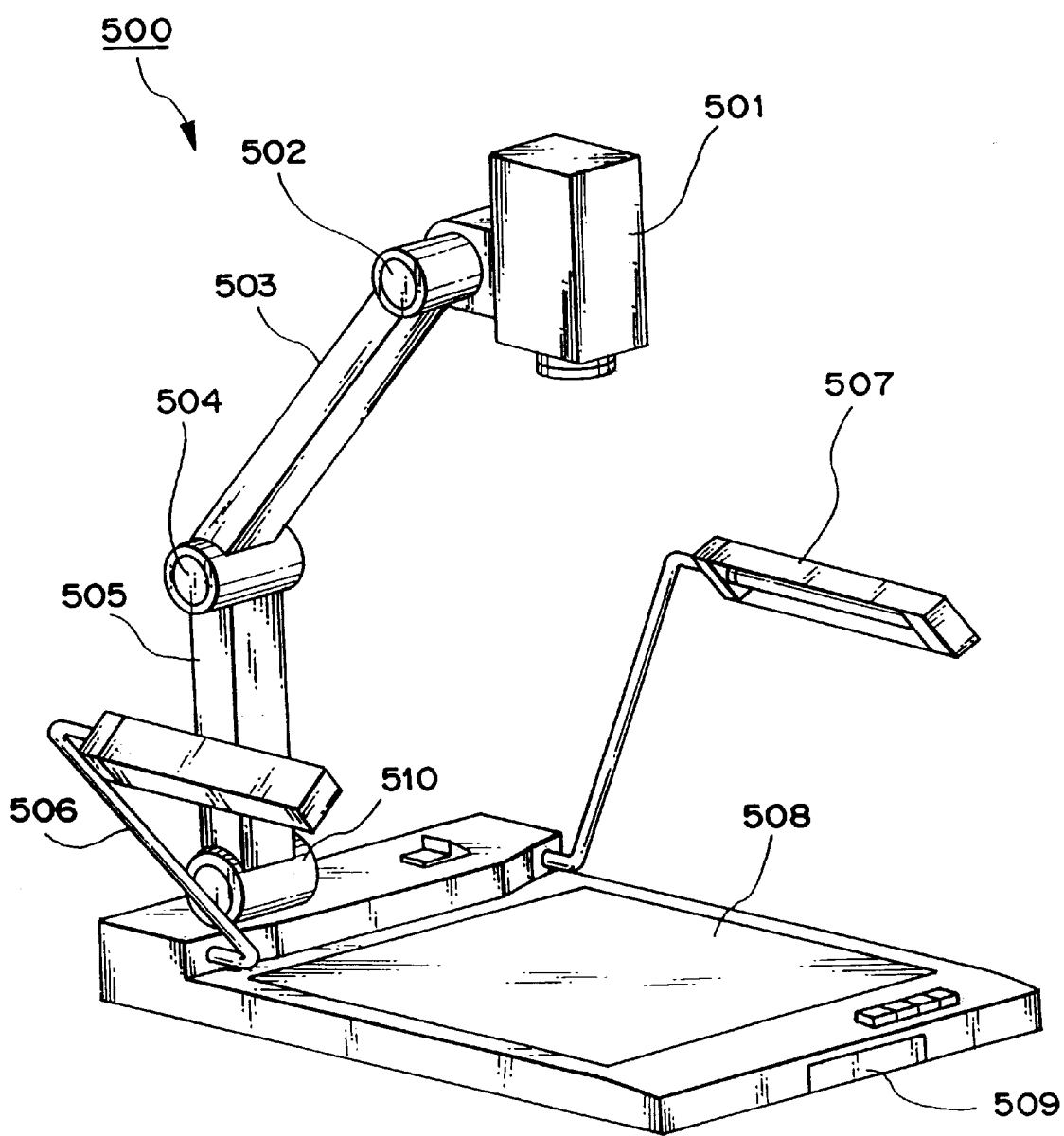
FIG. 9 is a perspective view showing the outer appearance of a conventional image input apparatus.
Figure 10:
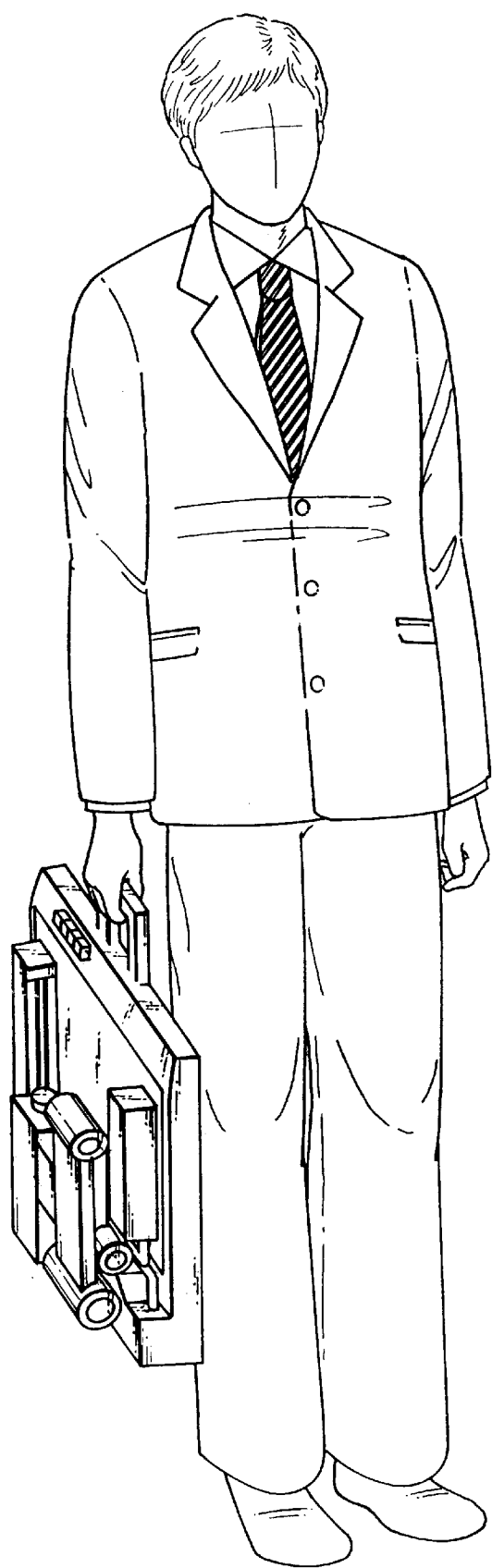
FIG. 10 is a perspective view showing a state wherein the folded conventional image input apparatus is being carried.

FIG. 8 is a partially sectional view showing the structure of an image input apparatus as another modification in which the second connector portion 6 in FIG. 6 is provided on the base portion 70. Referring to FIG. 8, reference numeral 52 denotes a rear cover mounted on the base portion 70 with screws (not shown). The leg portion 80 is omitted from FIG. 8.

In disassembling the image input apparatus of this modification, first of all, the screws (not shown) are unfastened to remove the rear cover 52 and the connector portion 6. The screws 51a and 51b are then unfastened to remove the support 50 from the base portion 70. In this case as well, the apparatus is housed in the carrying case with the support 50 and the base portion 70 being separated from each other.

As in the first embodiment, the support may be kept fixed to the base portion, and the connector portion 6 may be mounted on the base portion instead of the support. In this case, the apparatus is housed in the carrying case with the support and the base portion being coupled to each other. In these cases as well, the apparatus is considerably reduced in weight and has an elongated shape which makes the apparatus easy to carry as compared with the conventional apparatus.

As described above, according to the image input apparatus of this embodiment, the camera unit and the support of the apparatus are designed to be detachable, and the leg portions are designed to be foldable or detachable. With this arrangement, a simple mechanism can be realized, and the number of parts can be decreased, thereby attaining a reduction in cost.

In addition to the decrease in the number of parts, neither flat original table portion nor internal chassis portion for supporting the table portion are used. The total weight of the apparatus therefore decreases.

Since the leg portions can be folded along the support portion or can be detached, the apparatus can be folded into an elongated shape which makes the apparatus easy to carry.

Since the support is in the form of a pipe, and the connector portions are mounted on almost the two ends of the support, the operator can easily assemble and disassemble the apparatus. In addition, the operability on the production line in the factory can be improved. Furthermore, even if the support and the base portion cannot be separated from each other, since the connector used for connection to the camera unit is mounted on the support, and the connector used for connection to the circuit portions for signal processing and system control is mounted on the base portion, the operator can assemble and disassemble the apparatus more easily by himself/herself.

Second Embodiment

The second embodiment of the present invention will be described next with reference to FIGS. 11 to 18.

The overall arrangement of an image input apparatus 1001 of the second embodiment will be briefly described first. A camera unit 1003 for converting image information as light into an electrical signal is supported by a pan base 1005 to be pivotal about two horizontal shafts 1007 and 1009. The pan base 1005 is supported on the upper end of a support portion 1011 to be pivotal about a vertical shaft 1013. A connector 1015 for extracting an electrical signal from the camera unit 1003 is mounted midway along the support portion 1011. The lower end of the support portion 1011 is fixed to a base portion 1017. The base portion 1017 has a short cylindrical appearance. Two leg portions 1019 and 1021 extend from the base portion 1017 within a horizontal plane substantially in the shape of "L". These leg portions support the apparatus 1001. As will be described later, after the two leg portions 1019 and 1021 pivot in directions indicated by arrows AZ and BZ (FIG. 11) within a horizontal plane to be aligned parallel, they pivot in a direction indicated by an arrow CZ (FIG. 13) to become parallel to the support portion 1011. In this manner, the two leg portions 1019 and 1021 can be folded (FIG. 12).

In order to make the two leg portions 1019 and 1021 foldable, two pivot plates 1023 and 1025 are coaxially provided in the base portion 1017 having a short cylindrical appearance and designed to be pivotal within a horizontal plane with respect to the base portion 1017. In order to pivotally support the leg portions 1019 and 1021 within a vertical plane, a support shaft 1027 is provided in the circumferential direction with respect to the pivot plates 1023 and 1025. The leg portions 1019 and 1021 are supported by the support shaft 1027. The support shaft 1027 is provided for the pivot plates 1023 and 1025 through bearings 1029.

A slit 1031 is formed in a side surface of the base portion 1017 in the circumferential direction to allow the leg portions 1019 and 1021 to pivot within a horizontal plane upon pivoting movement of the pivot plates 1023 and 1025. A notch 1033 is formed in the upper surface of the base portion 1017, on which the support portion 1011 is fixed, to allow the two leg portions 1019 and 1021, which have been aligned parallel upon pivoting movement within a horizontal plane, to pivot within a vertical plane and become parallel to the support portion 1011.

Pivot legs 1037 are retractably attached to the distal ends of the two leg portions 1019 and 1021 to be pivotal within a horizontal plane so as to support the apparatus at a position further from the base portion 1017 than a line 1035 (FIG. 11) connecting the distal ends of the leg portions 1019 and 1021, thereby improving the overall stability of the apparatus. Housing slit portions 1039 are formed in the distal ends of the leg portions 1019 and 1021 in the horizontal direction to house the pivot legs 1037. Pivot shafts 1041 (FIGS. 16 and 18) for allowing the pivot legs 1037 to pivot are provided in the housing slit portions 1039. In addition, lock mechanisms 1043 (FIG. 18) are provided in the housing slit portions 1039 to lock the pivot legs 1037 at predetermined pivotal angle positions and unlock them.

Each part of the apparatus will be described in detail below.

Figure 11:
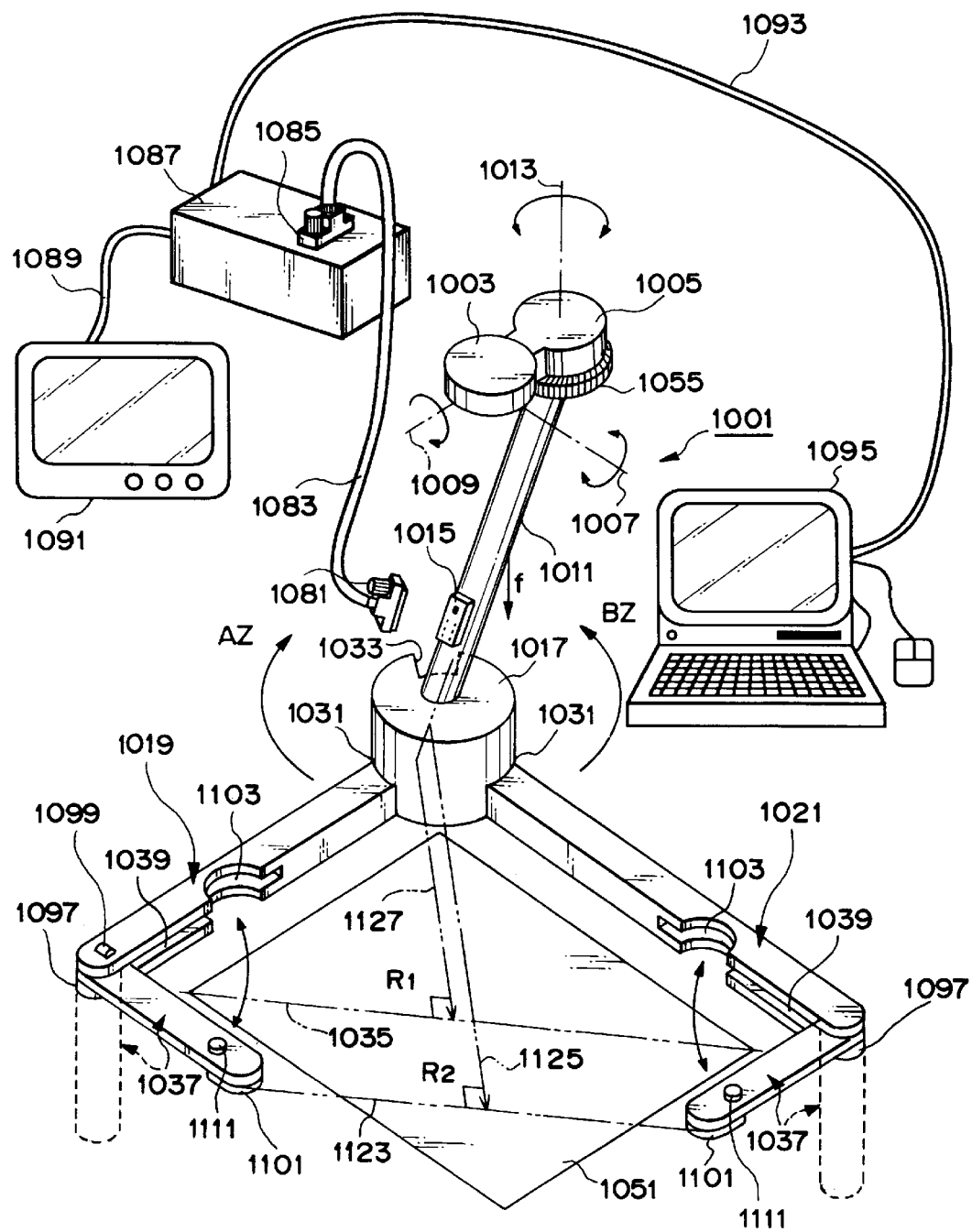
FIG. 11 is a perspective view showing the overall arrangement of an image input apparatus according to the second embodiment of the present invention.
Figure 12:
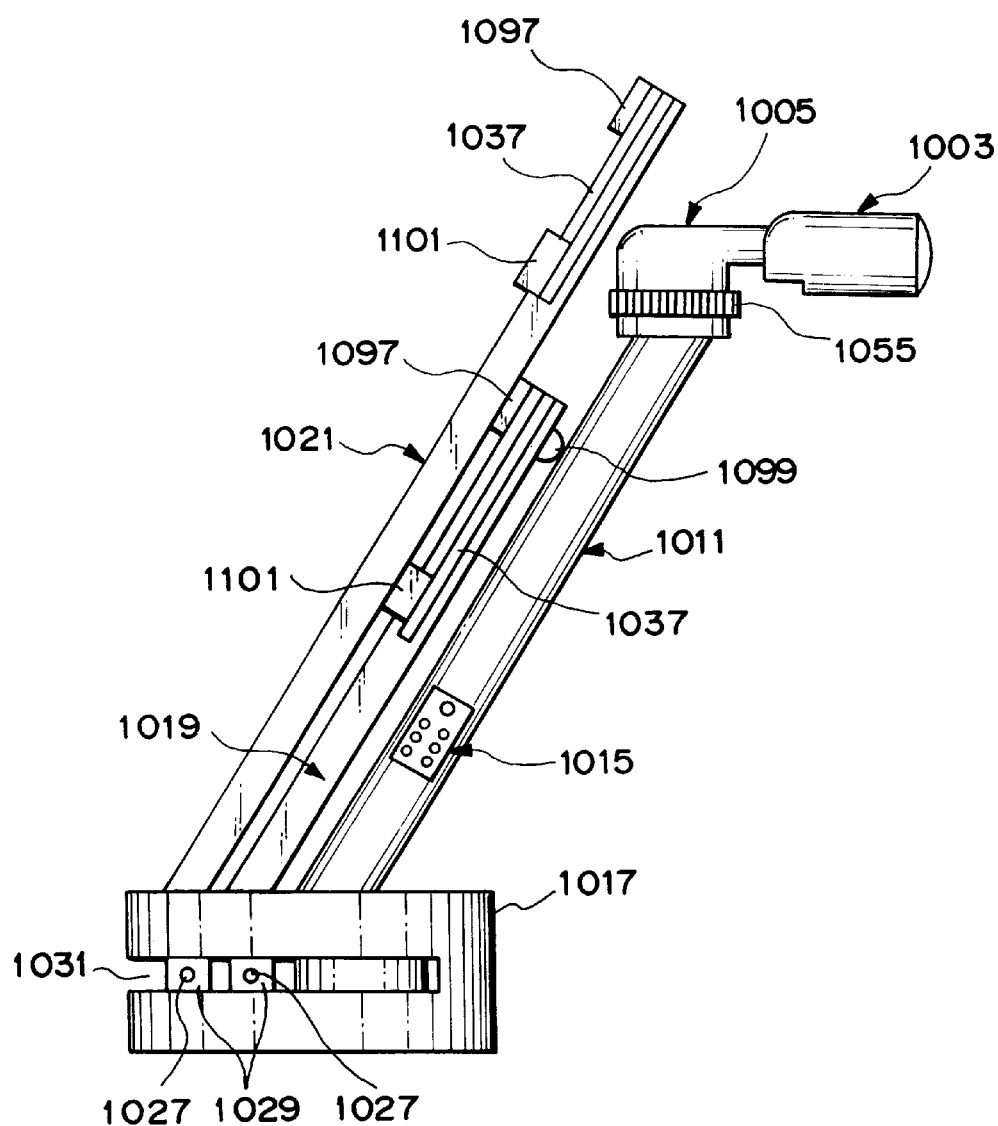
FIG. 12 is a side view showing the folded state of the image input apparatus in FIG. 1.
Figure 13:
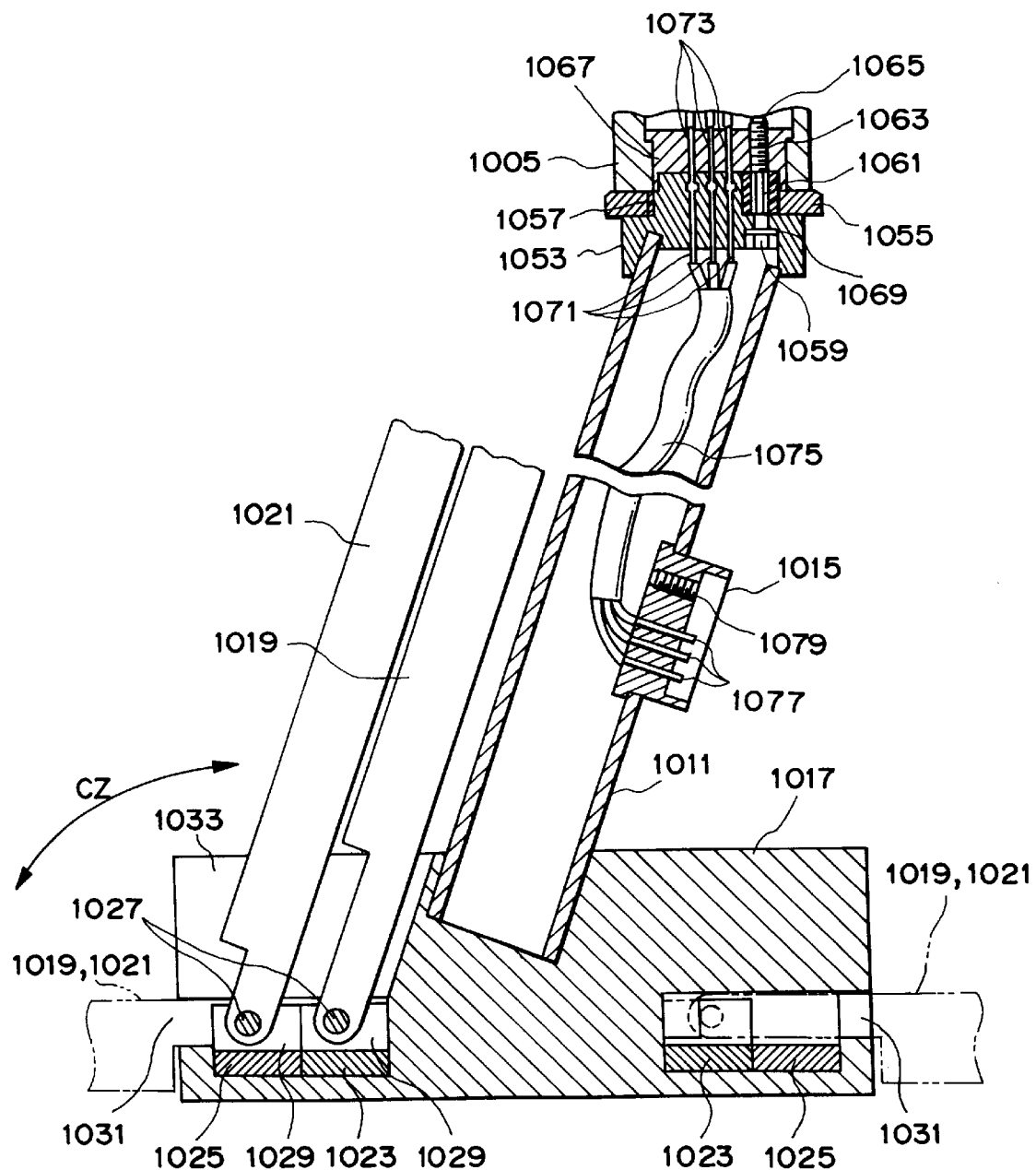
FIG. 13 is an enlarged view showing a cross-section of the main part of the apparatus.

(Camera Unit 1003 and Pan base 1005) FIGS. 11 and 13

An original 1051 as an object to be sensed is placed immediately below the camera unit 1003. The camera unit 1003 senses the image information of the original 1051 and converts the information into an electrical signal. The camera unit 1003 is pivotally supported by the pan base 1005. The camera unit 1003 pivots about the two horizontal shafts 1007 and 1009 which are perpendicular to each other within a horizontal plane. The pan base 1005 itself is detachably supported on the upper end of the support portion 1011 to be pivotal about the vertical shaft 1013.

A support structure for supporting the pan base 1005 will be described with reference to FIG. 13. A ring-like detachable ring 1055 is pivotally mounted around a support portion 1053 fixed to the upper end of the support portion 1011. A gear portion 1057 formed on the inner peripheral side of the detachable ring 1055 is meshed with a gear portion 1061 formed on the outer surface of a shaft 1059 provided in contact with part of the gear portion 1057. A male screw portion 1063 is formed on the distal end of the shaft 1059 which is rotated owing to this meshed state. A female screw portion 1065 which is threadably engaged with the male screw portion 1063 is formed on a supported portion 1067 integrally formed on the lower portion of the pan base 1005. Owing to this threadably engaged state, the supported portion can be moved vertically with respect to the support portion. Note that the movement of the shaft 1059 with respect to the support portion 1053 in the axial direction is prevented by a stop ring 1069.

A plurality of pairs of signal pins 1071 and 1073 extend through the support portion 1053 and the supported portion 1067 in the vertical direction. Of each pair of signal pins 1071 and 1073, the female signal pin 1071 is fixed to the support portion 1053, and the male signal pin 1073 is fixed to the supported portion 1067. The two signal pins 1071 and 1073 are moved in their axial directions to electrically connect or disconnect the two portions 1053 and 1067. A signal cable from the camera unit 1003 is connected to the male signal pin 1073 on the supported portion 1067 side. As described above, the supported portion 1067 has a structure as a connector portion, and the support portion 1053 has a structure as a counterpart connector portion.

(Support Portion 1011 and Connector 1015) FIG. 13

The support portion 1011 is constituted by a pipe-like member, and the support portion 1053 is fixed to the upper end of the support portion 1011. The lower end of the support portion 1011 is fixed to the base portion 1017. In the support portion 1011, one end of a signal cable 1075 is connected to the female signal pin 1071 on the support portion 1053, and the other end of the signal cable 1075 is connected to a male signal pin 1077 on the connector 1015. This connector 1015 is provided midway along the support portion 1011 and has almost the same structure as that of the supported portion 1067. That is, a female screw portion 1079 is formed in addition to the male signal pins 1077.

As shown in FIG. 11, a counterpart connector 1081 is connected to the connector 1015. This counterpart connector 1081 has almost the same structure as that of the support portion 1053. That is, when a knob formed on the counterpart connector 1081 is rotated, the shaft is rotated, and the male screw portion formed on the shaft is threadably engaged with the female screw portion 1079. As a result, the connector 1015 is firmly connected to the counterpart connector 1081. Female signal pins provided on the counterpart connector 1081 are connected to the male signal pin 1077. The counterpart connector 1081 is provided on one end of a cable 1083.

A connector 1085 similar to the above connector is provided on the other end of the cable 1083 and connected to a circuit box 1087. Circuits for performing signal processing in the image input apparatus 1001 and system control are housed in the circuit box 1087. The circuit box 1087 is connected to a monitor 1091 via another cable 1089. The monitor 1091 displays an image sensed by the camera unit 1003.

The circuit box 1087 is also connected to a computer 1095 via still another cable 1093. The computer 1095 controls the image input apparatus 1001 and exchanges signals to display images sensed by the camera unit 1003.

(Base Portion 1017) FIGS. 13 and 14

The two ring-like pivot plates 1023 and 1025 are concentrically provided in the base portion 1017. The pivot plates 1023 and 1025 are provided horizontally to be pivotal about the vertical axis with respect to the base portion 1017. The pair of bearings 1029 are mounted on portions of the circumferences of the pivot plates 1023 and 1025, and the support shaft 1027 are mounted on the pair of bearings 1029. The proximal end portions of the leg portions 1019 and 1021 are pivotally supported by the support shaft 1027.

When the two pivot plates 1023 and 1025 pivot, the angle defined between the two leg portions 1019 and 1021 is arbitrarily set. In general, however, the angle is set to about 90° to surround the original 1051 as an object to be sensed or the like. The two pivot plates 1023 and 1025 have different diameters such that the pivot plate 1025 is positioned outside the pivot plate 1023 and the two plates are in slidable contact with each other.

The slit 1031 is formed in a side surface of the short cylindrical base portion 1017 in the circumferential direction. With this slit 1031, the leg portions 1019 and 1021 extending outward from the inside of the base portion 1017 can pivot within a horizontal plane upon pivoting movement of the pivot plates 1023 and 1025. The notch 1033 is formed in the upper surface of the base portion 1017. The notch 1033 extends near to the support portion 1011 fixed to the base portion 1017. The size of the notch 1033 is set such that the two leg portions 1019 and 1021, which are aligned parallel upon pivoting movement within a horizontal plane, further pivot in a vertical plane (the direction CZ in FIG. 13) to approach and become parallel to the support portion 1011.
(Leg Portions 1019 and 1021) FIG. 11

The two leg portions 1019 and 1021 have different lengths, which correspond to, for example, the short and long sides of the connector 1015 as an object to be sensed. That is, the original 1051 is placed between these two leg portions 1019 and 1021. The two leg portions 1019 and 1021 are located outside the image sensing range of the camera unit 1003. Seats 1097 made of, e.g., a rubber or plastic material are mounted on the lower surfaces of the distal ends of the two leg portions 1019 and 1021. The seats 1097 also serve as non-slip members for the table on which the leg portions 1019 and 1021 are placed, and absorbs vibrations. An elastic member 1099 made of rubber, plastic, sponge, or the like extends from the upper surface of the distal end of one leg portion 1019. This structure prevents the two leg portions 1019 and 1021 which are aligned parallel upon pivoting movement from being damaged upon contact when the leg portions pivot within a vertical plane.
(Pivot Legs 1037) FIGS. 11, 16, and 17

The pivot legs 1037 are pivotally mounted on the distal ends of the leg portions 1019 and 1021. These pivot legs 1037 pivot about the pivot shafts 1041 (FIG. 16) within a horizontal plane to be housed in the housing slit portions 1039 formed in the distal ends of the leg portions 1019 and 1021. Seats 1101 are mounted on the lower surfaces of the distal ends of the pivot legs 1037 in correspondence with the seats 1097 mounted on the distal ends of the leg portions 1019 and 1021 such that the distal ends of the leg portions 1019 and 1021 and the distal ends of the pivot legs 1037 are positioned within the same horizontal plane. Notches 1103 are formed in the leg portions 1019 and 1021 such that the pivot legs 1037 do not come into contact with the leg portions 1019 and 1021 while the pivot legs 1037 are housed in the housing slit portions 1039.
(Lock Mechanism 1043) FIGS. 16, 17, and 18

Figure 16:
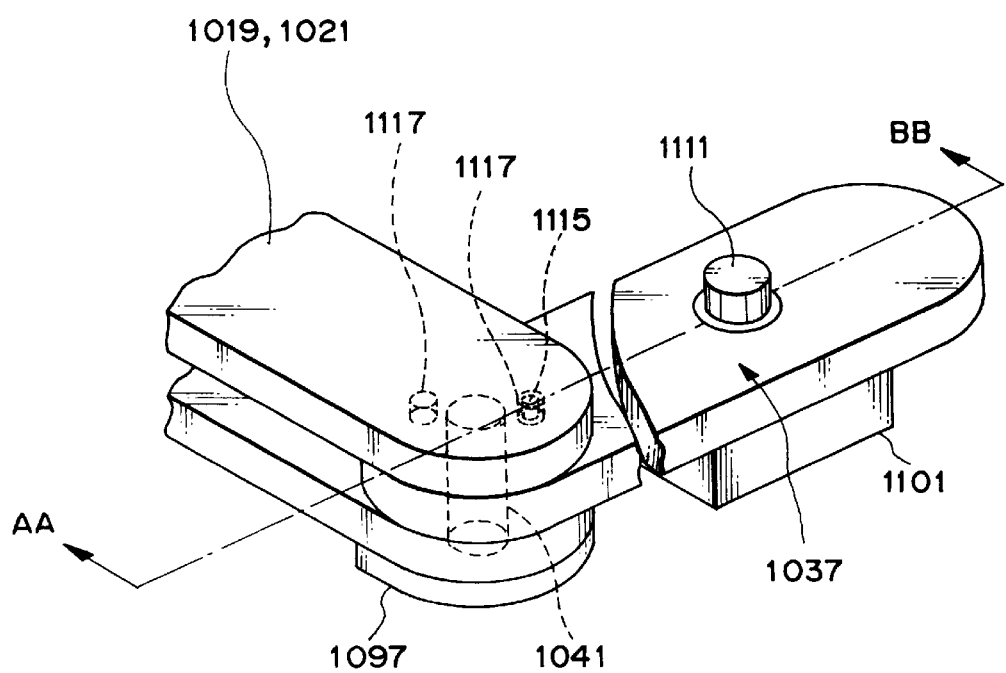
FIG. 16 is an enlarged perspective view showing a pivot leg in FIG. 11.
Figure 17:
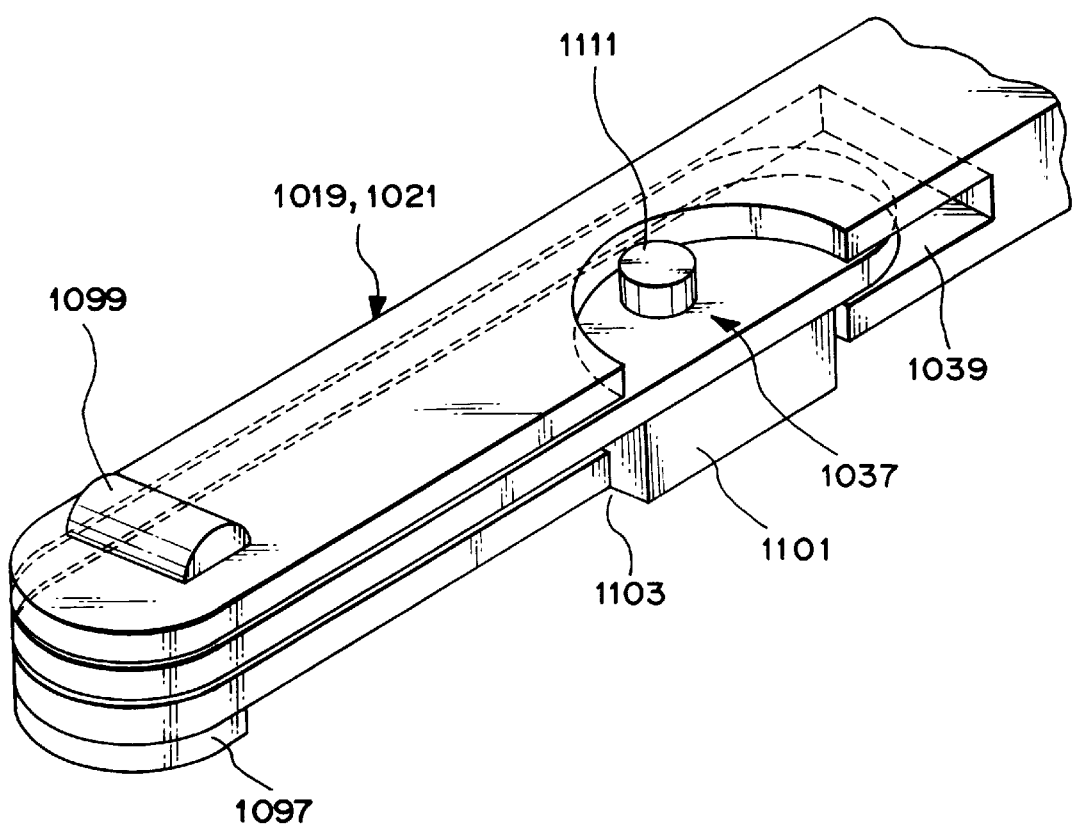
FIG. 17 is a perspective view showing the pivot leg in FIG. 16 in a folded state viewed from another angle.

Each pivot leg 1037 is locked at a predetermined pivotal angle position. This predetermined pivotal angle position is the position where each pivot leg 1037 is placed at an angle of about 90° with respect to a corresponding one of the leg portions 1019 and 1021 (FIG. 11). A hollow 1105 is formed in a portion in each pivot leg 1037, and a vertically movable member 1107 is provided in this hollow 1105 while being biased upward by a spring 1109. A release button 1111 is mounted on one end of the vertically movable member 1107 to be exposed to the surface of the pivot leg 1037 through a hole 1113. A boss 1115 is formed on the other end of the vertically movable member 1107 to protrude from the pivot leg 1037 through the hole. The protruding distal end of the boss 1115 is fitted in a boss hole 1117 formed in the ceiling surface of the housing slit portion 1031. Such a boss hole 1117 is formed at not only the position corresponding to the state wherein the pivot leg 1037 pivots through 90° but also the position corresponding to the state wherein the pivot leg 1037 is completely housed in the housing slit 1031 (FIG. 16). Guide projections 1119 are formed at two positions on the bottom surface of the hollow 1105 to guide the vertical movement of the vertically movable member 1107. Guide holes 1121 in which the guide projections 1119 are inserted are formed in the lower surface of the vertically movable member 1107.

Stoppers (not shown) are formed to prevent the pivot legs 1037 from pivoting beyond an unnecessary angle.

Lock mechanisms similar to these lock mechanisms 1043 are formed for the two leg portions 1019 and 1021.
(Operation)

The operation of the second embodiment will be described below. The apparatus is placed on a table or the like with the two leg portions 1019 and 1021 extending substantially in the shape of "L". The original 1051 as an object to be sensed is placed between the two leg portions 1019 and 1021. The pan base 1005 is then supported on the upper end of the support portion 1011. In supporting the pan base 1005, the detachable ring 1055 of the support portion 1053 (FIG. 13) formed on the upper end of the support portion 1011 is rotated to rotate the shaft 1059, so that the male screw portion 1063 formed on the distal end of the shaft 1059 is threadably engaged with the female screw portion 1065 formed on the supported portion 1067 of the pan base 1005, and the support portion 1053 and the supported portion 1067 are firmly connected to each other. The pivot legs 1037 are extracted from the housing slit portions 1039 of the leg portions 1019 and 1021 and pivoted. When the pivot legs 1037 are extracted, the release button 1111 is depressed to release the boss 1115 from the boss hole 1117.

When the support portion 1053 is connected to the supported portion 1067, the signal pins 1071 and 1073 of the supported portion 1067 and the support portion 1053 as connectors are also connected to each other. The camera unit 1003 senses image information from the original 1051 and converts the information into an electrical signal. An image is then displayed on the monitor 1091 in accordance with this electrical signal. The electrical signal based on this image information is also received by the computer 1095. At this time, the operation of the pan base 1005 is controlled through the switches provided in the circuit box 1087 or the computer.

As described above, when the pan base 1005 is to be supported on the upper end of the support portion 1011, the camera unit 1003 must be manually operated. In this case, when an external force acts in a direction f inadvertently, the apparatus in this embodiment does not fall more easily than the apparatus of the first embodiment.

Assume that a force acts on the apparatus 1001 in a direction in which the apparatus falls. In this case, the apparatus 1001 should pivot about a line 1123 connecting the distal ends of the two pivot legs 1037. If the pivot legs 1037 are not provided, the apparatus 1001 should pivot about the line 1035 connecting the distal ends of the two leg portions 1019 and 1021. The line 1123 connecting the distal ends of the pivot legs 1037 is located further from the base portion 1017 than the line 1035 connecting the distal ends of the leg portions 1019 and 1021. In other words, a length R2 of a perpendicular 1125 dropped from the base portion 1017 to the line 1123 connecting the distal ends of the pivot legs 1037 is larger than a length R1 of a perpendicular 1127 dropped from the base portion 1017 to the line 1035 connecting the distal ends of the leg portions. For this reason, the stability of the apparatus 1001 improves. If the length R2 of the perpendicular 1125 is larger than the length of the support portion 1011, the apparatus 1001 is safe from falling. That is, even if the apparatus 1001 is inclined, the apparatus is restored to its original state by its own weight.

Folding of the leg portions 1019 and 1021 after the use of the image input apparatus 1001 will be described next.

First of all, the operator of the apparatus operates the circuit box 1087 or the computer 1095 to operate the pan base 1005 so as to set the camera unit 1003 in almost a horizontal position. The detachable ring 1055 on the upper end of the support portion 1011 is then pivoted to detach the pan base 1005 together with the camera unit 1003.

In this detaching operation, the good stability of the apparatus 1001 is ensured by the pivot legs 1037, resulting in good operability.

After this operation, the operator holds each pivot leg 1037 with his/her hand and pivots it while depressing the release button 1111, thereby housing the pivot leg 1037 in the housing slit portion 1039. The two leg portions 1019 and 1021 are pivoted in the directions AZ and BZ within a horizontal plane (FIG. 11) to align them parallel. The two leg portions 1019 and 1021 are then pivoted in the direction CZ within a vertical plane (FIG. 13), and house the leg portions 1019 and 1021 in the notch 1033 to make them parallel to the support portion 1011. With this operation, folding of the leg portions 1019 and 1021 is completed. In pivoting the two leg portions 1019 and 1021 within the vertical plane, the leg portion 1019 supported by the inner pivot plate 1023 of the two pivot plates 1023 and 1025 is pivoted first, and the other leg portion 1021 is then pivoted.

Figure 15:
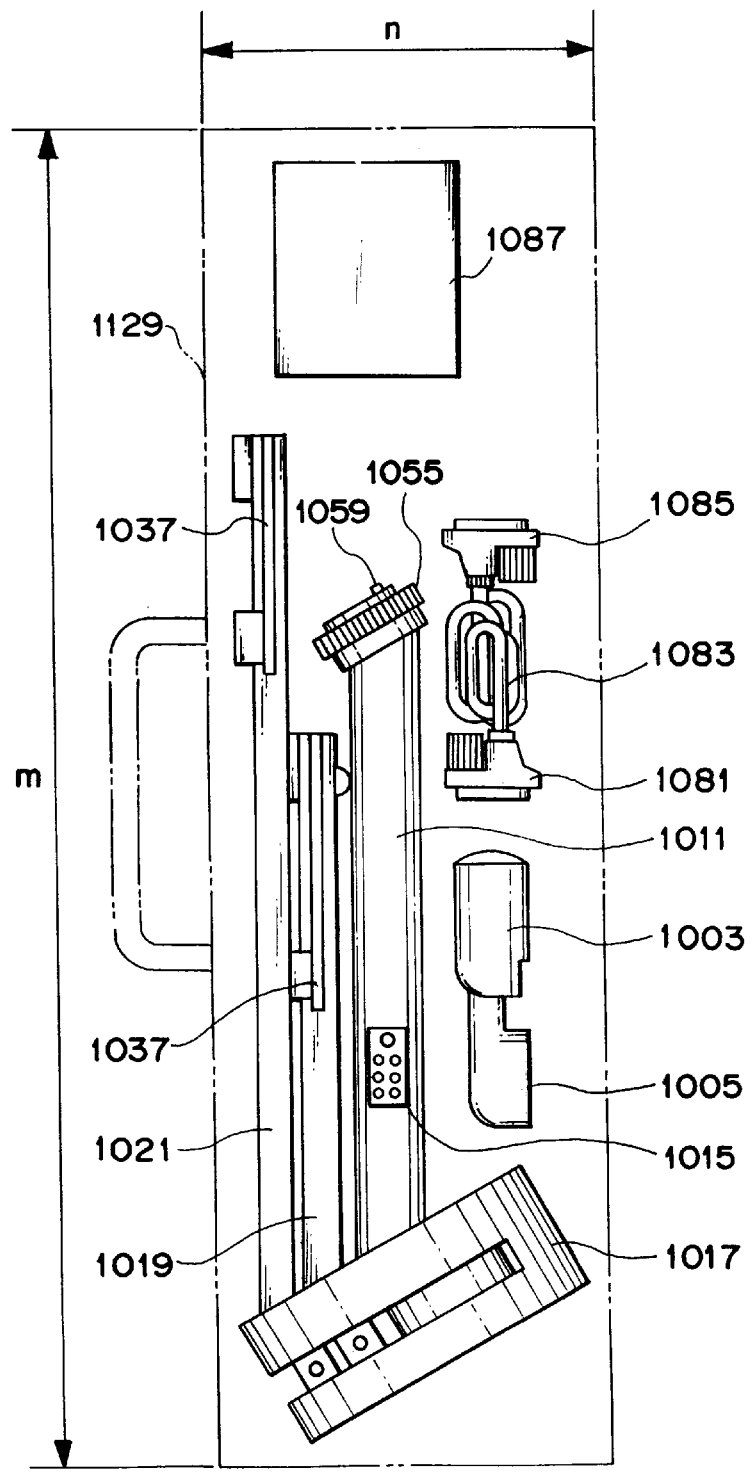
FIG. 15 is a view showing a state wherein the folded image input apparatus in FIG. 12 is housed in a case.

FIG. 15 shows a state wherein the apparatus 1001 folded in this manner is housed in a case 1129. In this case 1129, the two leg portions 1019 and 1021, the support portion 1011, the camera unit 1003 and the pan base 1005 detached from the base portion 1017, the cable 1083, and the circuit box 1087 are efficiently arranged. In a housed state, a dimension m of the apparatus in its longitudinal direction is about 60 cm; a dimension n in its widthwise direction, about 20 cm; and the thickness, about 20 cm. That is, the apparatus is folded into a compact unit which can be easily carried.

As described above, according to this embodiment, the stability of the apparatus 1001 improves, and the apparatus 1001 can be prevented from falling because of the function of the pivot legs 1037 provided on the distal ends of the two leg portions 1019 and 1021. The line 1123 connecting the distal ends of the two pivot legs 1037 is located further from the base portion 1017 than the line 1035 connecting the distal ends of the two leg portions 1019 and 1021. When the apparatus 1001 falls, it should pivot about the line 1123. That is, the stability of the apparatus 1001 against falling improves as the line 1123 is located further from the base portion 1017. When the length R2 of the perpendicular 1125 dropped from the base portion 1017 to the line 1123 connecting the distal ends of the two pivot legs 1037 is larger than the length of the support portion 1011, the apparatus 1001 is safe from falling. Even if the apparatus 1001 is inclined, the apparatus is restored to the original state by its own weight. That is, the apparatus has good restoration characteristics.

Modifications to the Second Embodiment (Modification)

Figure 19:
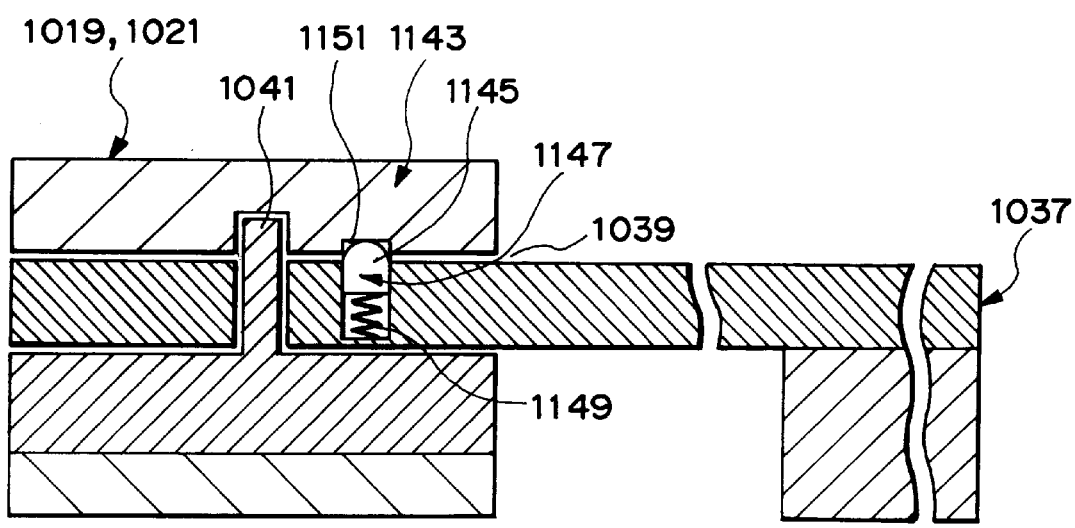
FIG. 19 is a view showing a modification of the second embodiment and corresponding to FIG. 18 showing the second embodiment.

In the second embodiment described above, the support portion 1011 of each lock mechanisms 1043 is depressed to unlock the pivot leg 1037. Instead of this release button, a click mechanism 1143 may be used as a lock mechanism as in a modification of the second embodiment, as shown in FIG. 19. More specifically, a pin 1147 having a spherical surface 1145 at its distal end is provided to retractably protrude from the surface of the pivot leg 1037 while the pin 1147 is biased by a spring 1149. A pin hole 1151 in which the distal end of the pin 1147 is fitted is formed in the ceiling of the housing slit portion 1039.

With this arrangement, the pin 1147 is kept fitted in the pin hole 1151 and no pivoting movement occurs while the pivoting force acting on the pivot leg 1037 is equal to or smaller than a predetermined value. If, however, the pivoting force exceeds the predetermined value, the spherical distal end of the pin 1147 biased by the spring 1149 is depressed downward by the edge portion of the pin hole 1151. In this depressed state of the pin, the pivot leg 1037 can be easily pivoted.

In this manner, the pivot legs 1037 can be kept locked at predetermined pivotal angles with respect to the leg portions 1019 and 1021, and the locked state can be released by applying a pivoting force exceeding a certain value.

In this modification, the boss holes 1117 or the pin holes 1151 are formed at two positions to lock the pivot leg 1037 at two pivotal angle positions. However, the present invention is not limited to this, and three or more boss holes or pin holes may be formed to lock the pivot leg at three or more pivotal angles.

Figure 18:
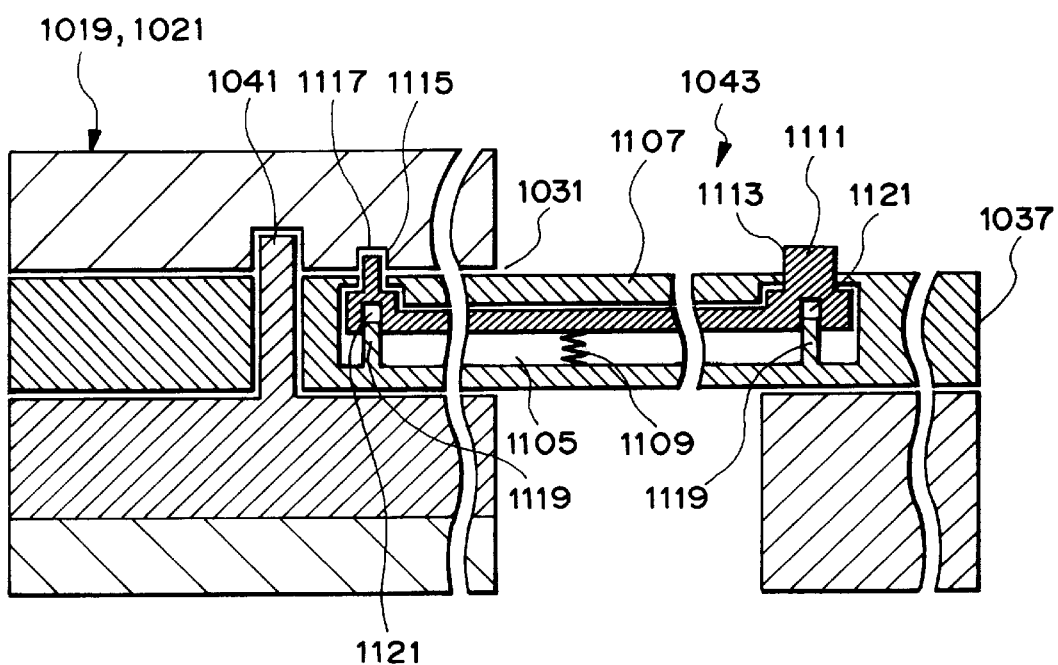
FIG. 18 is a sectional view taken along a line AA-BB in FIG. 16.

Note that the same reference numerals in FIG. 19 showing the modification of the second embodiment denote the same parts as in FIG. 18 showing the second embodiment.

(Another Modification)

Figure 20:
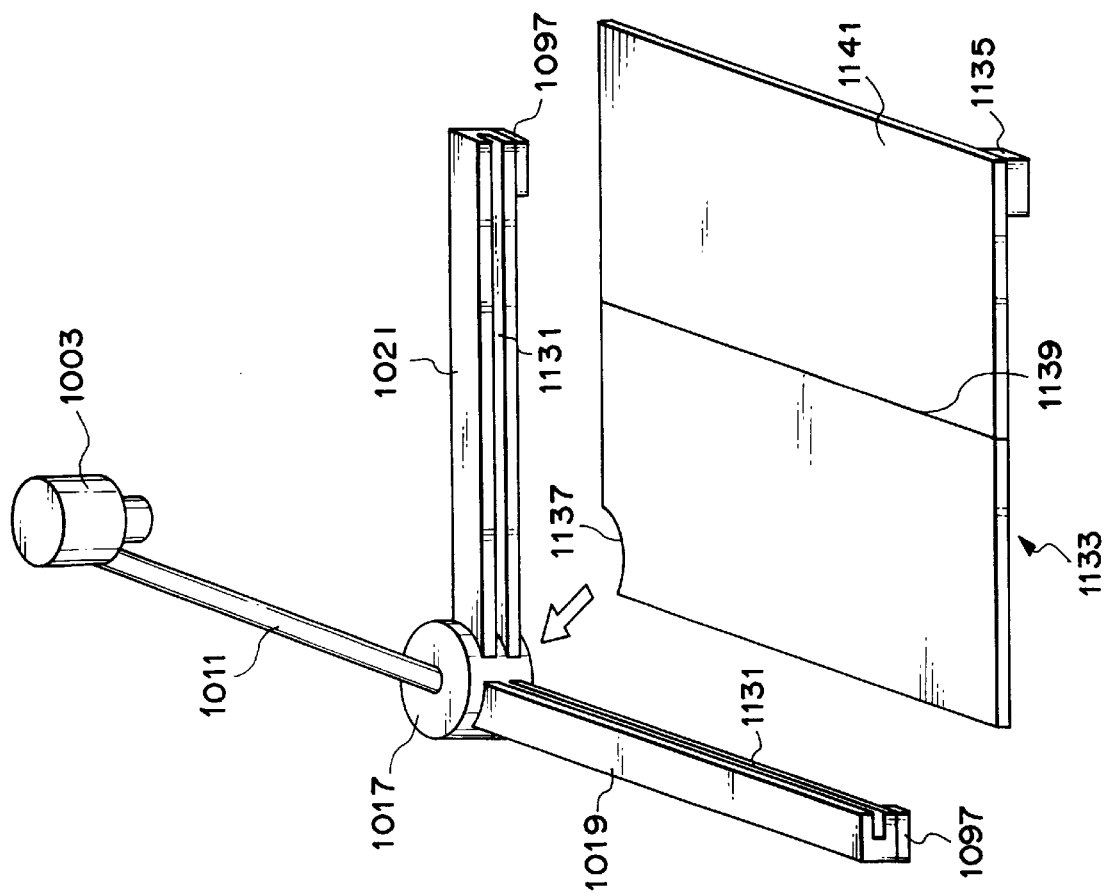
FIG. 20 is an exploded perspective view showing another modification of the second embodiment.
Figure 21:
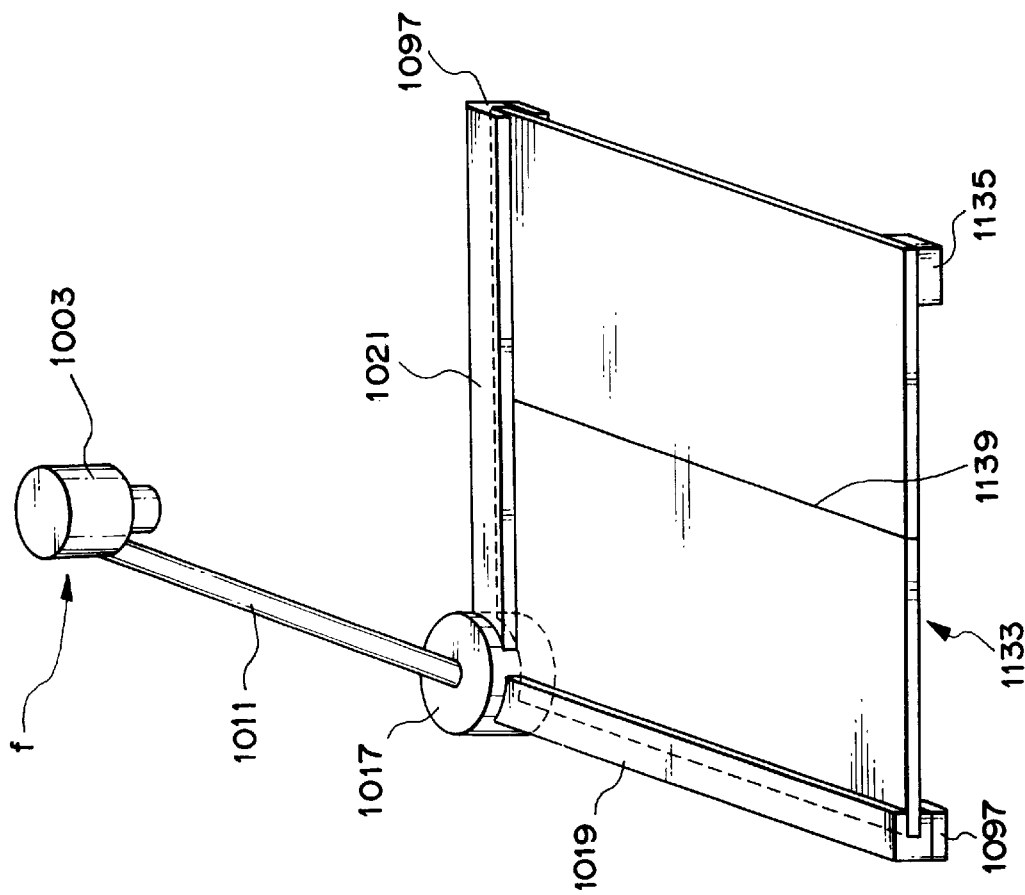
FIG. 21 is a perspective view showing the apparatus in FIG. 20 in an assembled state.

In the above modification, the pivot legs 1037 provided at the distal ends of the two leg portions 1019 and 1021 serve as preventing means of preventing a fall of the apparatus. In another modification of the second embodiment, which will be described below, an object table fitted in the two leg portions 1019 and 1021 may serve as a preventing means of preventing a fall of the apparatus. More specifically, as shown in FIGS. 20 and 21, groove portions 1131 are formed in the inner side surfaces of the two leg portions 1019 and 1021 in their longitudinal direction. The edge portions of a rectangular object table 1133 are fitted in the groove portions 131. A seat 1135 made of, e.g., a rubber or plastic material is mounted on the lower surface of a corner portion of the object table 1133 to maintain the object table 1133 parallel to the leg portions 1019 and 1021. The seat 1135 prevents the apparatus from slipping over a table or the like and can absorb vibrations. An arcuated notch 1137 is formed in a portion of the object table 1133 which is brought into contact with the base portion 1017 to prevent interference with the base portion 1017. The object table 1133 can be folded into two at a folding line 1139 in the middle of the object table 1133 through a folding means (not shown). The object table 1133 therefore can be folded and reduced to ½ the area so as to be housed in a case (not shown).

With the above arrangement, since a corner portion 1141 of the object table 1133 supports the apparatus at a position further from the base portion 1017 than the line connecting the distal ends of the two leg portions 1019 and 1021, the stability of the apparatus against falling can be improved as in the second embodiment.

Note that the same reference numerals in FIGS. 20 and 21 showing another modification of the second embodiment denote the same parts as in FIG. 11 showing the second embodiment.

As described above, the stability of the image input apparatus can be improved by the two leg portions as preventing means of preventing a fall of the apparatus. That is, since the apparatus is supported at a position further from the base portion 1017 than the line connecting the distal ends of the two leg portions, a portion as a pivot shaft about which the apparatus pivots when it falls can be located far from the line connecting the distal ends of the two leg portions, thereby improving the stability of the apparatus. In addition, since the pivot legs can be housed in the leg portions, an increase in the size of the apparatus can be prevented. Furthermore, even when the object table is to be used, the apparatus can be easily carried because the object table can be detached.

As is apparent, the above foldable image input apparatus having the preventing mechanism may include a pivot mechanism of a camera base in the third embodiment of the present invention to be described next.

Third Embodiment

An image input apparatus according to the third embodiment of the present invention will be described next.

Figure 22:
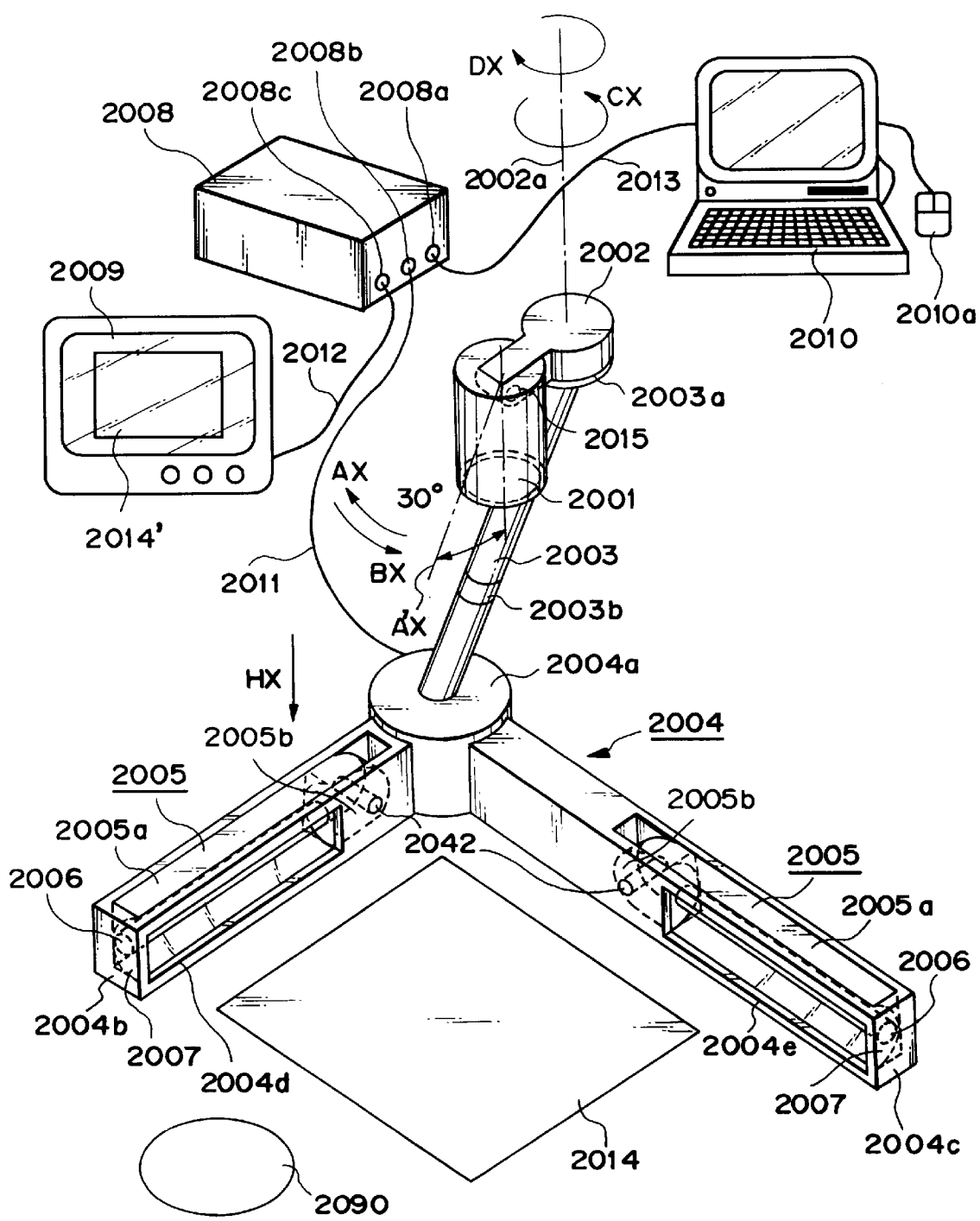
FIG. 22 is a perspective view showing the overall arrangement of an image input apparatus according to the third embodiment of the present invention.

FIG. 22 shows the arrangement of the image input apparatus of the third embodiment. Referring to FIG. 22, reference numeral 2001 denotes a camera head engaged with a tilting shaft 2015 in a camera base 2002 through a means (not shown). The camera base 2002 pivots the tilting shaft 2015 provided in the almost parallelepiped tilting shaft 2015 in directions indicated by arrows AX and BX with a tilting means (to be described later), and also pivots a disk-like portion 2003a about a center 2002a in directions indicated by arrows CX and DX with a panning means provided in the camera base 2002.

Reference numeral 2003 denotes a pipe-like support member having the disk-like portion 2003a, which is engaged with the camera base 2002 through a means (not shown), at one end, and a remote controller light-receiving portion 2003b at a central portion. A cable connected to the camera head 2001 extends through the support portion 2003.

Reference numeral 2004 denotes a base constituted by a cylindrical portion 2004a which supports the support portion 2003 and has a connector to be connected to a control box 2008, and leg portions 2004b and 2004c, each of which houses an illumination unit 2005, supports the illumination unit 2005 to be pivotal about a shaft 2042, and incorporates a lamp position sensor 2062 for detecting the position of the illumination unit 2005.

The illumination unit 2005 is constituted by a box portion 2005a having a fluorescent lamp 2006 and a reflector 2007, and a rotating base 2005b which is engaged with the box portion 2005a through a means (not shown) and has a hole for allowing the shaft 2042 to pass therethrough. The control box 2008 is constituted by a connector 2008a (an RS-232C connector in this embodiment) for connection to an external controller 2010 (a personal computer in this embodiment) having a mouse 2010a through a cable 2013, a connector 2008b for connection to the apparatus body, and a connector 2008c for connection to a monitor 2009. The control box 2008 controls supply of power to the apparatus body and the driving operation of the camera head 2001, and processes an image signal from the camera head 2001 to display an image on the monitor 2009.

Reference numeral 2014 denotes an original; 2014', an original displayed on the monitor 2009; 2015, a tilting shaft for causing the camera head 2001 to pivot in the tilting direction; and 2090, the position of the operator.

Figure 23:
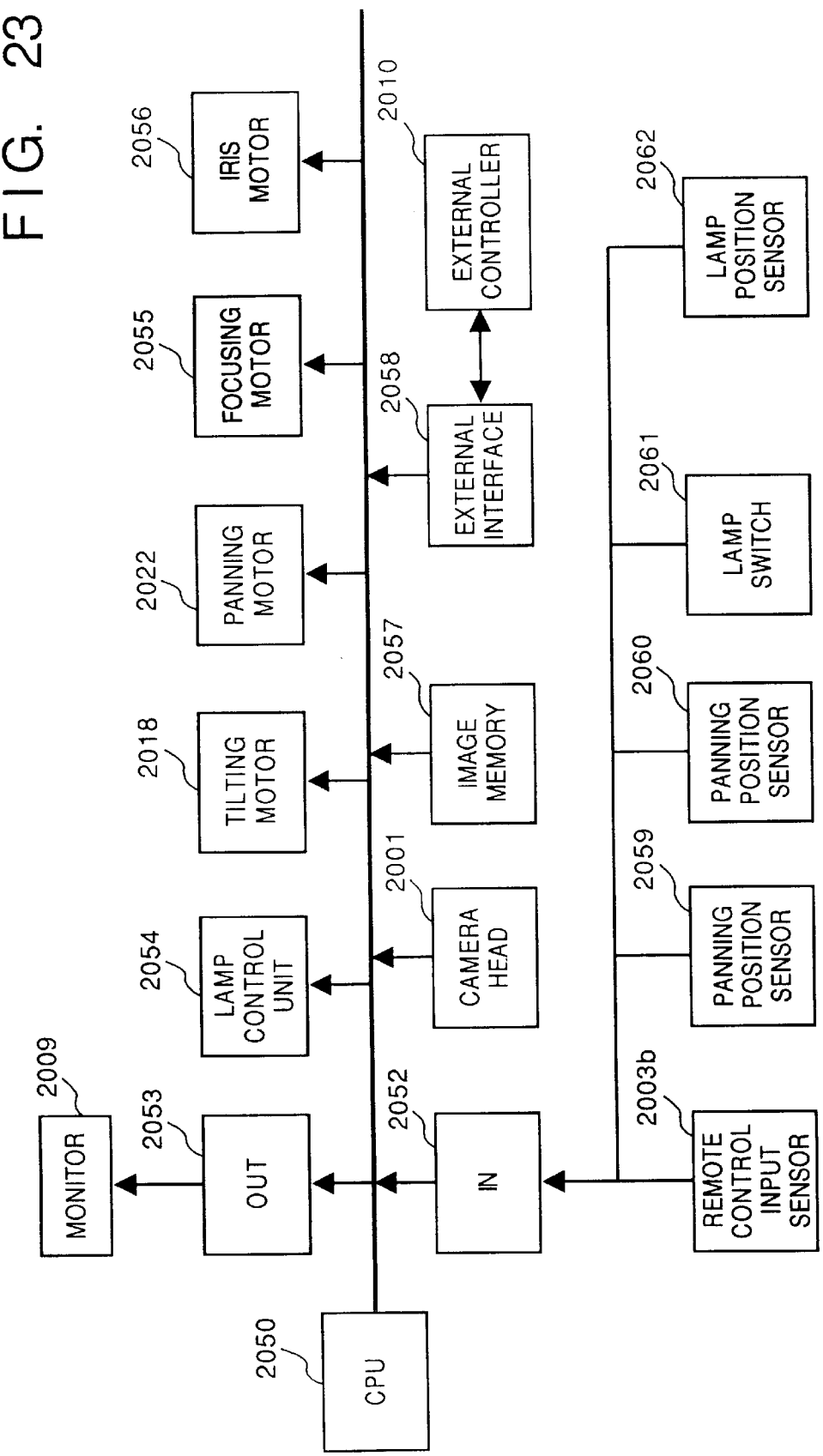
FIG. 23 is a block diagram showing the electrical arrangement of the image input apparatus according to the third embodiment.

FIG. 23 is a block diagram showing the electrical arrangement of the image input apparatus. Referring to FIG. 23, reference numeral 2050 denotes a CPU for controlling the overall apparatus; 2051, a CPU bus; 2052, an input port; 2053, an output port; 2054, a lamp control unit for controlling the light amount of the fluorescent lamp 2006; 2055, a focusing motor for moving a lens provided in the camera head 2001; 2056, an iris motor for opening/closing a stop provided in the camera head 2001; 2057, an image memory for temporarily storing an image sensed through the camera head 2001 and outputting the image in an upside-down state; 2058, an external interface; 2059, a panning position sensor for detecting the moving amount of the camera head 2001 in the panning direction; 2060, a tilting position sensor for detecting the moving amount of the camera head 2001 in the tilting direction; 2061, a lamp switch (SW) as the power switch of the illumination unit 2005; and 2062, a lamp position sensor for detecting the position of the illumination unit 2005.

Figure 24:
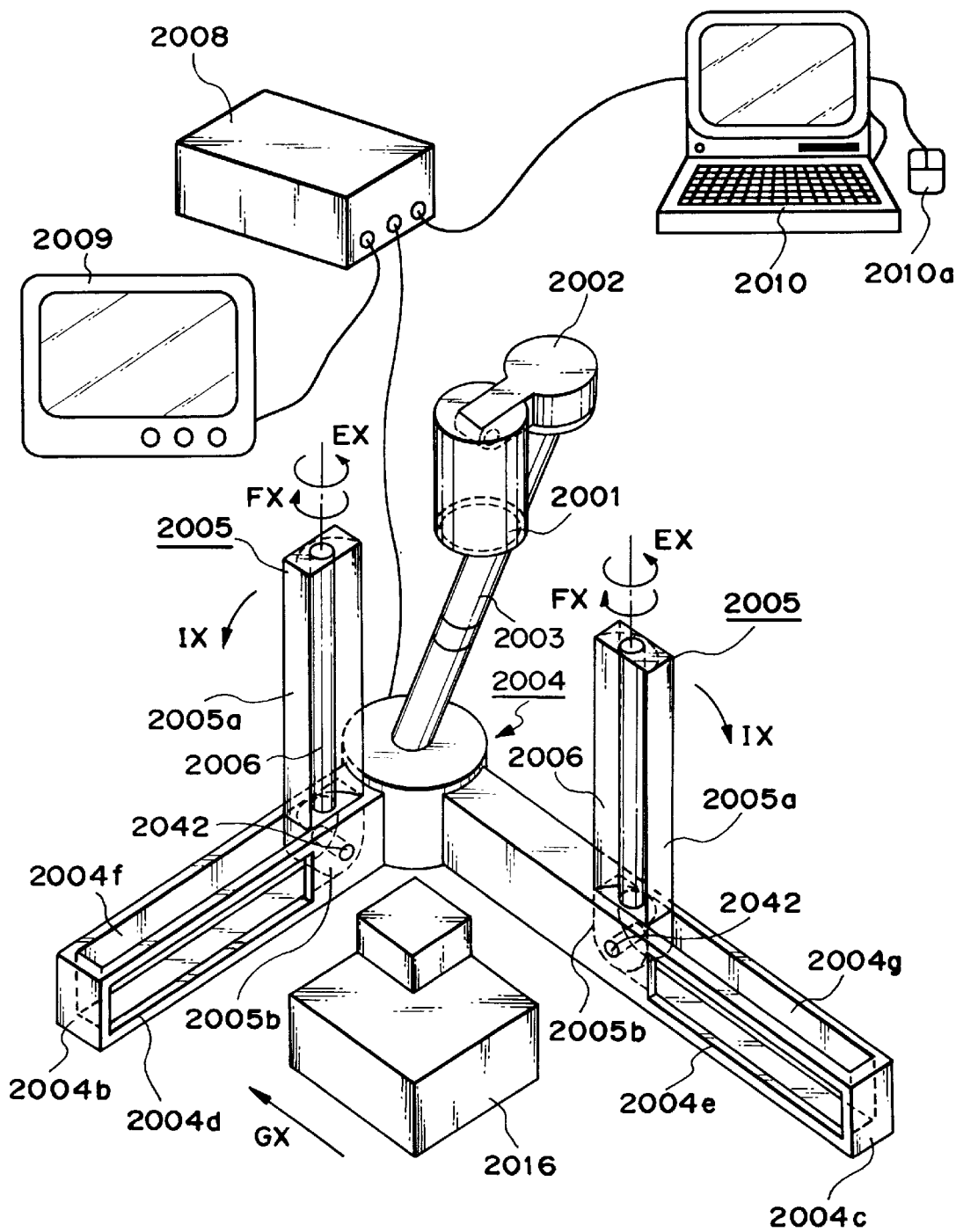
FIG. 24 is a perspective view showing the three-dimensional object sensing position of the image input apparatus in sensing a three-dimensional object.

FIG. 24 shows the document/image sensing position of the image input apparatus in sensing a three-dimensional object. Referring to FIG. 24, reference numeral 2016 denotes a three-dimensional object as an object to be sensed.

Figure 25:
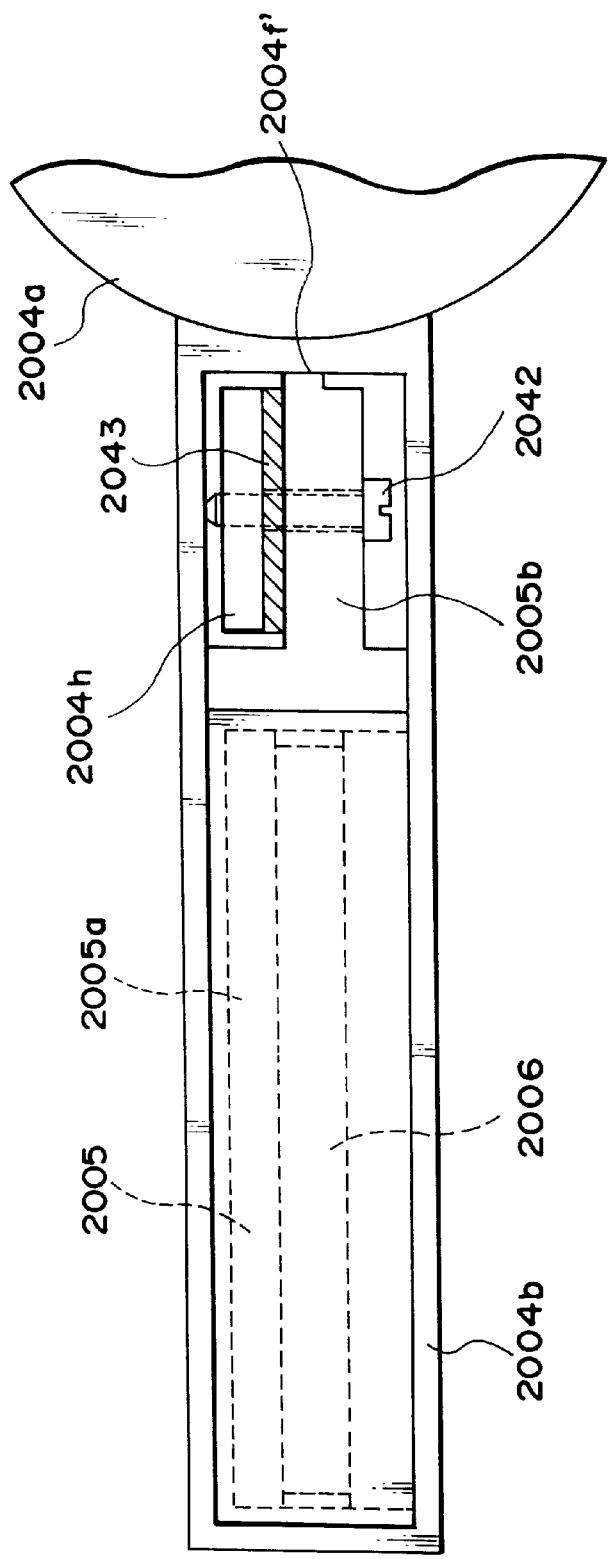
FIG. 25 is a view of an illumination unit 2005 taken along a direction HX in FIG. 22.

FIG. 25 is a view of the illumination unit 2005 taken along a direction HX in FIG. 22. Referring to FIG. 25, reference numeral 2042 denotes a shaft having a screw as a shaft portion; and 2043, a disk-like friction plate for keeping the illumination unit 2005 stationary at an arbitrary position.

Figure 26:
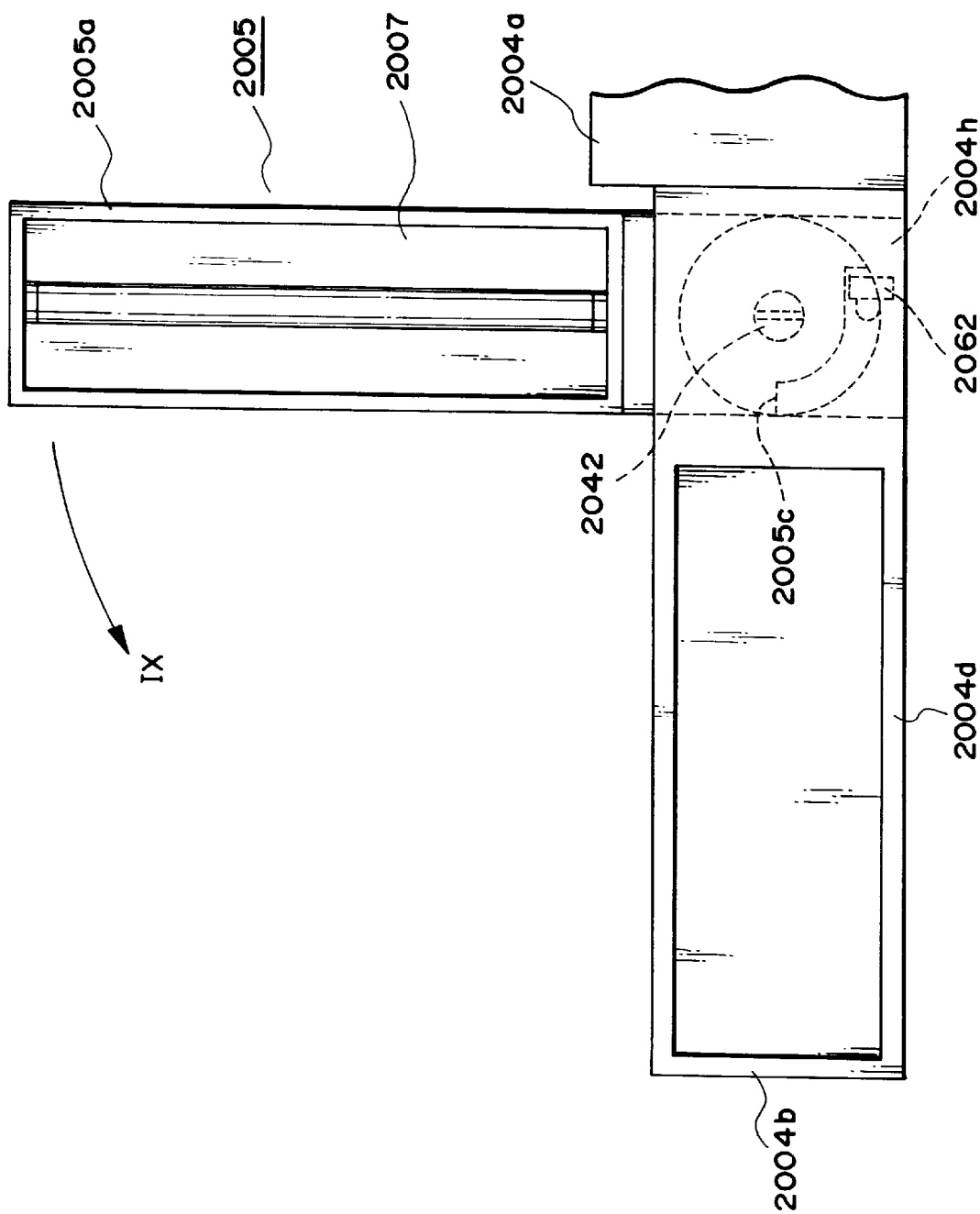
FIG. 26 is a view of the illumination unit 2005 taken along a direction GX in FIG. 24.

FIG. 26 is a view of the illumination unit 2005 taken along a direction GX in FIG. 24. Referring to FIG. 26, reference numeral 2005c denotes a groove portion formed in the rotating base 2005b to be brought into contact with the lamp position sensor 2062 when the illumination unit 2005 is positioned to be parallel to the table surface.

Figure 27:
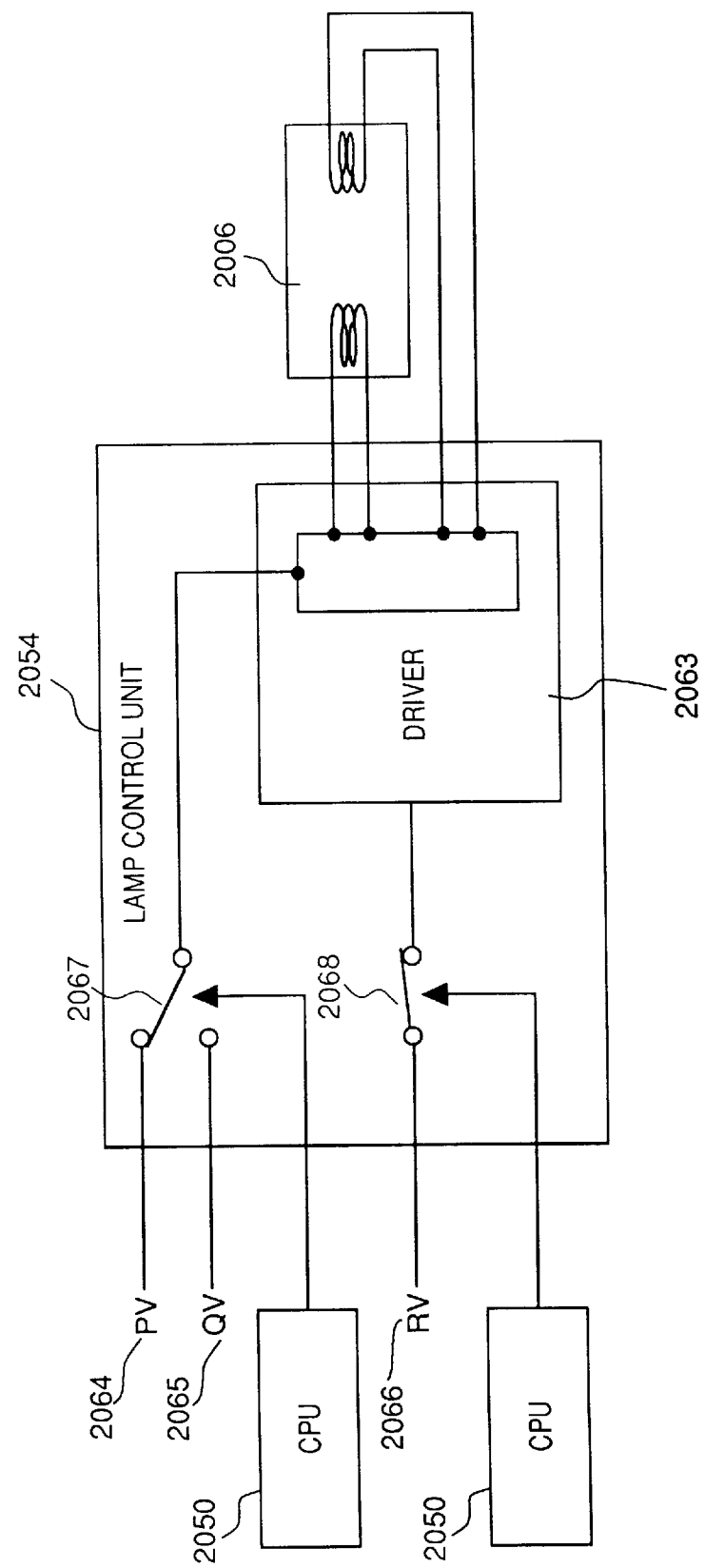
FIG. 27 is a block diagram showing the connection of a part of a lamp control unit 2054.

FIG. 27 is a block diagram showing the connection of a part of the lamp control unit 2054. Referring to FIG. 27, reference numeral 2063 denotes a driver for turning on the fluorescent lamp 2006; 2064, a lamp power supply of a voltage Pv; 2065, a lamp power supply of a voltage Qv; 2066, a driver power supply of a voltage RV; 2067, a switch; and 2068, a power switch for the driver.

Figure 28:
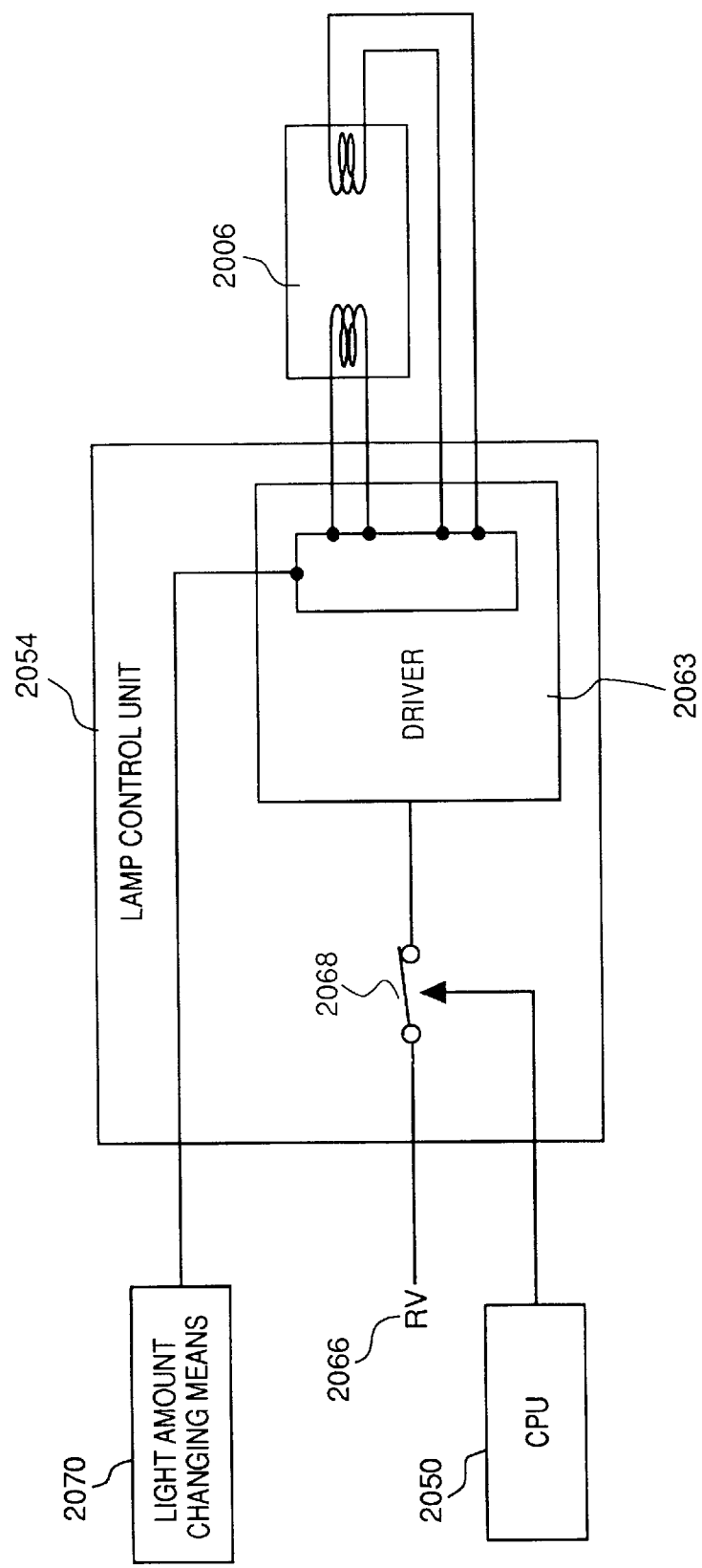
FIG. 28 is a block diagram showing the connection of another part of the lamp control unit 2054.

FIG. 28 is a block diagram showing the connection of another part of the lamp control unit 2054. Referring to FIG. 28, reference numeral 2070 denotes a light amount changing means for changing the light amount of the lamp.

Figure 29:
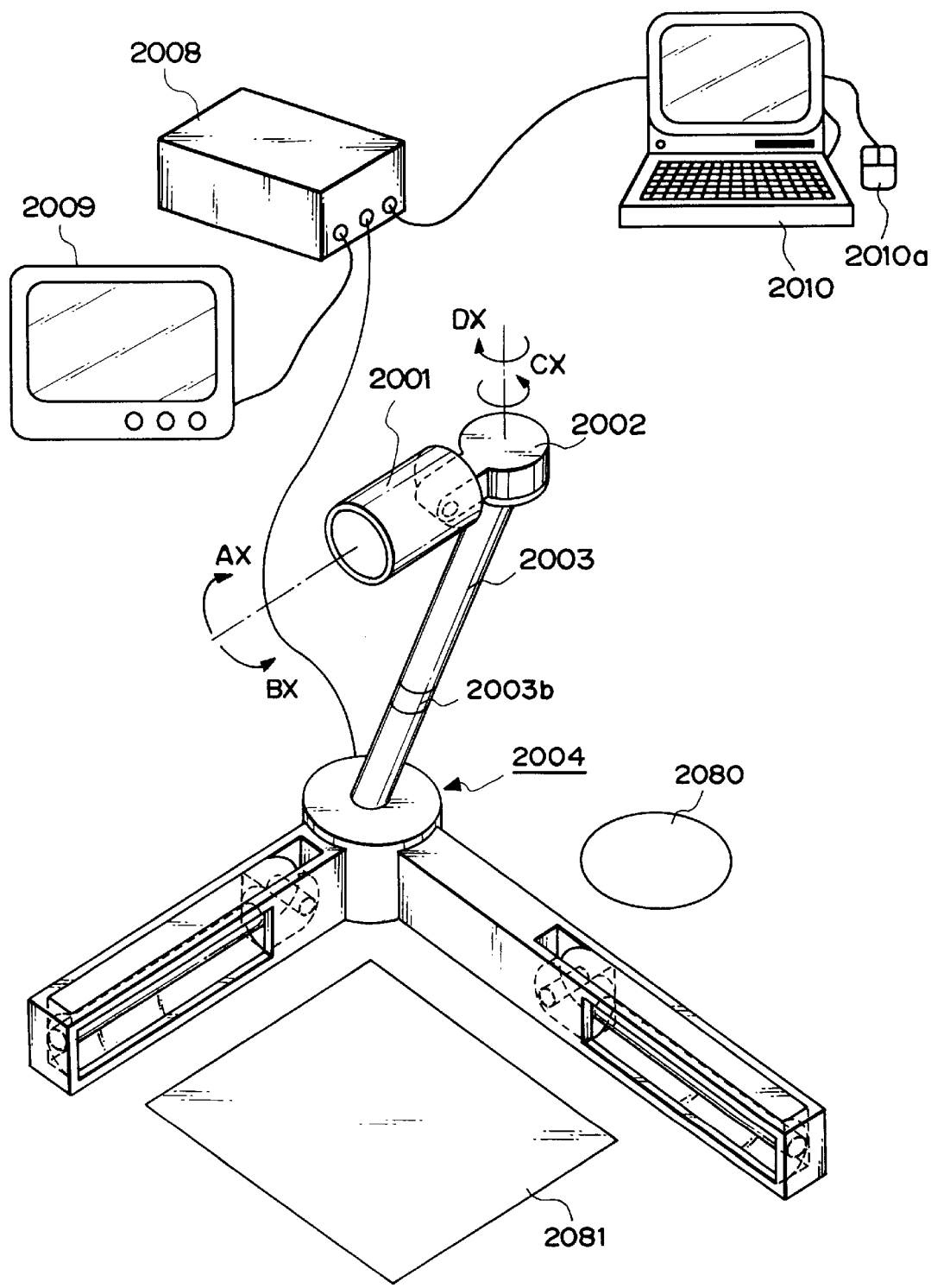
FIG. 29 is a perspective view showing the portrait sensing position of the image input apparatus.

FIG. 29 shows the portrait sensing position of the image input apparatus. Referring to FIG. 29, reference numeral 2080 denotes the position of the operator when he/she uses the apparatus; and 2081, a material as an object to be sensed.

Figure 30:
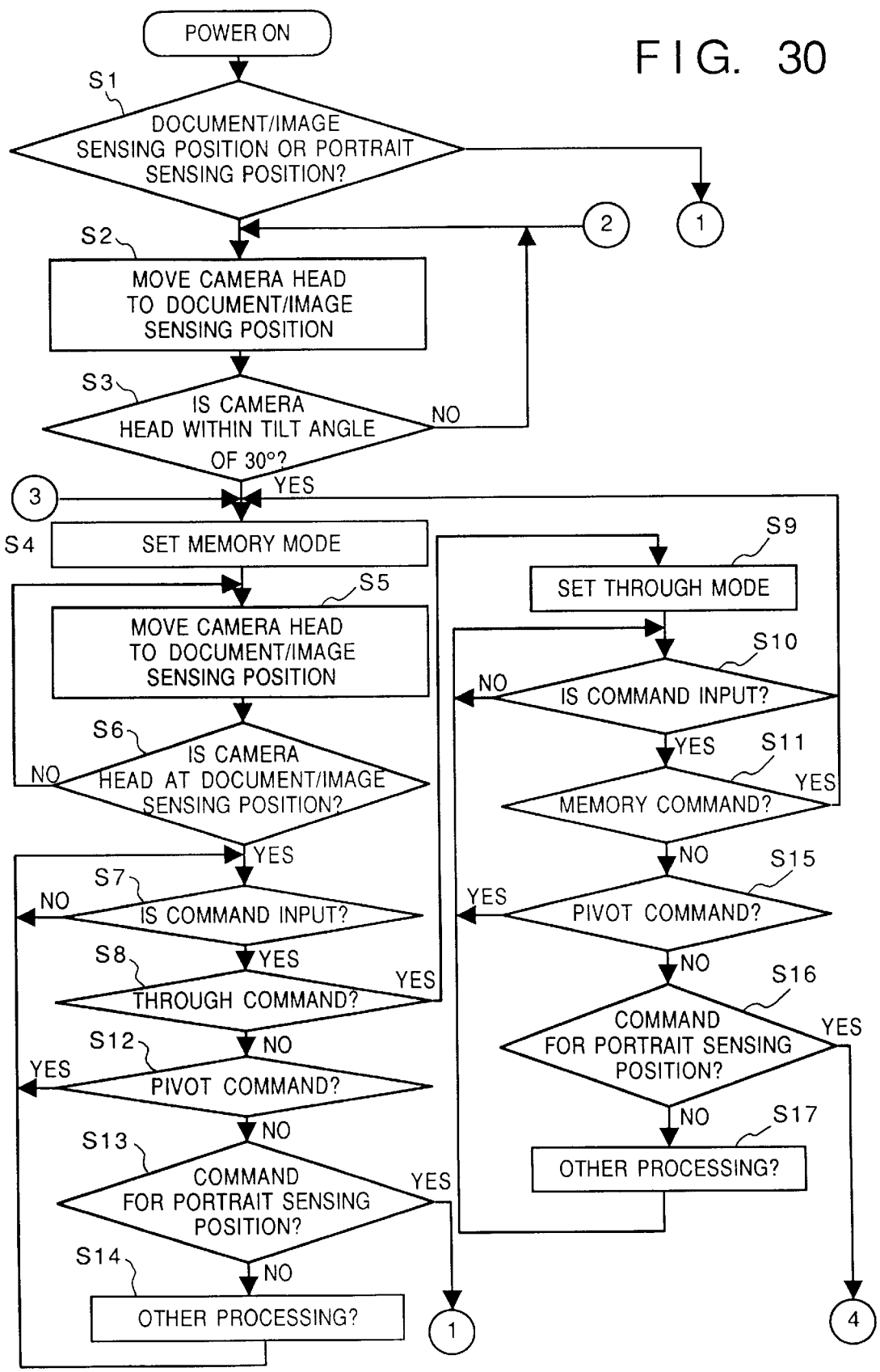
FIG. 30 is a flow chart showing an image sensing routine.
Figure 31:
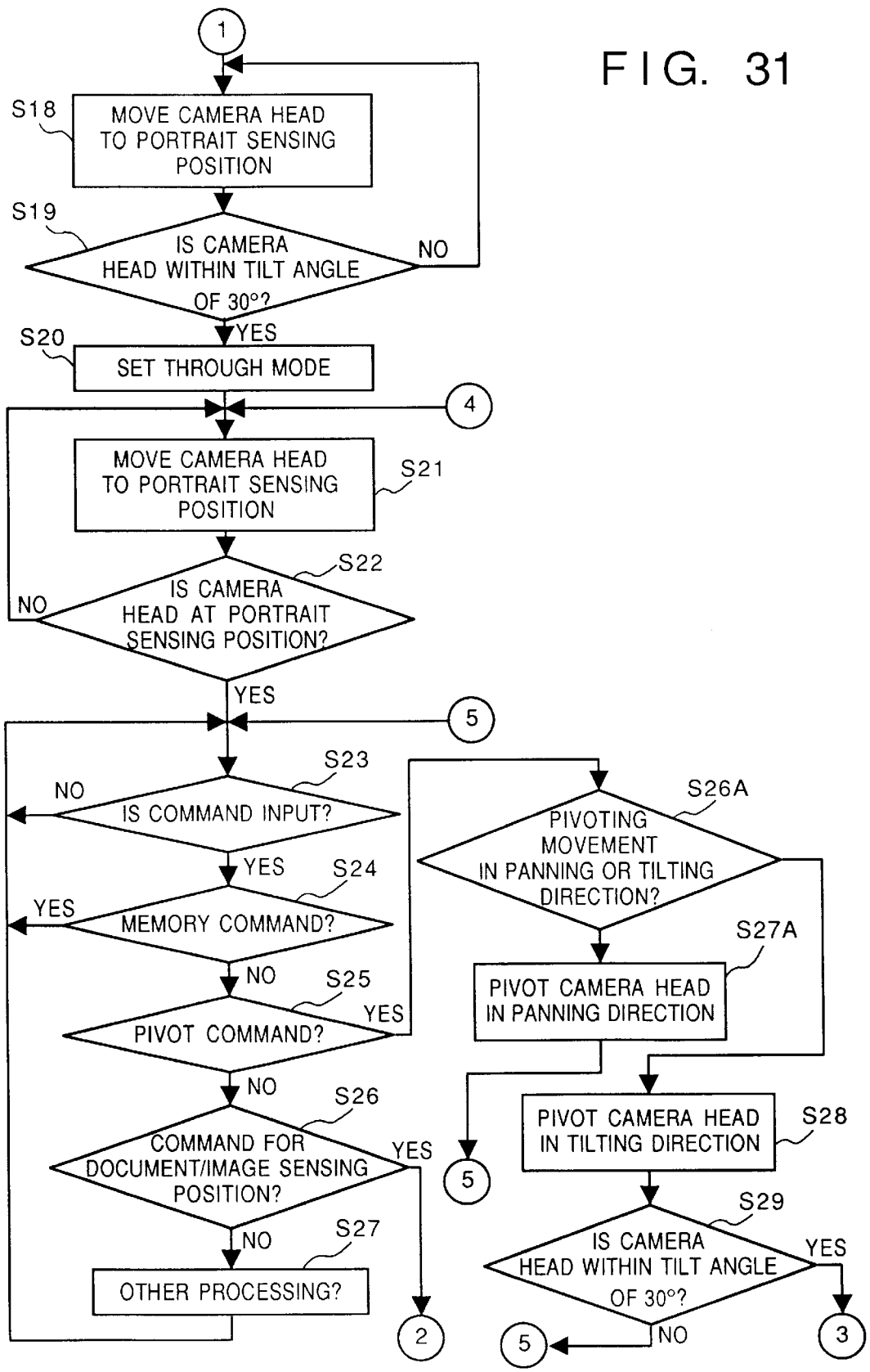
FIG. 31 is a flow chart showing an image sensing routine following the routine in FIG. 30.
Figure 32:
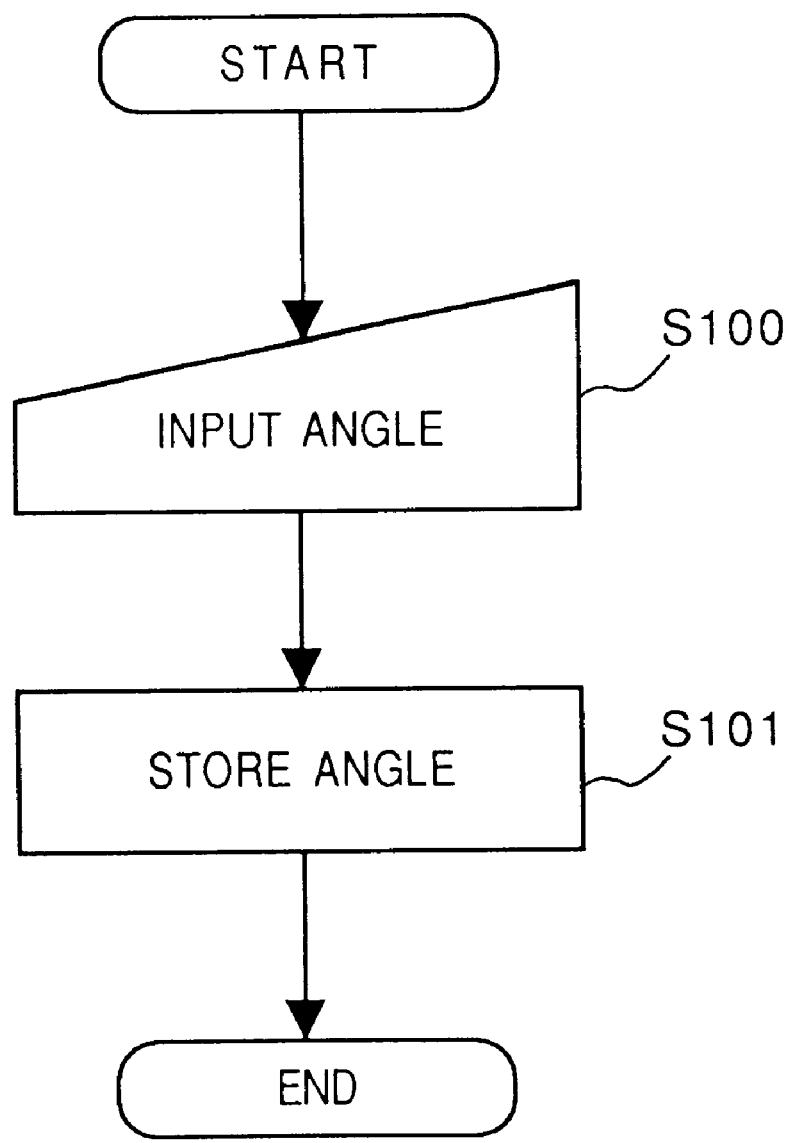
FIG. 32 is a flow chart showing an angle input routine.
Figure 33:
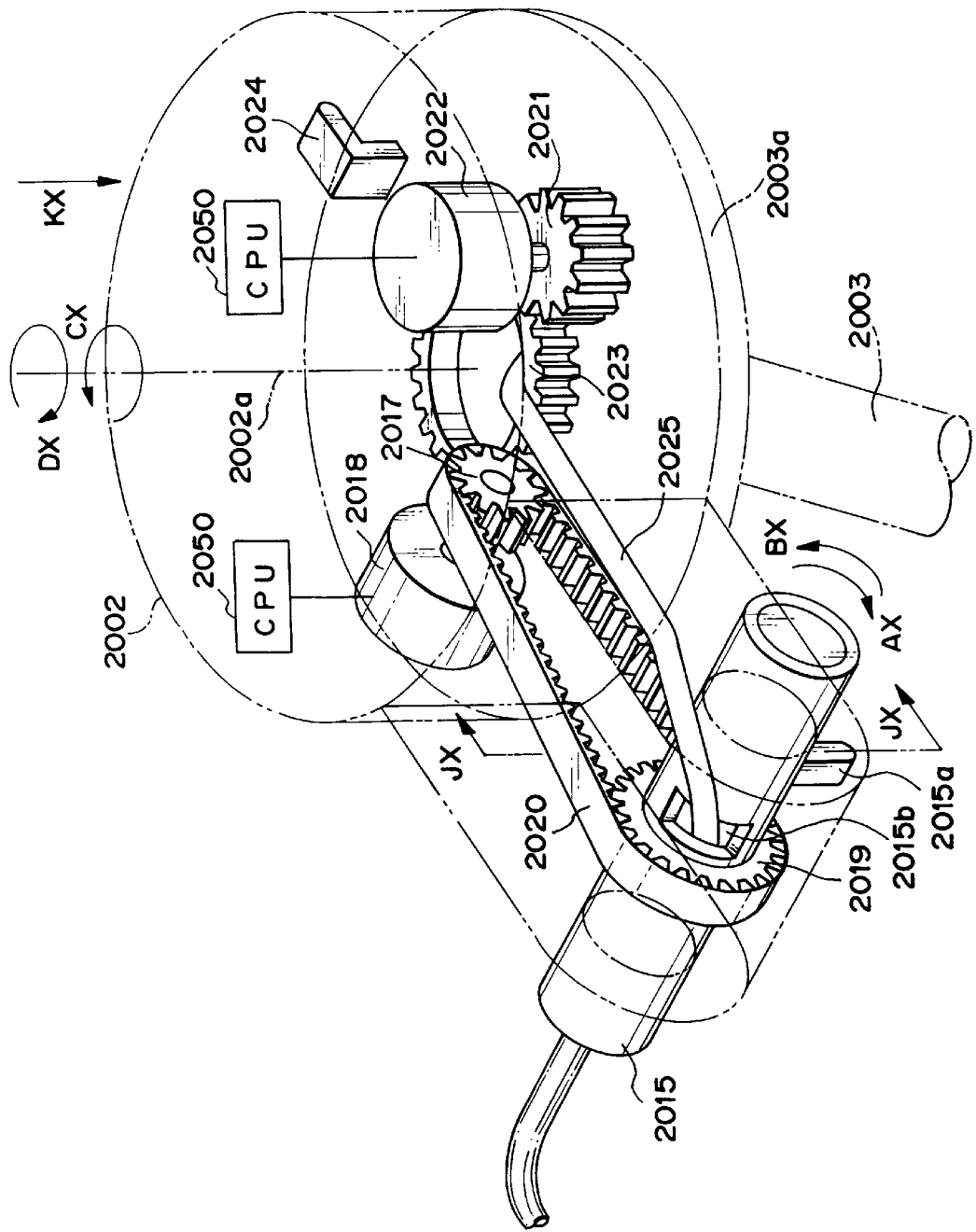
FIG. 33 is a perspective view schematically showing a panning means and a tilting means in a camera base 2002.

FIG. 30 is a flow chart showing an image sensing routine. FIG. 31 is a flow chart showing an image sensing routine following the routine in FIG. 30. FIG. 32 is a flow chart showing an angle input routine. FIG. 33 is a perspective view schematically showing a panning means and a tilting means in the camera base 2002. Referring to FIG. 33, the tilting shaft 2015 includes a tilting pawl 2015a, and a window 2015b which allows a cable 2025 from the camera head 2001 to pass. The tilting shaft 2015 is engaged with the camera head 2001 and pivotally supported by the camera base 2002.

Figure 34:
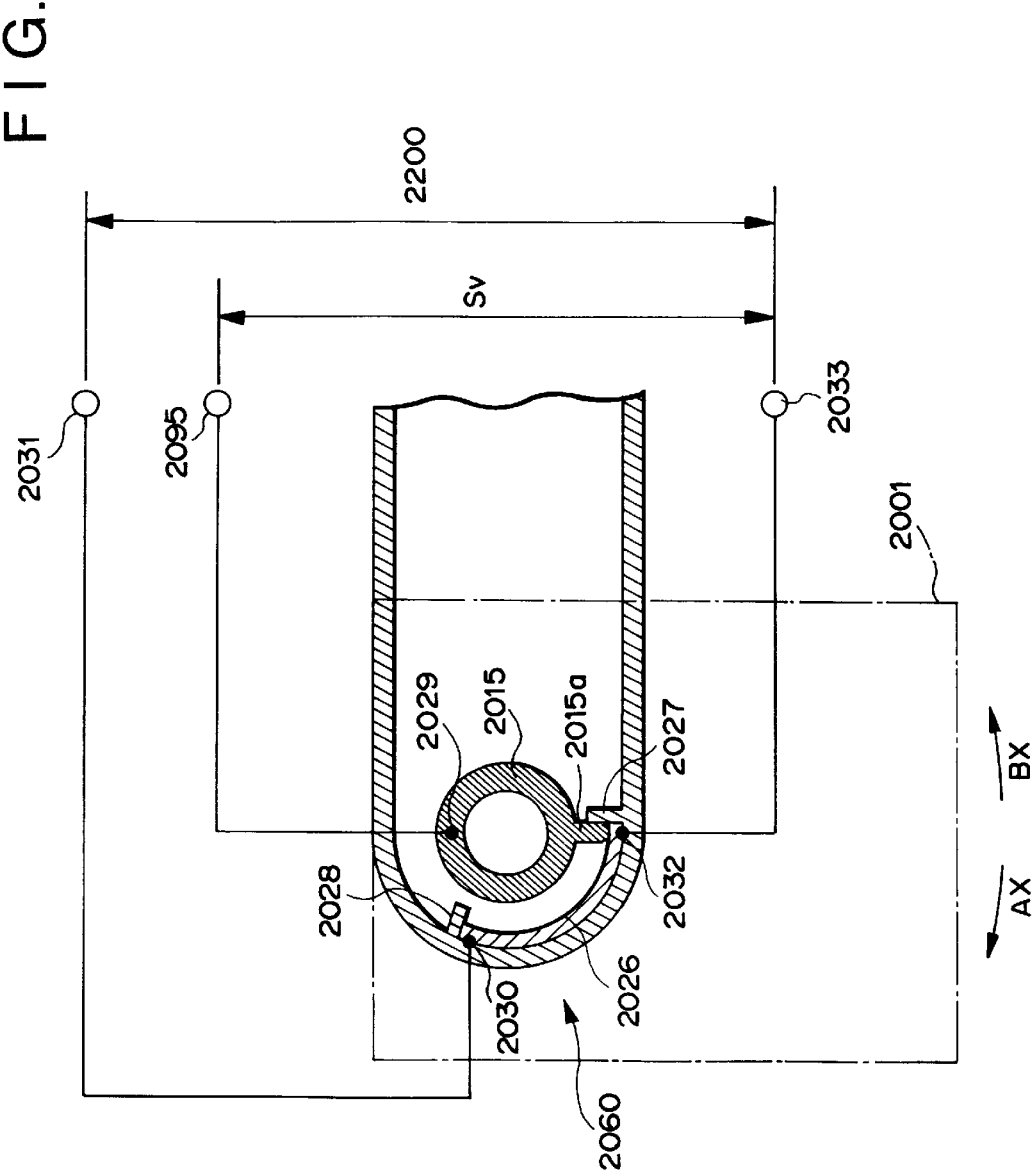
FIG. 34 is a sectional view taken along a line JX—JX of a tilting position sensor-in FIG. 33, which sensor is used to detect how much the camera head 2001 has pivoted in the tilting direction.

A tilting motor 2018 as a driving source for driving the tilting shaft 2015 in the directions AX and BX is controlled by the CPU 2050. Reference numeral 2017 denotes a gear pressed into the shaft portion of the tilting motor 2018; 2019, a gear fixed to the tilting shaft 2015 through a means (not shown); and 2020, a timing belt for coupling the gear 2017 to the gear 2019. A panning motor 2022 is controlled by the CPU 2050. Reference numeral 2021 denotes a gear pressed into the shaft portion of the panning motor 2022. These mechanisms are provided above the disk-like portion 2003a of the support portion 2003, and the cable 2025 extends through the mechanisms. Reference numeral 2023 denotes a gear-like portion having an outer peripheral portion meshed with the gear 2021; and 2024, a substantially L-shaped panning pawl provided on the disk-like portion 2003a of the support portion 2003. FIG. 34 is a sectional view taken along a line JX—JX of a tilting position sensor in FIG. 33, which sensor is used to detect how much the camera head 2001 has pivoted in the tilting direction. Referring to FIG. 34, reference numeral 2026 denotes a belt-like resistive element made of a uniform resistive component per unit volume; and 2027, a stopper which is provided in the camera base 2002 and is brought into contact with a tilting pawl 2015a to limit the pivoting movement of the camera head 2001 in a direction indicated by an arrow BX; 2029, a contact connected to the tilting shaft 2015 through a means (not shown); 2031, a terminal for connecting a contact 2030 to the power supply of a reference voltage 2200; 2032, a contact connected to the other end of the resistive element 2026; 2033, a terminal for connecting the contact 2032 to the power supply of the reference voltage 2200; 2060, a tilting position sensor which is constituted by the tilting pawl 2015a, the resistive element 2026, and the contacts 2029, 2030, and 2032 and adapted to detect the position of the camera head 2001 from a change in the voltage generated between a terminal 2095 and the terminal 2033; 2095, the terminal for connecting the contact 2029 to the CPU 2050; and 2200, the reference voltage from the power supply (not shown).

Figure 35:
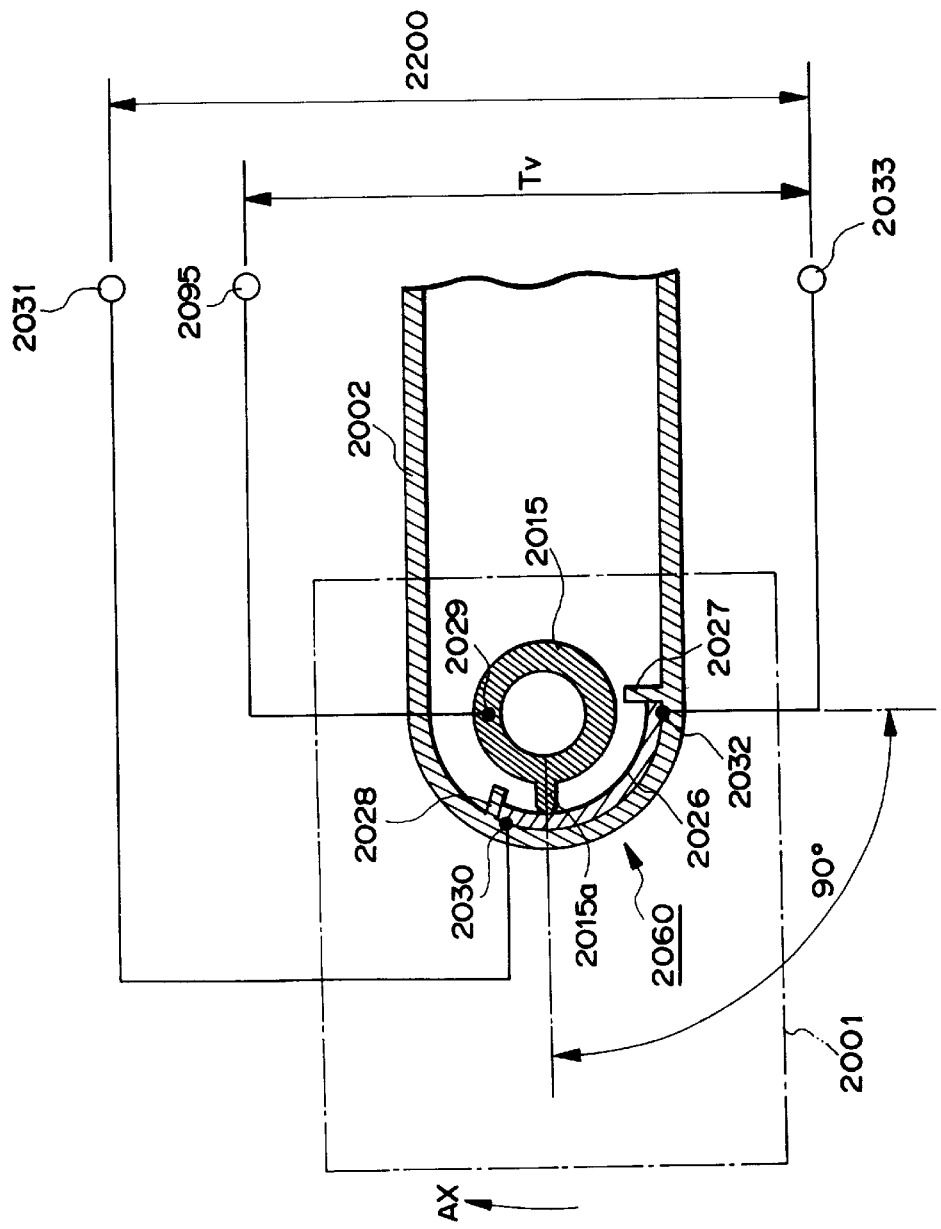
FIG. 35 is a sectional view showing a state wherein the camera head 2001 has pivoted from the position in FIG. 34 to the initial position of the portrait sensing position.

FIG. 35 shows a state wherein the camera head 2001 has pivoted from the position in FIG. 34 to the initial position of the portrait sensing position.

Figure 36:
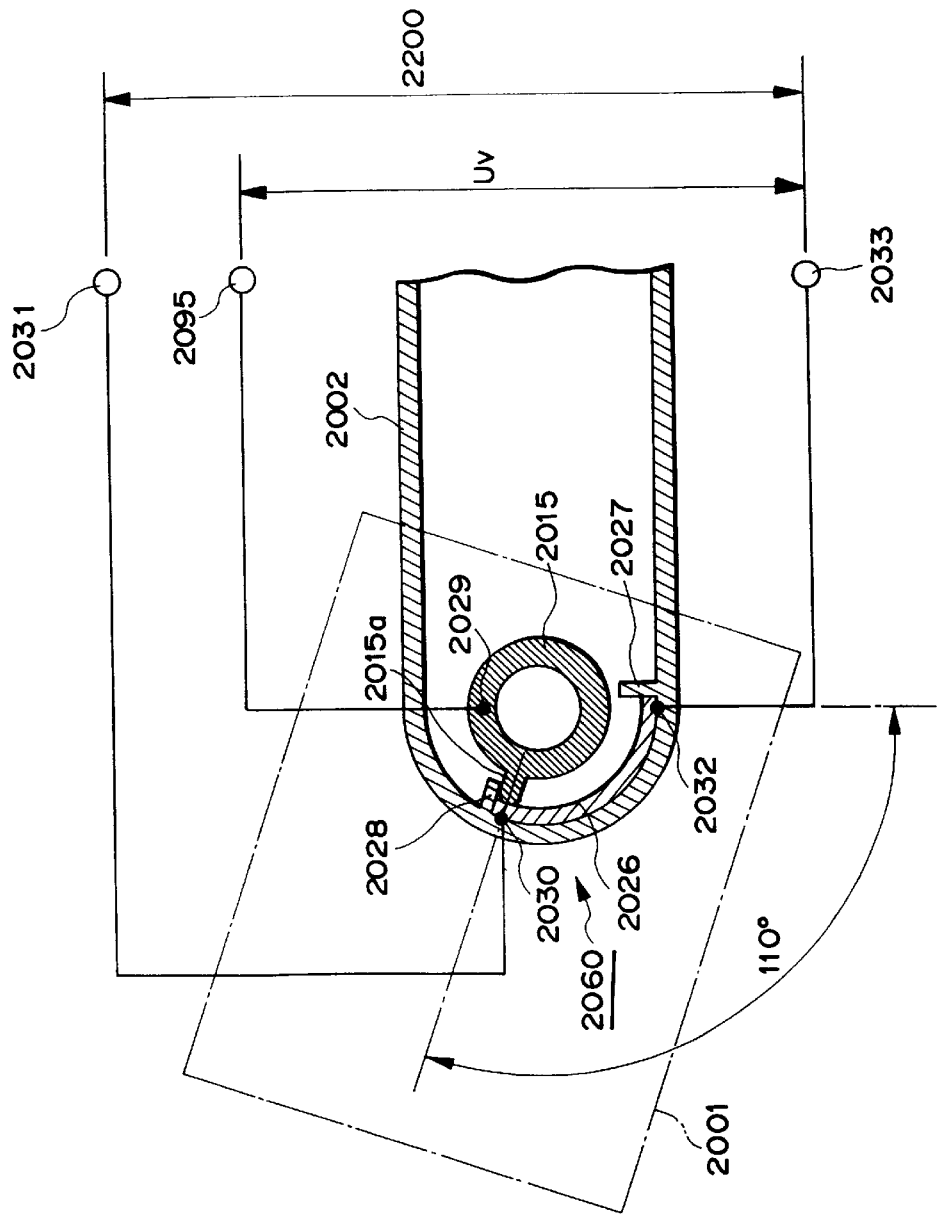
FIG. 36 is a sectional view showing a state wherein the camera head 2001 has pivoted from the position in FIG. 35 to the upper limit position of the portrait sensing position.

FIG. 36 shows a state wherein the camera head 2001 has pivoted from the position in FIG. 35 to the upper limit position of the portrait sensing position.

Figure 37:
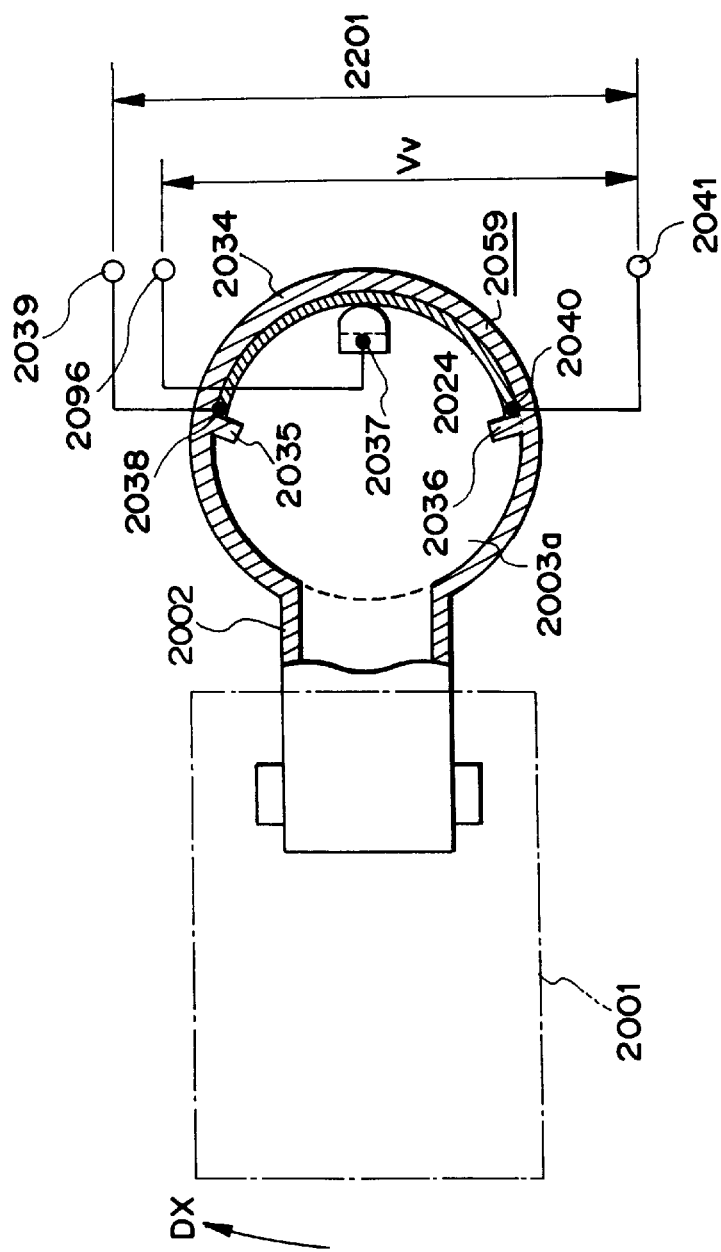
FIG. 37 is a sectional view showing a panning position sensor provided on the camera base 2002, when viewed from a direction indicated by an arrow KX in FIG. 33, to explain the panning position sensor for detecting how much the camera head 2001 has pivoted in the panning direction.

FIG. 37 is a sectional view showing a panning position sensor provided on the camera base 2002, when viewed from a direction indicated by an arrow KX in FIG. 33, to explain the panning position sensor for detecting how much the camera head 2001 has pivoted in the panning direction. Referring to FIG. 37, reference numeral 2034 denotes a belt-like resistive element made of a uniform resistive component per unit volume; 2035 and 2036, stoppers which are provided in the camera base 2002 and brought into contact with the panning pawl 2024 to prevent the camera head 2001 from pivoting exceeding a predetermined amount in the panning direction; 2037, a contact connected to the panning pawl 2024; 2038, a contact connected to one end of the resistive element 2034; 2039, a contact connected to the other end of the contact 2038; 2040, a contact connected to the other end of the resistive element 2034; 2041, a terminal for connecting the contact 2040 to a power supply for a reference voltage 2201; 2059, a panning position sensor which is constituted by the panning pawl 2024, the resistive element 2034, and the contacts 2037, 2038, and 2040 and adapted to detect the position of the camera head 2001 from a change in the voltage generated between a terminal 2096 and the terminal 2041; 2096, a terminal for connecting the contact 2037 to the CPU 2050; and 2201, the reference voltage from the power supply (not shown).

Figure 38:
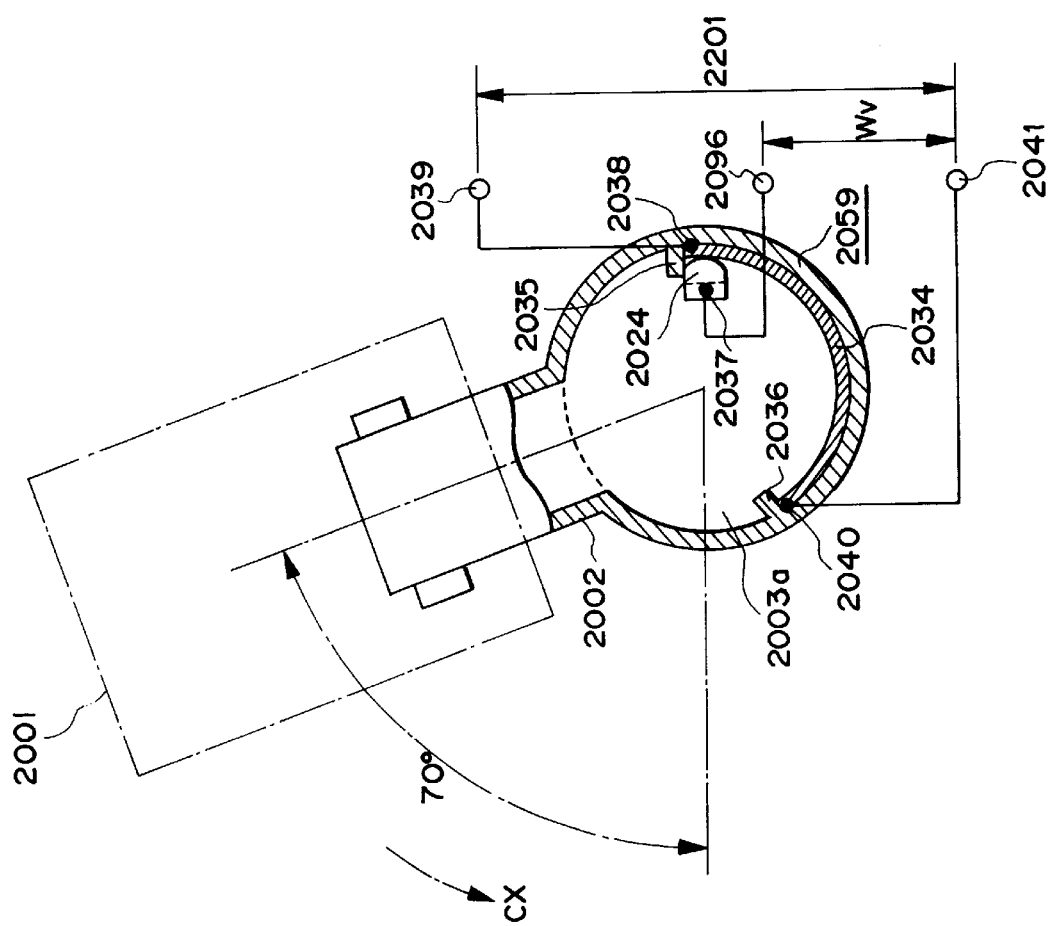
FIG. 38 is a sectional view showing a state wherein the camera head 2001 has fully pivoted from the position in FIG. 37 clockwise in the panning direction by a predetermined amount.

FIG. 38 shows a state wherein the camera head 2001 has fully pivoted from the position in FIG. 37 clockwise in the panning direction by a predetermined amount.

The operation of the image input apparatus of this embodiment will be described next. When the operator turns on the power switch (not shown) of the control box 2008 and the lamp switch 2061 of the illumination unit 2005, he/she selects a command for image sensing with the camera head 2001 being set in an almost vertically downward position through a remote controller (not shown) or the external controller 2010.

When the command is selected, the CPU 2050 causes the camera head 2001 to pivot to the position in FIG. 22 in accordance with the following sequence, and performs the following operations (1) to (4).

(1) A signal is output to the lamp control unit 2054 to turn on the fluorescent lamp 2006 upon switching the lamp to the lamp light amount for an original. Light from the fluorescent lamp 2006 is irradiated on the original 2014 through lamp windows 2004d and 2004e respectively formed in the leg portions 2004b and 2004c of the base 2004.

(2) An iris motor 2056 provided for the camera head 2001 is driven to a position corresponding to a predetermined aperture.

(3) A focusing motor 2055 provided on the camera head 2001 is driven to focus the camera on the original 2014.

(4) An image input from the camera head 2001 is temporarily stored in the image memory 2057 to be output in an upside-down or inverted state (generally, a memory mode). In general, since the operator is located at the position 2090 in FIG. 22, the original 2014 is placed with its upper side being located on the leg portions 2004b and 2004c side of the base 2004, as shown in FIG. 22. The camera head 2001 senses the original 2014 to display the original 2014' on the monitor 2009. Assume that in this state, the camera head 2001 is pivoted in the direction indicated by the arrow AX to be set in an almost horizontal position, and the operator is sensed. In this case, an image of the operator is displayed on the monitor 2009 with the head of the operator located on the lower side, i.e., an upside-down image is displayed.

In the image input apparatus of this embodiment, when the camera head 2001 is set in an almost horizontal position, an image is displayed on the monitor 2009 without the mediacy of the image memory 2057 (generally, a through mode), whereas when the camera head 2001 is set in an almost vertically downward position, an image is displayed on the monitor 2009 with the image being set upsidedown through the image memory 2057, thereby solving the above problem.

The above operation is performed for the following reason. When an image is output with the image being set upsidedown through the image memory 2057, a certain time lag occurs. In consideration of this time lag, when the camera head 2001 is set in an almost horizontal position (to be referred to as a portrait sensing position hereinafter), moving images tend to be input, whereas when the camera head 2001 is set in an almost vertically downward position (to be referred to as a document/image sensing position hereinafter), still images tend to be input. That is, the influence of the time lag on the apparatus at the document/image sensing position is assessed to be smaller than at the portrait sensing position. However, the memory mode may be set when the camera head 2001 is at the portrait sensing position, and the through mode may be set when the camera head 2001 is at the document/image sensing position.

After operations (1) to (4) described above, the original 2014 sensed as an image by the camera head 2001 is displayed on the monitor 2009 and/or the external controller 2010. Referring to FIG. 22, the monitor 2009 and the external controller 2010 are connected to the apparatus. However, an image can be displayed on only one of the above devices.

The image input apparatus of this embodiment can sense not only a flat object such as an original but also a three-dimensional object. This operation will be described below. Referring to FIG. 24, the three-dimensional object 2016 is placed in the image sensing range instead of the original 2014. The two illumination units 2005 form a shadow of the three-dimensional object 2016 when the units are located at the positions in FIG. 22. For this reason, the operator pivots the illumination units 2005, with his/her hand, about the shafts 2042 to the positions in FIG. 24 through square windows 2004f and 2004g formed in the leg portions 2004b and 2004c of the base 2004. At this time, the CPU 2050 detects signals indicating the states of the lamp position sensors 2062 (micro SWs in this embodiment) respectively provided on the leg portions 2004b and 2004c of the base 2004, and determines that the three-dimensional object 2016 is to be sensed.

Upon determining that the three-dimensional object 2016 is to be sensed, the CPU 2050 performs the following operations (5) to (8): (5) outputting a signal to the lamp control unit 2054 to switch to the lamp light amount for a three-dimensional object and turn on the fluorescent lamp 2006; (6) driving the iris motor 2056 (not shown) provided in the camera head 2001 to move the camera head 2001 to a position corresponding to a predetermined aperture; (7) driving a focusing motor 2055 (not shown) provided at the camera head position to focus the camera on the three-dimensional object 2016; and (8) temporarily storing an image input from the camera head 2001 into the image memory 2057, and reading out the image in an upside-down state.

Operation (6) described above is performed to stop down the stop to increase the depth of field in sensing a three-dimensional object so as to focus the camera on the overall three-dimensional object. Since the light amount becomes insufficient with stopping down of the stop, the lamp light amount of the illumination unit 2005 is increased to the lamp light amount for a three-dimensional object so as to prevent an insufficient light amount, as in operation (5) described above. When the illumination units 2005 are in the positions in FIG. 24, a desired lighting condition may not be obtained depending on the shape of the three-dimensional object 2016. For example, a shadow may be formed. In this case, since each box portion 2005a can be pivoted almost about the fluorescent lamp 2006 with respect to the rotating base 2005b in a direction EX as the counterclockwise direction and in a direction FX as the clockwise direction in FIG. 24 through a means (not shown), the operator can pivot each box portion 2005a, with his/her hand, to a position where a desired lighting condition can be obtained.

In pivoting each illumination unit 2005 in a direction indicated by an arrow IX, the illumination unit 2005 can be arbitrarily positioned within its pivoting range. The operator therefore pivots each illumination unit 2005 whose light amount has been increased to a position where a desired lighting condition can be obtained. With this operation, the three-dimensional object 2016 is sensed as an image by the camera head 2001 at a proper light amount to be displayed on the monitor 2009 and/or the external controller 2010. The pivoting movement of the illumination units 2005 and the lamp position sensors 2062 will be described below with reference to FIGS. 25 and 26. Referring to FIG. 26, an almost semicircular fixed portion 2004h has a screw hole in an almost middle portion and is formed on the leg portion 2004b.

With this arrangement, the operator can pivot each illumination unit 2005 about the shaft 2042, and can hold the illumination unit 2005 at an arbitrary position with the frictional force of the friction plate 2043. In general, in sensing a three-dimensional object, each illumination unit 2005 is pulled upward to the direction of the upper surface of the drawing until the unit is brought into contact with an end side portion 2004f' of the square window 2004f so as to be set in the state shown in FIG. 24. FIG. 26 shows the illumination unit 2005 pivoted to the position in FIG. 24 when viewed from the direction indicated by the arrow GX. Referring to FIG. 26, the position of the illumination unit 2005 is held by the frictional force of the friction plate 2043 (synthetic leather in this embodiment) so as not to pivot in the direction indicated by the arrow IX by its own weight.

When the illumination unit 2005 is pulled upward, the groove portion 2005c formed in the rotating base 2005b is separated from the lamp position sensor 2062, and the lamp position sensor 2062 is turned off. The CPU 2050 then detects that the illumination unit 2005 has pivoted to the position for a three-dimensional object, and outputs a signal to the lamp control unit 2054 to switch the lamp light amount to the lamp light amount for a three-dimensional object and turn on the fluorescent lamp 2006.

This lamp light amount switching operation will be described with reference to FIG. 27. FIG. 27 shows the connection of the lamp control unit 2054 in a case wherein the illumination unit 2005 pivots to the position for a three-dimensional object. In response to an ON signal from the lamp SW 2061 (not shown), the CPU 2050 turns on the power supply SW 2068 to apply a voltage (+5 V in this embodiment) from the driver power supply 2066 to the driver 2063 of the lamp control unit 2054. In addition, in response to a signal from the lamp position sensor 2062, the CPU 2050 switches the switch 2067 to the lamp power supply 2064. Since the voltages from the lamp power supply 2064 and the lamp power supply 2065 have a relationship indicated by Pv>Qv, the light amount of the fluorescent lamp 2006 is increased more by switching to the lamp power supply 2064 than by connecting the fluorescent lamp 2006 to the lamp power supply 2065.

In contrast to this, when the illumination unit 2005 is restored to the position in FIG. 22, the groove portion 2005c of the rotating base 2005b is brought into contact with the lamp position sensor 2062, and the lamp power supply 2064 is turned on. The CPU 2050 then switches the switch 2067 to the lamp power supply 2065. With this operation, the fluorescent lamp 2006 is turned on at the light amount for an original. Although the illumination unit 2005 of the leg portion 2004b has been described above, the same applies to the leg portion 2004c.

As shown in FIG. 28, if the light amount changing means 2070 is provided instead of the lamp power supplies 2064 and 2065 and the switch 2067, the operator can obtain an arbitrary lamp light amount by changing the lamp light amount using the light amount changing means 2070. With this light amount changing means 2070, the operator adjusts the lamp light amount while watching the monitor to obtain an optimal image. As the light amount changing means 2070, the following means can be used.

For example, (A) a general variable voltage power supply is used to change the lamp power supply voltage. (B) A variable resistor is connected in series with a general constant voltage power supply, and the resistance of the variable resistor is changed to change the lamp power supply voltage. (C) A general variable current supply is used to change the current supplied from the lamp power supply. The apparatus body may include switches or a remote controller for operating these means so that the operator can arbitrarily adjust the lamp light amount.

The image input apparatus of this embodiment inhibits pivoting movement of the camera head 2001 when the camera head 2001 is at the document/image sensing position. This operation will be described below. When the camera head 2001 is at the document/image sensing position, the operator senses an original or a three-dimensional object. If the operator unintentionally pivots the camera head 2001 in one of the directions indicated by the arrows AX, BX, CX, and DX in FIG. 22, a distorted or inclined image is displayed on the monitor. The operator therefore must set the camera head 2001 in a correct position again.

In the image input apparatus of this embodiment, when the operator sets the camera head 2001 at the document/image sensing position through the remote controller or the external controller, the CPU 2050 inhibits pivoting movement of the camera head 2001 to prevent an operation error.

This inhibited state can be released by inputting a command for causing the camera head 2001 to pivot to the portrait sensing position using the remote controller (not shown) or the external controller 2010. This operation will be described with reference to a case wherein the remote controller is used. Light irradiated from the light-emitting portion of the remote controller (not shown) is incident on the remote controller light-receiving portion 2003b provided at the support portion 2003. The remote controller light-receiving portion 2003b outputs a signal to the CPU 2050.

Referring to FIG. 23, (a) in response to the signal, the CPU 2050 drives the tilting motor 2018 to pivot the camera head 2001 in the direction indicated by the arrow AX in FIG. 22. Since the CPU 2050 can detect the pivoting amount of the camera head 2001 in the direction indicated by the arrow AX from a signal from the tilting position sensor 2060 (to be described later), driving of the tilting motor 2018 is stopped at the position of the tilting position sensor 2060 when the optical axis of the external controller 2010 becomes parallel to the table surface.

(b) The power switch 2068 in FIG. 27 is turned off to turn on the fluorescent lamp 2006.

This operation is required for the following reason. One of the two illumination units 2005 faces an object to be sensed regardless of whether the unit is located at the position in FIGS. 22 or 24. In addition, at either of the positions, the illumination unit irradiates the object from below with bright light. The resultant image displayed on the monitor is different from the one desired by the operator.

(c) When the position of the camera head 2001 is changed from the document/image sensing position for a three-dimensional object to the portrait sensing position, the iris motor 2056 is driven to a position corresponding to a predetermined aperture. This is because the stop of the camera head 2001 is stopped down at the document/image sensing position for a threedimensional object, and a lack of light amount occurs at this position. The CPU 2050 always checks a signal from the tilting position sensor 2060 (to be described later) to recognize the position of the camera head 2001. With this operation, when the camera head 2001 pivots from the position in FIG. 22 through a predetermined angle (30° in this embodiment) in the direction indicated by the arrow AX, an image is directly output to the monitor 2009 or the external controller 2010 (generally called a through mode) in response to a signal from the tilting position sensor 2060 without the mediacy of the image memory 2057. This operation is performed to prevent the image from being-set upsidedown, as described above.

As described above, at the portrait sensing position in FIG. 29, the operator is sitting on a chair in front of the camera head 2001, and hence an image of the operator is displayed on the monitor. When the apparatus is used in the following condition, and inversion of an image is performed at the above predetermined position, some inconvenience may be experienced. Assume that the camera head 2001 is set to face a participant in a lecture or the like while the camera head 2001 is placed on a table in the state shown in FIG. 29, and the operator stands at the position 2080 on the leg portion 2004c side of the base 2004. For example, while the face of a participant who has asked a question is displayed on the monitor, the operator tries to answer the question.

When the operator inputs a command for pivoting the camera head 2001 to the document/image sensing position to answer the question by using a material, the camera head 2001 pivots in the direction indicated by the arrow BX in FIG. 29, and inversion of an image is performed by the image memory 2057 at a predetermined position, as described above. In order to allow the participant to read the material 2081 displayed on the monitor, the operator must set the material 2081 in the vertical position shown in FIG. 29 within the image sensing range. In this case, since the operator is standing at the position 2080 on the leg portion 2004c of the base 2004 as described above, the operator must read the inverted material 2081.

For this reason, the image input apparatus of this embodiment is designed to inhibit the above inversion of an image as needed. That is, an image can be displayed on the monitor in the through mode without the mediacy of the memory. With this function, the operator can place the material 2081 in the image sensing range with the material being set in the opposite vertical position to that in FIG. 29, and hence can read the material 2081 from the position 2080 on the leg portion 2004c side. In this embodiment, inhibition of the above inversion of an image is performed by using a command on software which is selected by the remote controller or the external controller, as will be described in detail later. However, the present invention is not limited to this. Although the above description is associated with the remote controller, the same applies to a case wherein the external controller 2010 is used, except that the external controller 2010 outputs a signal to the CPU 2050.

The above pivoting movement of the camera head 2001 and inversion of an image will be described below with reference to the flow charts in FIGS. 30 and 31. Referring to FIG. 30, when the power supply is turned on, and a command for an image sensing operation at the document/image sensing position is selected with the remote controller (not shown) or the external controller 2010 (step S1), the camera head 2001 pivots toward the document/image sensing position (step S2). When the camera head 2001 comes to a position A'X of 30° from the vertical direction in FIG. 22 (step S3), an image is inverted by the image memory, i.e., the memory mode is set (step S4), and the camera head 2001 is pivoted to the document/image sensing position (step S5). The CPU 2050 always checks the position of the camera head 2001. When the camera head 2001 comes to the document/image sensing position (step S6), the CPU 2050 senses an object, such as an original or a three-dimensional object, in a command wait state (step S7). The CPU 2050 then executes the following operations (11) to (17) in accordance with an input command.

(11) When an image inversion inhibition command, i.e., a command for switching the memory mode to the through mode, is input (step S8), the CPU 2050 sets the through mode (step S9) and senses an object such as an original or a three-dimensional object in a command wait state (step S10). When an image inversion command, i.e., a command for switching the through mode to the memory mode, is input (step S11), the CPU 2050 sets the memory mode (step S4), and performs the same operation as described above.

(12) When a command for panning or tilting the camera head 2001 is input in the memory mode (step S12), the command wait state is restored (step S7), and the CPU 2050 inhibits pivoting movement of the camera head 2001 at the document/image sensing position.

(13) When a command for pivoting the camera head 2001 to the portrait sensing position (a command for pivoting the camera head 2001 to the portrait sensing position in FIG. 29 at once unlike the pivot command in operation (12) which pans or tilts the camera head 2001) is input (step S13), the CPU 2050 performs the same operation as that performed when the command for performing an image sensing operation at the portrait sensing position is selected after the power supply is turned on (step S1).

(14) When a command other than those described above, e.g., a command for changing the zooming ratio or the white balance, is input, the corresponding processing is performed (step S14), and the command wait state is set (step S7).

(15) When a command for panning or tilting the camera head 2001 in the through mode is input (step S15), the command wait state is restored (step S10), and the CPU 2050 inhibits pivoting movement of the camera head 2001 at the document/image sensing position.

(16) When a command for pivoting the camera head 2001 to the portrait sensing position in the through mode (a command for pivoting the camera head 2001 to the portrait sensing position in FIG. 29 at once unlike the pivot command in operation (15) which is used to pan or tilt the camera head 2001) is input (step S16), the CPU 2050 pivots the camera head 2001 to the portrait sensing position (step S21).

(17) When a command other than those described above, e.g., a command for changing the zooming ratio or the white balance, is input, the corresponding processing is performed (step S17), and the command wait state is set (step S10).

When a command for performing an image sensing operation at the portrait sensing position is selected in the state in FIG. 22 after the power supply is turned on (step S1), the camera head 2001 pivots toward the portrait sensing position in the direction indicated by the arrow AX in FIG. 22 (step S18). When the camera head 2001 comes to the position A'X making 30° with the vertical position in FIG. 22 (step S19), the CPU 2050 outputs an image to the monitor without the mediacy of the image memory 2057, i.e., sets the through mode (step S20), and pivots the camera head 2001 to the portrait sensing position (step S21).

The CPU 2050 always checks the position of the camera head 2001. When the camera head 2001 comes to the portrait sensing position (step S22), the CPU 2050 senses an object such as the operator in the command wait state (step S23). The CPU 2050 then performs the following operations (21) to (24) in accordance with an input command.

(21) When an image inversion command, i.e., a command for switching the through mode to the memory code, is input (step S24), the command wait state is restored (step S23). This is because the apparatus is not designed to invert an image while an image sensing operation is performed in the state shown in FIG. 29. That is, input of this command in this state is considered as an error made by the operator, and hence the command wait state is restored to prevent an operation error.

(22) When a command for panning or tilting the camera head 2001 is input (step S25), the CPU 2050 discriminates whether the camera head 2001 is to pivot in the panning direction or the tilting direction (step S26A). If the camera head 2001 is to pivot in the panning direction, the CPU 2050 pivots the camera head 2001 in the panning direction (step S27A), and restores the command wait state (step S23). If the camera head 2001 is to pivot in the tilting direction, the CPU 2050 pivots the camera head 2001 in the tilting direction (step S28).

When the camera head 2001 comes to the position A'X making 30° with the vertical direction in FIG. 22 (step S29), the CPU 2050 forcibly sets the memory mode (step S4), and performs the above operation at the document/image sensing position. If the camera head 2001 does not come to the position A'X making 30° with the vertical direction in FIG. 22 (step S29), the command wait state is restored (step S23).

(23) When a command for pivoting the camera head 2001 to the document/image sensing position (a command for pivoting the camera head 2001 to the document/image sensing position in FIG. 22 at once unlike the pivot command in operation (22) which is used to pan or tilt the camera head 2001) is input (step S26), the CPU 2050 pivots the camera head 2001 to the document/image sensing position (step S2).

(24) When a command other than those described above, e.g., a command for changing the zooming ratio or the white balance, is input, the corresponding processing is performed (step S27), and the command wait state is set (step S23). In this case, the image inversion position is the position A'X making 30° with the vertical direction in FIG. 22 in the tilting direction of the camera head 2001. However, this angle (30°) can be arbitrarily set within the range of 0 to 110°. This setting operation will be described below with reference to the flow chart in FIG. 32.

Referring to FIG. 32, the operator who wants to change the image inversion position inputs a desired angle with keys by using the remote controller or the external controller (step S100). The CPU 2050 stores the input value (step S101). With this operation, the image inversion position is changed in accordance with the angle desired by the operator.

Tilting and panning means for pivoting the camera head 2001 in the tilting and panning directions will be described next with reference to FIG. 33. FIG. 33 shows the interior of the camera base 2002 at the document/image sensing position in FIG. 22. The tilting means will be described first. The tilting shaft 2015 is pivotally supported on the camera base 2002 with a means (not shown). The gear 2019 fixed to the tilting shaft 2015 is coupled to the gear 2017 via the timing belt 2020, and the gear 2017 is pressed onto the shaft portion of the tilting motor 2018 fixed to the camera base 2002. With this arrangement, the driving force of the tilting motor 2018 is transmitted to the tilting shaft 2015.

Upon reception of a signal for switching the position of the camera head 2001 from the document/image sensing position to the portrait sensing position, the CPU 2050 drives the tilting motor 2018 in the direction indicated by the arrow AX. With this operation, the tilting shaft 2015 also pivots in the direction indicated by the arrow AX to move the camera head 2001 to the portrait sensing position. Upon reception of a signal for switching the position of the camera head 2001 from the portrait sensing position to the document/image sensing position, the CPU 2050 drives the tilting motor 2018 in the direction indicated by the arrow BX to pivot the tilting shaft 2015 in the direction indicated by the arrow BX. The tilting shaft 2015 is in the form of a pipe, and has the window 2015b near the gear 2019. The cable 2025 from the camera head 2001 extends to the support portion 2003 through the window 2015b.

As described above, the tilting means is constituted by the tilting shaft 2015, the gear 2017, the tilting motor 2018, the gear 2019, and the timing belt 2020.

The panning means will be described next. Referring to FIG. 33, the disk-like portion 2003a and the support portion 2003 are engaged with each other through a means (not shown) to be pivotal about the central line 2002a in the directions indicated by the arrows CX and DX. When a signal for pivoting the camera head 2001 in the direction indicated by the arrow CX is input while the camera head 2001 is at the portrait sensing position, the CPU 2050 drives the panning motor 2022 in the direction indicated by the arrow CX.

At this time, the gear 2021 also rotates in the direction indicated by the arrow CX. Since the gear-like portion 2023 meshed with the gear 2021 is fixed to the disk-like portion 2003a, the panning motor 2022 itself pivots about the central line 2002a on the circumference of the gear-like portion 2023 in the direction indicated by the arrow CX. Since the panning motor 2022 is fixed to the support portion 2003 with a means (not shown), the camera base 2002 also pivots about the central line 2002a in the direction indicated by the arrow CX upon pivoting movement of the panning motor 2022. The camera head 2001 pivots in the direction indicated by the arrow DX in the same manner as described above except for the direction of pivoting movement.

As described above, the panning means is constituted by the gear 2021, the panning motor 2022, and the gear-like portion 2023. In addition, a hole for the cable 2025 is formed in the central portion of the gear-like portion 2023. The cable 2025 extends through this hole and the support portion 2003 and is connected to a connector portion (not shown) of the cylindrical portion 2004a of the base 2004.

Although the tiling and panning means have been described above, means for pivoting the camera head 2001 are not limited to the above means, and various methods can be used. For example, the same effect as described above can be obtained by using one motor and a link mechanism.

The tilting position sensor for informing the CPU 2050 of the position of the camera head 2001 in the tilting direction will be described next with reference to FIGS. 34 to 36. FIG. 34 is a sectional view taken along a line JX—JX of the tilting position sensor in FIG. 33.

The tilting pawl 2015a is made of a conductive material (e.g., aluminum). The distal end of the tilting pawl 2015a is in contact with the resistive element 2026. This arrangement is the same as that of a general variable resistor in which a slider terminal slides on a resistive element to change the resistance. When, therefore, the reference voltage 2200 is applied between the terminals 2031 and 2033, a voltage Sv is generated between the terminals 2095 and 2033. The CPU 2050 detects this voltage Sv to detect that the camera head 2001 is at the position in FIG. 34.

The stopper 2027 limits the pivoting movement of the camera head 2001 in the direction indicated by the arrow BX to the position in FIG. 34. When the signal for the portrait sensing position is input to the CPU 2050 in this state, the camera head 2001 pivots in the direction indicated by the arrow AX and stops at the position in FIG. 35. The initial position of the portrait sensing position is the position where the camera head 2001 pivots through 90° from the document/image sensing position, as shown in FIG. 35. At this time, the voltage between the terminals 2095 and 2033 drops to a voltage Tv because of the resistance of the resistive element 2026. The CPU 2050 detects the position of the camera head 2001 from this voltage Tv. When the operator pivots the camera head 2001 in the direction indicated by the arrow AX from the initial position of the portrait sensing position, the camera head 2001 pivots to the position in FIG. 36, at which the pivoting movement is limited by a stopper 2028. At this time, the voltage between the terminals 2095 and 2033 further drops from the voltage Tv to a voltage Uv. The CPU 2050 then detects that the camera head 2001 has pivoted to the upper limit position of 110° in the tilting direction. As described above, the tilting position sensor 2060 is constituted by the tilting pawl 2015a, the resistive element 2026, and the contacts 2029, 2030, and 2032, and designed to detect the position of the camera head 2001 from a change in the voltage generated between the terminals 2095 and 2033.

The panning position sensor for informing the CPU 2050 of the position of the camera head 2001 in the panning direction will be described next with reference to FIGS. 37 and 38. FIG. 37 is a sectional view showing the panning position sensor at the initial position of the portrait sensing position, when viewed from the direction indicated by the arrow KX in FIG. 33, to explain the panning position sensor. The panning pawl 2024 formed on the disk-like portion 2003a is made of a conductive material (e.g., aluminum). The distal end of the panning pawl 2024 is in contact with the resistive element 2034. This arrangement is the same as that of a general variable resistor in which a slider terminal moves on a resistive element to change the resistance. When the reference voltage 2201 is applied between the terminals 2039 and 2041, a voltage Vv is generated between the terminals 2096 and 2041. The CPU 2050 detects that the camera head 2001 is at the position in FIG. 37 from this voltage Vv. When a signal for pivoting movement in the direction indicated by the arrow DX is input to the CPU 2050 in this state, the camera head 2001 pivots in the direction indicated by the arrow DX up to the position in FIG. 38 at maximum. When the camera head 2001 pivots through 70° from the initial position of the portrait sensing position, the panning/pivoting movement in the direction indicated by the arrow DX is limited by the stopper 2035, as shown in FIG. 38.

At this time, the voltage between the terminals 2096 and 2041 drops to a voltage Wv because of the resistance of the resistive element 2034. The CPU 2050 detects the position of the camera head 2001 from this voltage Wv. The camera head 2001 pivots in the direction indicated by the arrow CX in the same manner as described above. Pivoting movement in the panning direction is allowed within the range of 140°.

As described above, the panning position sensor 2059 is constituted by the panning pawl 2024, the resistive element 2034, and the contacts 2037, 2038, and 2040, and designed to detect the position of the camera head 2001 from a change in the voltage generated between the terminals 2039 and 2041.

Although the tiling position sensor and the panning position sensor have been described above, methods of detecting the position of the camera head are not limited to those described above. For example, the position of the camera head can be detected as well by a general optical encoder using a photointerruptor or a magnetic encoder. In addition, the pivoting ranges in the tilting and panning operations are not limited to the upper limits, and can be arbitrarily set by changing the positions of the stoppers.

Although the above description has not referred to the foldable arrangements of the leg portions 2004b and 2004c and the detachable connectors 6a and 14a, the same functions can be added by using the mechanisms described in the first and second embodiments and their modifications. The same applies to the following modification.

Modification to the Third Embodiment

A modification of the third embodiment will be described next.

Figure 39:
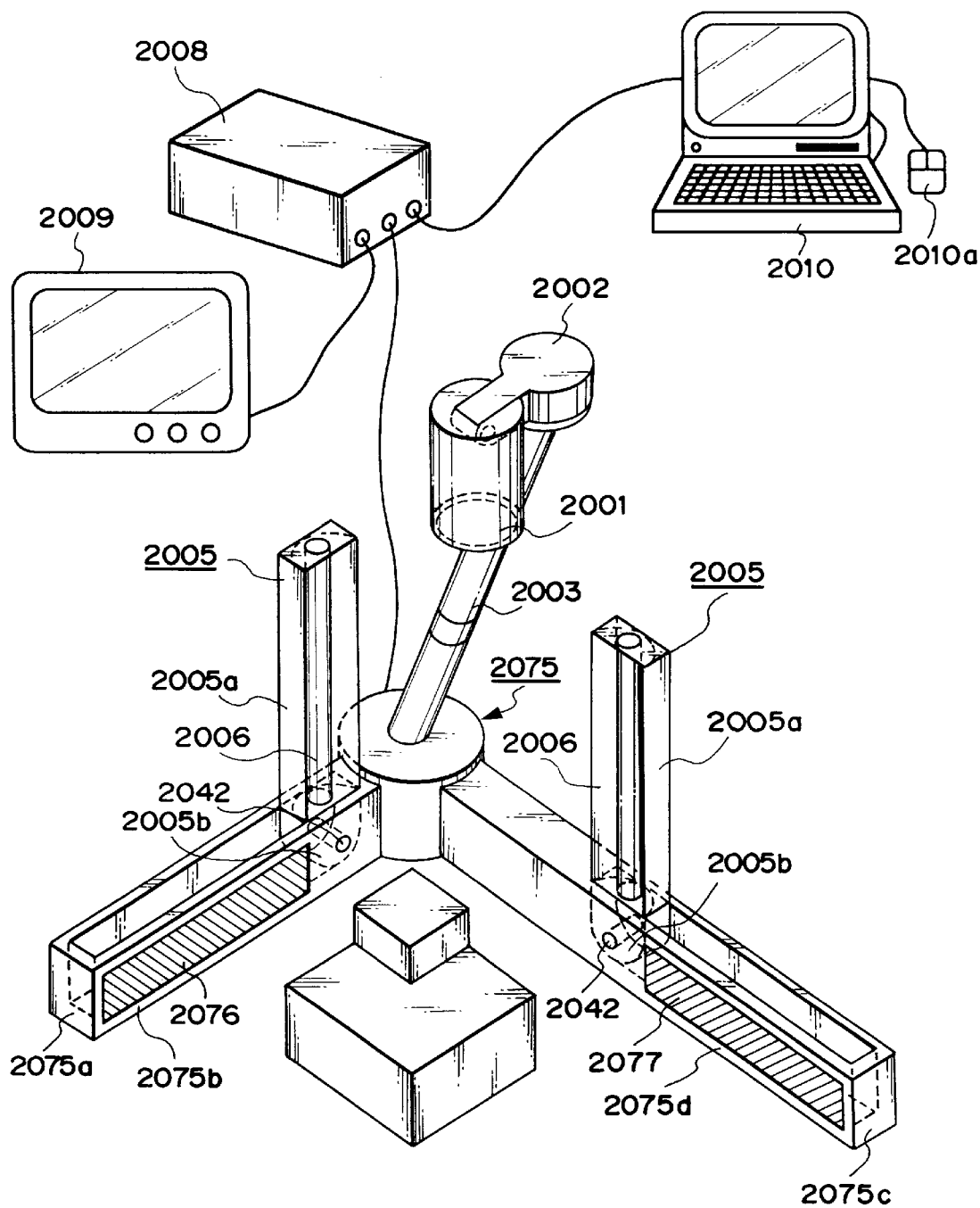
FIG. 39 is a perspective view showing the overall arrangement of an image input apparatus as a modification of the third embodiment.

FIG. 39 shows the arrangement of an image input apparatus according to a modification of the third embodiment.

Referring to FIG. 39, reference numeral 2075 denotes a base including a base 2075 for a protector 2076 in a leg portion 2075a, and a window 2075d for a protector 2077 in a leg portion 2075c. The protectors 2076 and 2077 are made of milky white translucent members. Note that the same reference numerals in this modification denote the same parts as in the third embodiment.

In this modification, the light amounts of illumination units 2005 are not electrically changed in accordance with the positions of an original and a three-dimensional object but are changed by using the protectors 2076 and 2077. More specifically, the light amounts of the illumination unit 2005 are set for a three-dimensional object in advance. When the illumination units 2005 are at the position for an original, light from the fluorescent lamps 2006 is passed through the protectors 2076 and 2077 to be attenuated. When the illumination units 2005 are at the position for a three-dimensional object, light from the fluorescent lamps 2006 is directly irradiated because no obstacles are present.

According to this modification, since the lamp light amounts are not electrically changed, the arrangements of the electrical circuits can be simplified. In addition, since the lamp light amounts are not electrically changed, the service life of each fluorescent lamp can be prolonged. Furthermore, the fluorescent lamps can be protected by the protectors.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. A document sensing apparatus comprising:

an image sensing unit for sensing a document located perpendicularly under said image sensing unit;

a support for supporting said image sensing unit; and two legs, which are stick-like straight shape and open at an angle of about 90 degrees in the center of one end of said support when used, for supporting said support diagonally to a plane, the plane being between said opened two legs and a location where the document is placed, wherein said two legs are folded in parallel to said support when not used, and each of said two legs has an illumination unit, which can be housed in said legs, for illuminating the document.

2. The apparatus according to claim 1, wherein said illumination unit of each of said two legs is capable of being at a first position and at a second position.

3. The apparatus according to claim 2, wherein said illumination unit of each of said two legs is capable of illuminating the document with light of different intensities at least at the first and second positions.

4. The apparatus according to claim 2, further comprising a pivot, provided on said support, for pivoting said image sensing unit to third and fourth positions, wherein when said illumination unit of each of said two legs is at the first position and said image sensing unit is positioned at the third position, said illumination unit of each of said two legs illuminates the document and said image sending unit senses the document; and wherein when said illumination unit of each of said two legs is at the second position and said image sensing unit is positioned at the second position, said illumination unit of each of said two legs does not illuminate the document.

5. The apparatus according to claim 1, further comprising light amount changing means for arbitrarily changing a light amount of said illumination unit of each of said two legs.

6. A document sensing apparatus comprising:

an image sensing unit for sensing a document located perpendicularly under said image sensing unit;

a support for supporting said image sensing unit;

two legs, which are stick-like straight shape and open at an angle of about 90 degrees in the center of one end of said support when used, for supporting said support diagonally to a plane, the plane being between said opened two legs and a location where the document is placed; and pivot legs which are mounted on distal ends of said two legs such that said pivot legs can be housed in said two legs when not used, wherein said two legs are folded in parallel to said support when not used.

7. A document sensing apparatus comprising:

an image sensing unit for sensing a document located perpendicularly under said image sensing unit;

a support for supporting said image sensing unit;

two legs, which are stick-like straight shape and open at an angle of about 90 degrees in the center of one end of said support when used, for supporting said support diagonally to a plane, the plane being between said opened two legs and a location where the document is placed; and a document table, which is detachably fitted in groove portions formed in inner side surfaces of said two legs in longitudinal directions thereof, and which prevents a collapse of the apparatus, wherein said two legs are folded in parallel to said support when not used.

8. The apparatus according to claim 7, wherein said document table is foldable.

9. A document sensing apparatus comprising:

an image sensing unit for converting image information, obtained by sensing an object, into an electrical signal;

a support portion for supporting said image sensing unit; and a plurality of leg portions mounted on a base portion of said support portion, wherein each of said leg portions has an illumination unit, which can be housed in said each leg portion, for illuminating the object.

10. A document sensing apparatus comprising:

an image sensing unit for converting image information, obtained by sensing an object, into an electrical signal;

a support portion for supporting said image sensing unit; and a plurality of leg portions mounted on a base portion of said support portion, wherein said leg portions are pivotally mounted on said base portion, and each of said leg portions has an illumination unit, which can be housed in said each leg portion, for illuminating the object.

11. A document sensing apparatus comprising:

an image sensing unit for converting image information, obtained by sensing an object, into an electrical signal;

a support portion for supporting said image sensing unit;

a plurality of leg portions mounted on a base portion of said support portion; and preventing means for preventing a fall of the apparatus;

wherein said preventing means are pivot legs which are mounted on distal ends of said leg portions such that said pivot legs can be housed in said two legs portions when not used.

12. A document sensing apparatus having an image sensing unit for inputting image information, obtained by sensing an object, to an apparatus body, a support portion for supporting said image sensing unit, and leg portions for supporting a base portion of said support portion, comprising:

pivot means, provided on said support portion, for pivoting said image sensing unit;

image memory means for storing image information input by said image sensing unit; and preventing means for preventing a fall of the apparatus, wherein a folding mechanism for folding said leg portions along said support portion is formed by said leg portions and said base portion, and said preventing means are pivot legs which are mounted on distal ends of said leg portions such that said pivot legs can be housed in said two legs when not used.

* * * * *

UNITED STATES PATENT AND TRADEMARK OFFICE
CERTIFICATE OF CORRECTION

PATENT NO. : 6,008,846
DATED : December 28, 1999
INVENTOR(S) : Tsukasa Uehara et al.

It is certified that error appears in the above-indentified patent and that said Letters Patent is hereby corrected as shown below:

ON THE TITLE PAGE

Under [75] "Inventors", after "Yokoyama" delete "Tama" and insert therefor -- Tokyo --.

Under [30] "Foreign Application Priority Data", last line, delete "6-273999" and insert therefor -- 6-293999 --

Column 5, line 40, after "sensor" delete "-".
Column 14, line 55, after "direction" delete "f" and insert therefor "f".
Column 15, line 45, after "dimension" delete "m" and insert therefor "m".
Column 15, line 46, after "dimension" delete "n" and insert therefor "n".
Column 23, line 55, delete "threedimensional" and insert therefor -- three dimensional --.
Column 23, line 67, after "being" delete "-".

Signed and Sealed this

Fifteenth Day of May, 2001

Attest:

NICHOLAS P. GODICI

Attesting Officer    Acting Director of the United States Patent and Trademark Office